(12) United States Patent
Ikeda et al.

(10) Patent No.: US 12,554,167 B2
(45) Date of Patent: Feb. 17, 2026

(54) LIGHTING DEVICE

(71) Applicant: Japan Display Inc., Tokyo (JP)

(72) Inventors: Kojiro Ikeda, Tokyo (JP); Takeo Koito, Tokyo (JP); Tae Kurokawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 323 days.

(21) Appl. No.: 18/523,430

(22) Filed: Nov. 29, 2023

(65) Prior Publication Data

US 2024/0102633 A1 Mar. 28, 2024

Related U.S. Application Data

(63) Continuation of application No. PCT/JP2022/024412, filed on Jun. 17, 2022.

(30) Foreign Application Priority Data

Jun. 22, 2021 (JP) ................. 2021-103584

(51) Int. Cl.
*G02F 1/1347* (2006.01)
*F21V 5/00* (2018.01)
(Continued)

(52) U.S. Cl.
CPC .......... *G02F 1/1347* (2013.01); *F21V 14/003* (2013.01); *G02F 1/134309* (2013.01); *G02F 1/13439* (2013.01); *G02F 1/13471* (2013.01); *G02F 1/29* (2013.01); *F21V 5/007* (2013.01); *F21V 7/0083* (2013.01); *F21Y 2107/10* (2016.08); *F21Y 2107/20* (2016.08)

(58) Field of Classification Search
None
See application file for complete search history.

(56) References Cited

U.S. PATENT DOCUMENTS

| 2005/0243237 | A1 | 11/2005 | Sasuga |
| 2010/0149444 | A1 | 6/2010 | Hikmet et al. |

(Continued)

FOREIGN PATENT DOCUMENTS

| JP | 2005317879 A | 11/2005 |
| JP | 2010230887 A | 10/2010 |
| JP | 2014160277 A | 9/2014 |

*Primary Examiner* — Ryan Crockett
(74) *Attorney, Agent, or Firm* — K&L Gates LLP

(57) ABSTRACT

A lighting device includes a light source having a first optical element and a second optical element emitting directional light, and one liquid crystal optical element transmitting or diffusing the light emitted from the light source. The first and the second optical elements include a first and a second light exit surfaces, and the first and the second light exit surfaces are arranged to direct in different directions. The liquid crystal optical element has a second electrode group arranged adjacent to a first electrode group. The first electrode group has a first transparent electrode and a second transparent electrode. The second electrode group has a third transparent electrode and a fourth transparent electrode. A pitch at which the first transparent electrodes and the second transparent electrodes are alternately arranged is different from a pitch at which the third transparent electrodes and the fourth transparent electrodes are alternately arranged.

17 Claims, 40 Drawing Sheets

(51) Int. Cl.
*F21V 7/00* (2006.01)
*F21V 14/00* (2018.01)
*F21Y 107/10* (2016.01)
*F21Y 107/20* (2016.01)
*G02F 1/1343* (2006.01)
*G02F 1/29* (2006.01)

(56) References Cited

U.S. PATENT DOCUMENTS

| | | | |
|---|---|---|---|
| 2010/0207858 A1* | 8/2010 | Chen | G02F 1/133514 345/88 |
| 2011/0299024 A1* | 12/2011 | Lee | G02F 1/1368 29/829 |
| 2013/0154911 A1* | 6/2013 | Chen | G09G 3/36 345/87 |
| 2014/0293172 A1* | 10/2014 | Suzuki | G02B 30/30 359/462 |
| 2015/0340345 A1* | 11/2015 | Wang | H10H 20/8506 257/88 |
| 2017/0176819 A1* | 6/2017 | Park | G02F 1/134363 |
| 2020/0371279 A1* | 11/2020 | Meng | G02F 1/133512 |
| 2021/0333654 A1* | 10/2021 | Zhao | G02F 1/133512 |
| 2024/0264494 A1* | 8/2024 | Sun | G02F 1/1333 |

\* cited by examiner

FIG. 1
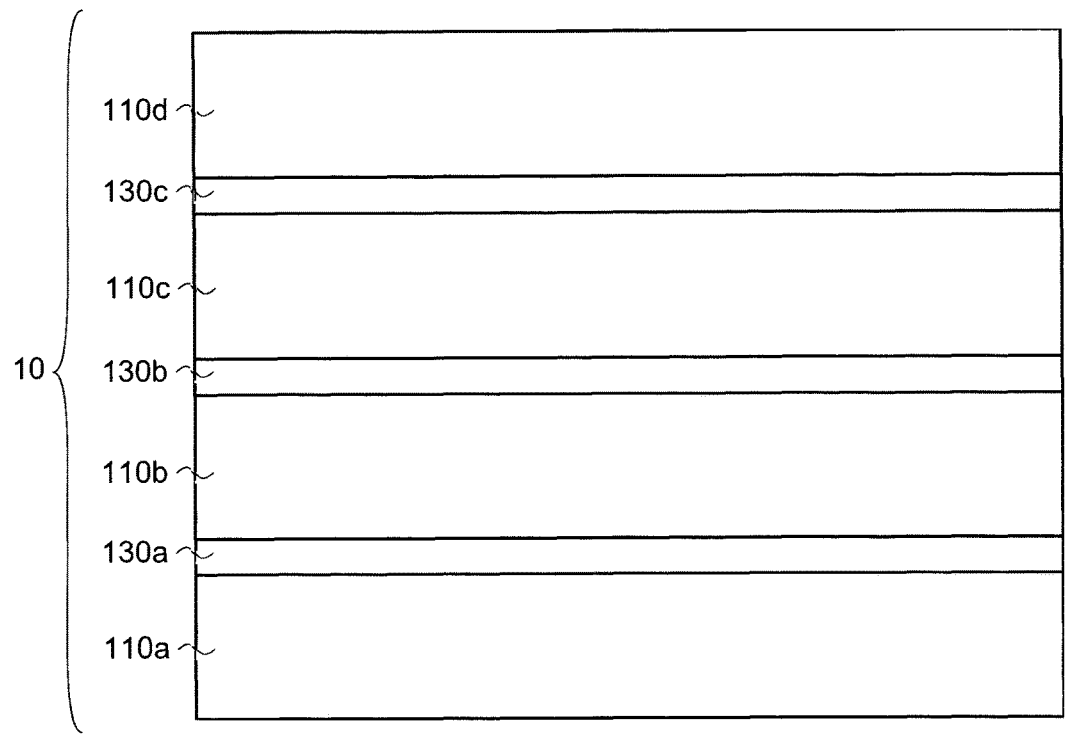
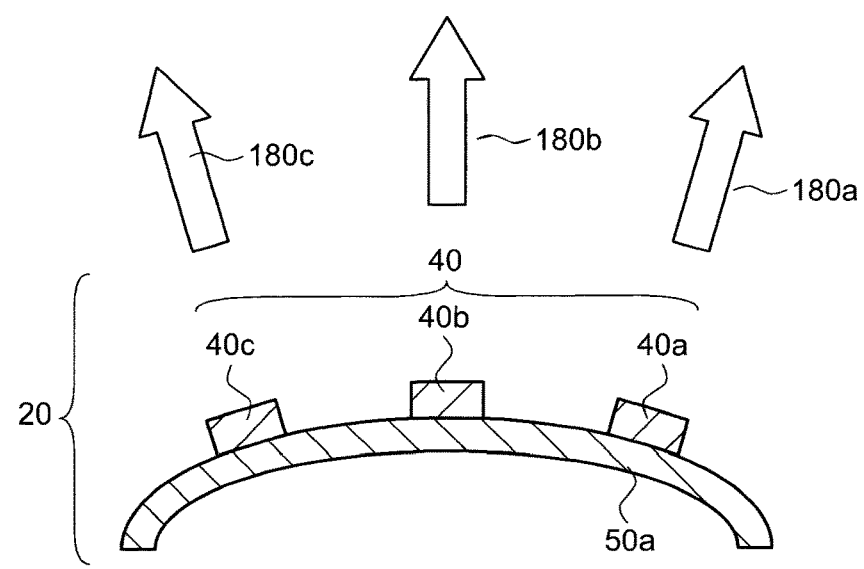
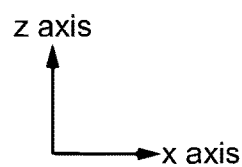

FIG. 8
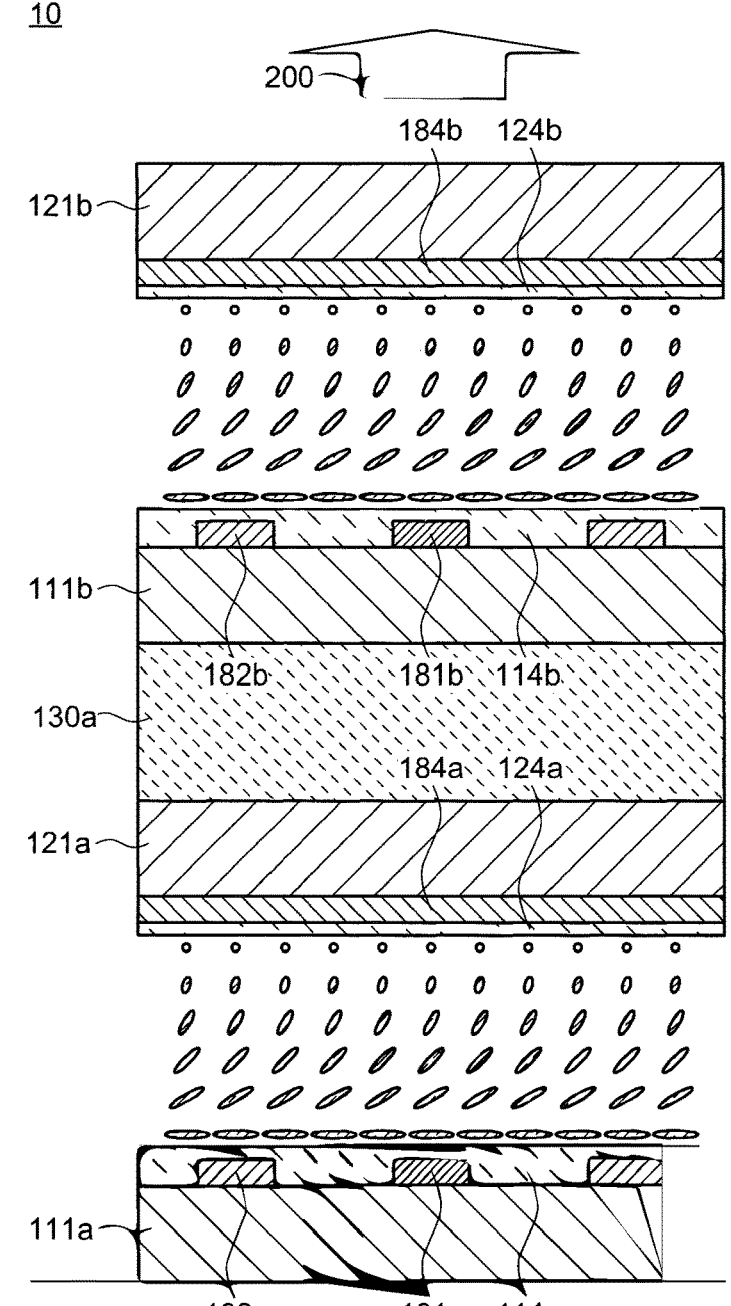
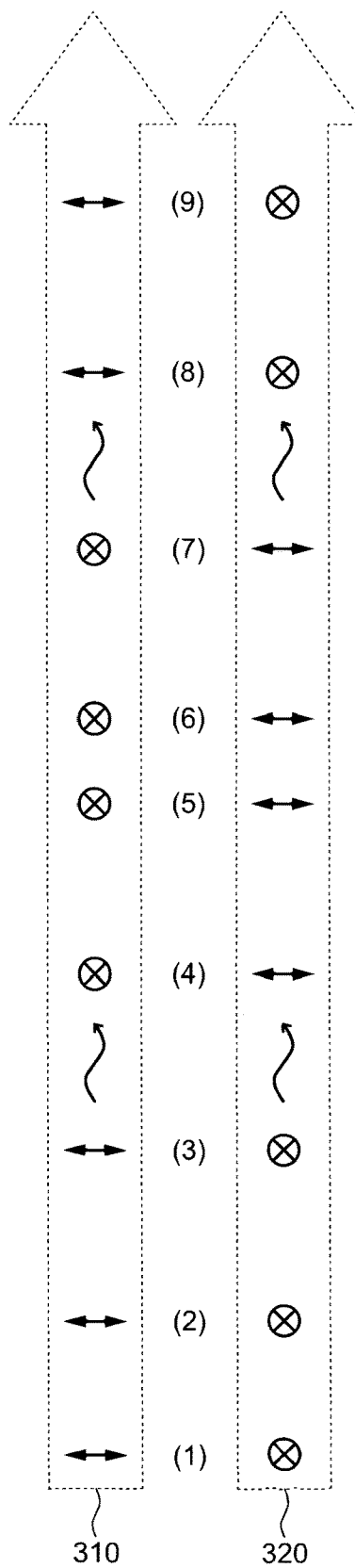

FIG. 19
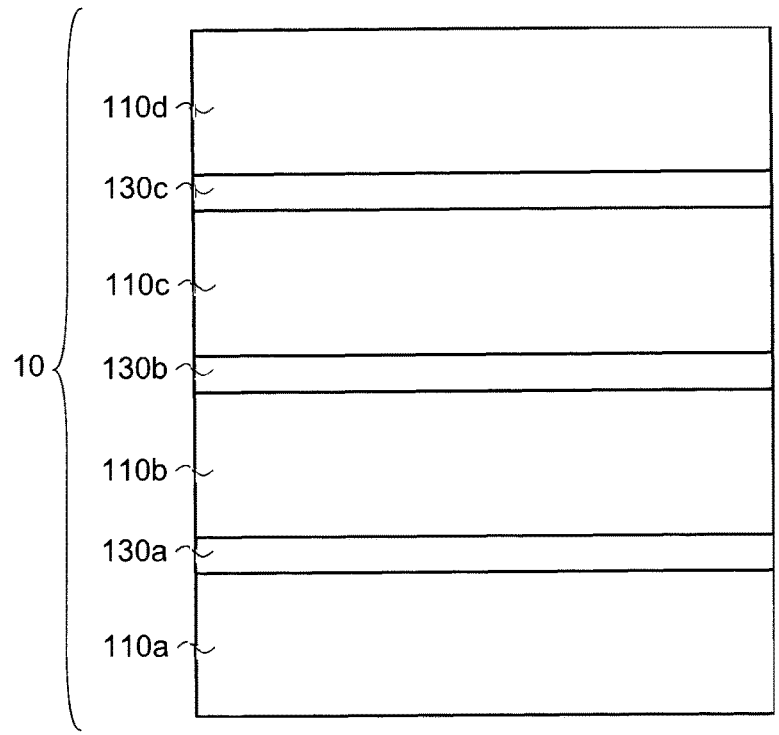
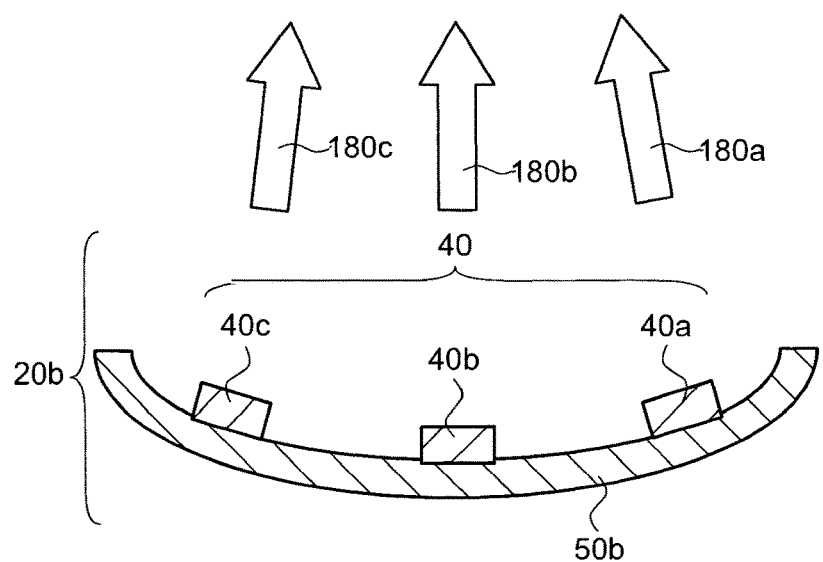

FIG. 21
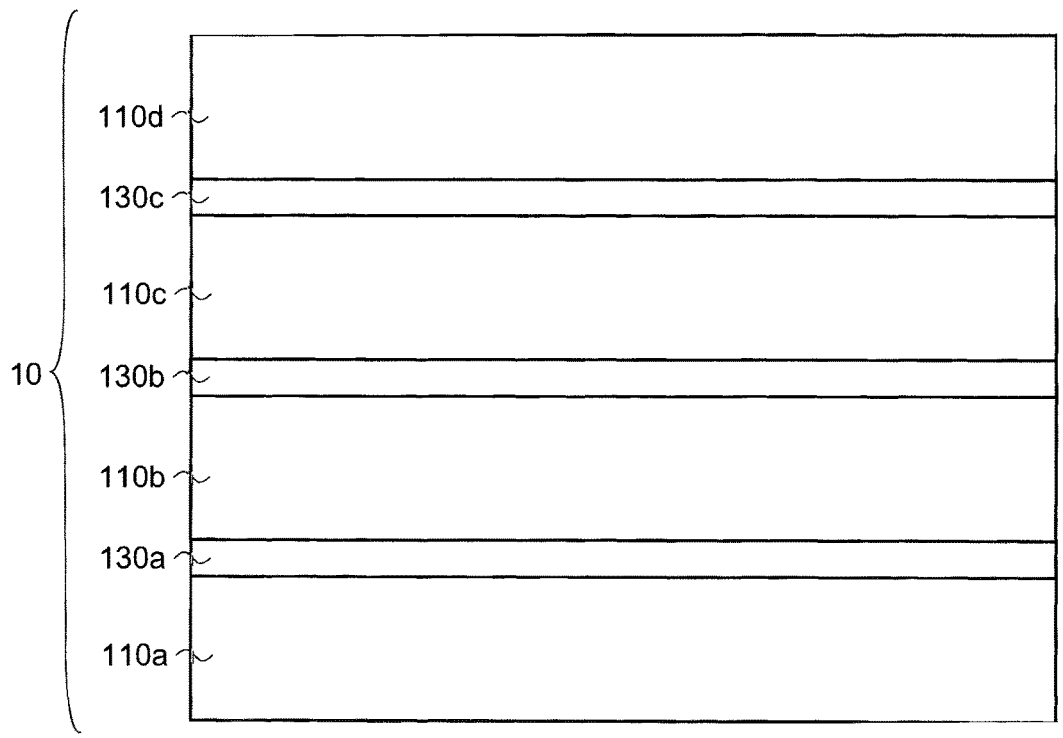
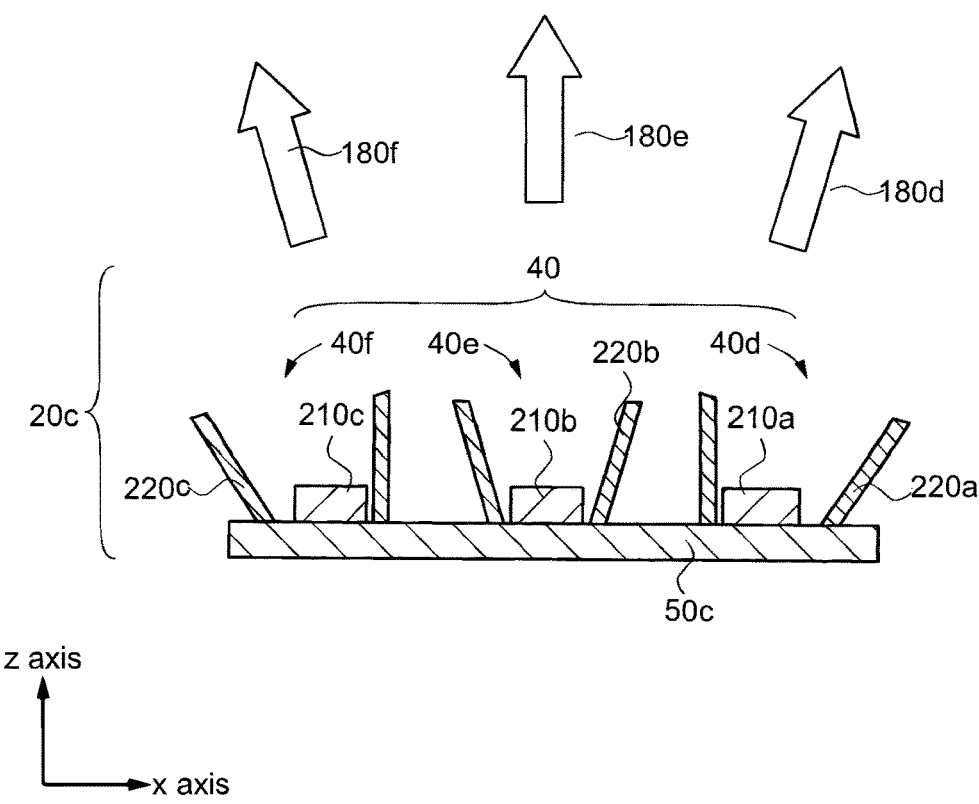

LIGHTING DEVICE

CROSS-REFERENCE TO RELATED APPLICATIONS

This application is a Continuation of International Patent Application No. PCT/JP2022/024412, filed on Jun. 17, 2022, which claims the benefit of priority to Japanese Patent Application No. 2021-103584, filed on Jun. 22, 2021, the entire contents of which are incorporated herein by reference.

FIELD

An embodiment of the present invention relates to an optical element capable of controlling a light distribution with the optical characteristics of a liquid crystal, and a lighting device including an optical element capable of controlling a light distribution with the optical characteristics of a liquid crystal.

BACKGROUND

A liquid crystal lens is known as an optical element (liquid crystal optical element) using a liquid crystal that supplies a voltage to the liquid crystal, changes the refractive index of the liquid crystal, and electrically controls the focal length. For example, Japanese laid-open patent publication No. 2005-317879 and Japanese laid-open patent publication No. 2010-230887 disclose a lighting device for controlling the spread of light emitted from a light source by using a liquid crystal cell arranged with electrodes in a concentric circle shape. For example, Japanese laid-open patent publication No. 2014-160277 discloses a beam shaping device pattern for controlling a light distribution by changing the shape of an electrode for supplying a voltage to a liquid crystal.

SUMMARY

A lighting device includes a light source having a first optical element and a second optical element emitting directional light, and one liquid crystal optical element transmitting or diffusing the light emitted from the light source. The first optical element includes a first light exit surface. The second optical element includes a second light exit surface. The first light exit surface and the second light exit surface are arranged to direct in different directions. The liquid crystal optical element has a first electrode group facing the first light exit surface and a second electrode group facing the second light exit surface and arranged adjacent to the first electrode group. The first electrode group has a first transparent electrode and a second transparent electrode arranged alternately with the first transparent electrode. The second electrode group has a third transparent electrode and a fourth transparent electrode arranged alternately with the third transparent electrode. A pitch at which the first transparent electrode and the second transparent electrode are alternately arranged is different from a pitch at which the third transparent electrode and the fourth transparent electrode are alternately arranged.

BRIEF DESCRIPTION OF DRAWINGS

FIG. 1 is a schematic end portion cross-sectional view of a lighting device according to an embodiment of the present invention.

FIG. 8 is a schematic end portion cross-sectional view showing an orientation of a liquid crystal in a liquid crystal layer in a liquid crystal optical element according to an embodiment of the present invention.

FIG. 19 is an end portion cross-sectional view of a lighting device according to an embodiment of the present invention.

FIG. 21 is an end portion cross-sectional view of a lighting device according to a 2nd embodiment of the present invention.

DESCRIPTION OF EMBODIMENTS

Hereinafter, embodiments of the present invention will be described with reference to the drawings and the like. However, the present invention can be implemented in many different aspects, and should not be construed as being limited to the description of the embodiments exemplified below. Although the drawings may be schematically represented with respect to the width, thickness, shape, and the like of each part as compared with the actual embodiment in order to make the description clearer, the drawings are merely examples, and do not limit the interpretation of the present invention. In addition to the present specification and the drawings, elements similar to those described previously with respect to the above-mentioned figures are denoted by the same reference signs, letters such as a, b, A, and B after numbers, or a hyphen and a number after the numbers, and detailed description thereof may be omitted as appropriate. Furthermore, the terms "1st" and "2nd" with respect to the respective elements are convenient signs used to distinguish the respective elements, and do not have any further meaning unless otherwise specified.

In the present specification, a member or region is "above (or below)" another member or region, including, without limitation, the case where it is directly above (or below) the other member or region, but also the case where it is above (or below) the other member or region, that is, the case where another component is included between above (or below) the other member or region.

In addition to the present specification, in the case where a single film is processed to form a plurality of structures, each structure may have different functions and roles, and each structure may have different substrates on which it is formed. However, the plurality of structures is derived from films formed as the same layer in the same process, and have the same properties. Therefore, the plurality of films is defined as being present in the same layer.

Further, in the present specification, the phrase "α includes A, B, or C," "α includes any of A, B, or C," "α includes one selected from a group consisting of A, B, and C," and the like does not exclude cases where α includes a plurality of combinations of A to C unless otherwise indicated. Furthermore, these expressions do not exclude the case where α includes other elements.

1st Embodiment 1-1. Configuration of Lighting Device 30

Figure 2:
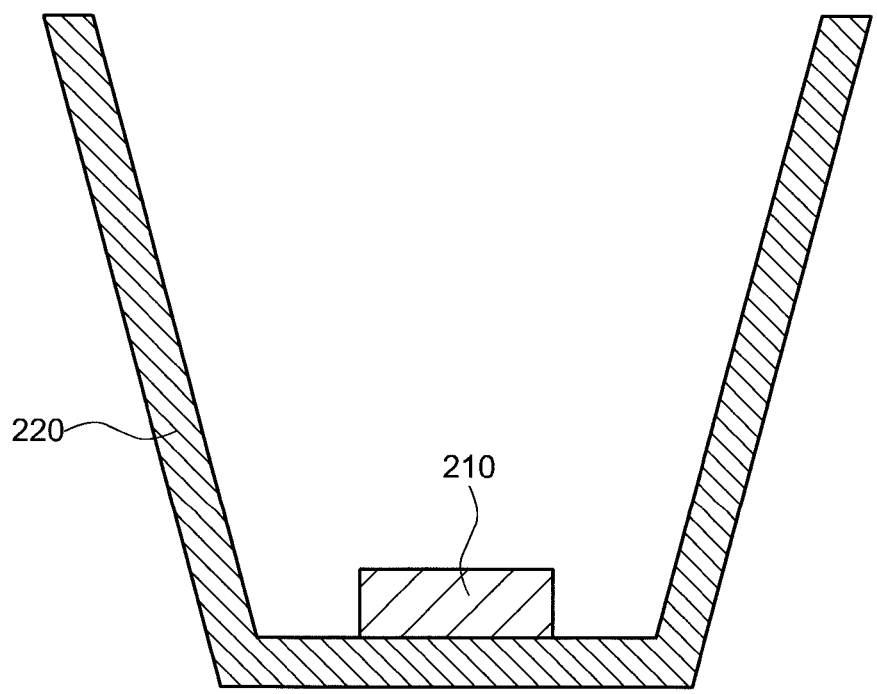
FIG. 2 is a schematic end portion cross-sectional view of an optical element according to an embodiment of the present invention.

FIG. 1 is a schematic end portion cross-sectional view showing an example of a lighting device 30 according to an embodiment of the present invention. FIG. 2 is a schematic end portion cross-sectional view of an optical element 40 according to an embodiment of the present invention. As shown in FIG. 1, the lighting device 30 includes one liquid crystal optical element 10 and a light source 20.

Although details will be described later, the liquid crystal optical element 10 includes a 1st liquid crystal cell 110a, a 2nd liquid crystal cell 110b, a 3rd liquid crystal cell 110c, a 4th liquid crystal cell 110d, a 1st transparent adhesive layer 130a, a 2nd transparent adhesive layer 130b, and a 3rd transparent adhesive layer 130c. The 1st transparent adhesive layer 130a is arranged between the 1st liquid crystal cell 110a and the 2nd liquid crystal cell 110b, the 2nd transparent adhesive layer 130b is arranged between the 2nd liquid crystal cell 110b and the 3rd liquid crystal cell 110c, and the 3rd transparent adhesive layer 130c is arranged between the 3rd liquid crystal cell 110c and the 4th liquid crystal cell 110d. The 1st liquid crystal cell 110a, the 1st transparent adhesive layer 130a, the 2nd liquid crystal cell 110b, the 2nd transparent adhesive layer 130b, the 3rd liquid crystal cell 110c, the 3rd transparent adhesive layer 130c, and the 4th liquid crystal cell 110d are stacked in a z-axis direction.

The 1st transparent adhesive layer 130a adheres and fixes the 1st liquid crystal cell 110a and the 2nd liquid crystal cell 110b. Similar to the 1st transparent adhesive layer 130a, the 2nd transparent adhesive layer 130b adheres and fixes the 2nd liquid crystal cell 110b and the 3rd liquid crystal cell 110c, and the 3rd transparent adhesive layer 130c adheres and fixes the 3rd liquid crystal cell 110c and the 4th liquid crystal cell 110d.

An optically elastic resin can be used as a material for forming the 1st transparent adhesive layer 130a, the 2nd transparent adhesive layer 130b, and the 3rd transparent adhesive layer 130c. For example, the optically elastic resin is an adhesive material containing an acryl resin having light transmittance.

The light source 20 includes the optical element 40 and a support member 50a. The light source 20 is arranged below the 1st liquid crystal cell 110a of the liquid crystal optical element 10. Therefore, light emitted from the light source 20 passes through the 1st liquid crystal cell 110a, the 2nd liquid crystal cell 110b, the 3rd liquid crystal cell 110c, and the 4th liquid crystal cell 110d in this order.

The support member 50a has a role of supporting (fixing) the optical element 40. The support member 50a has a curved surface and, in a cross-sectional view, has a convex shape. For example, a polycarbonate substrate (PCB substrate), a ceramic substrate, or a metal substrate based on a metal material such as aluminum/copper can be used as the support member 50a.

The optical element 40 is composed of a 1st optical element 40a, a 2nd optical element 40b, and a 3rd optical element 40c in the present embodiment. The 1st optical element 40a, the 2nd optical element 40b, and the 3rd optical element 40c are arranged parallel to or substantially parallel to an x-axis direction or a y-axis direction in a plan view. The 1st optical element 40a is arranged next to the 2nd optical element 40b and the 2nd optical element 40b is arranged next to the 3rd optical element 40c in the present embodiment. In addition to the present embodiment, the optical element may be referred to as an optical unit.

The 1st optical element 40a, the 2nd optical element 40b, and the 3rd optical element 40c are mounted on the curved surface of the support member 50a. The 1st optical element 40a, the 2nd optical element 40b, and the 3rd optical element 40c have directivity in the light emission direction. The 1st optical element 40a, the 2nd optical element 40b, and the 3rd optical element 40c are arranged so as to emit light in different directions. The light emitted by the optical element 40 is emitted in a direction perpendicular to a plane in contact with the curved surface. For example, when each optical element is arranged as shown in FIG. 1, the 1st optical element 40a emits a light 180a in a right-oblique direction with respect to the z-axis direction, the 2nd optical element 40b emits a light 180b in parallel or substantially parallel to the z-axis direction, and the 3rd optical element 40c emits a light 180c in a left-oblique direction with respect to the z-axis direction. In each of the 1st optical element 40a, the 2nd optical element 40b, and the 3rd optical element 40c, a surface including the direction in which light is emitted may be referred to as a light exit surface.

The optical element 40 and the liquid crystal optical element 10 are arranged as shown in FIG. 1 in the present embodiment. In other words, one liquid crystal optical element 10 is arranged as shown in FIG. 1 for three optical elements, that is, the 1st optical element 40a, the 2nd optical element 40b, and the 3rd optical element 40c, which emit light in different directions. As a result, three optical elements are used as a left-side light source, a center light source, and a right-side light source, so that the liquid crystal optical element 10 can transmit or diffuse the light emitted in different directions from each optical element. As a result, the lighting device 30 according to the present embodiment can variously control a light distribution and a light distribution pattern.

In addition to the present embodiment, although the light source 20 is composed of three optical elements (the 1st optical element 40a, the 2nd optical element 40b, and the 3rd optical element 40c), the configuration of the light source 20 is not limited to the configuration according to the present embodiment. For example, the light source 20 may be composed of at least two or more optical elements that emit light in different directions. Since the light source 20 is composed of at least two or more optical elements that emit light in different directions, the liquid crystal optical element can transmit or diffuse the light emitted in different directions from each optical element, and the lighting device 30 according to the present embodiment can variously control the light distribution and the light distribution pattern.

For example, each of the 1st optical element 40a, the 2nd optical element 40b, and the 3rd optical element 40c is composed of a light-emitting element 210 and a reflector 220 as shown in FIG. 2.

For example, the light-emitting element 210 is a light bulb, a fluorescent lamp, a cold-cathode tube, a light-emitting diode (LED), or a laser diode (LD). The light-emitting element 210 is an LED in the present embodiment. The luminous efficacy of an LED is generally higher than that of a light bulb, a fluorescent lamp, or the like. Therefore, the lighting device 30 using an LED is a lighting device having high brightness and low power consumption. In addition, the LED and the LD respectively include an organic light-emitting diode (OLED) and an organic laser diode (OLD).

The reflector 220 may reflect the light emitted from the light-emitting element 210 and cause the reflected light to be incident on the liquid crystal optical element 10. For example, although the shape of the reflector 220 is approximately conical as shown in FIG. 2, the shape of the reflector 220 is not limited to an approximately conical shape. In addition, a surface of the reflector 220 may be flat or curved.

1-2. Configuration of Liquid Crystal Optical Element 10

Figure 3:
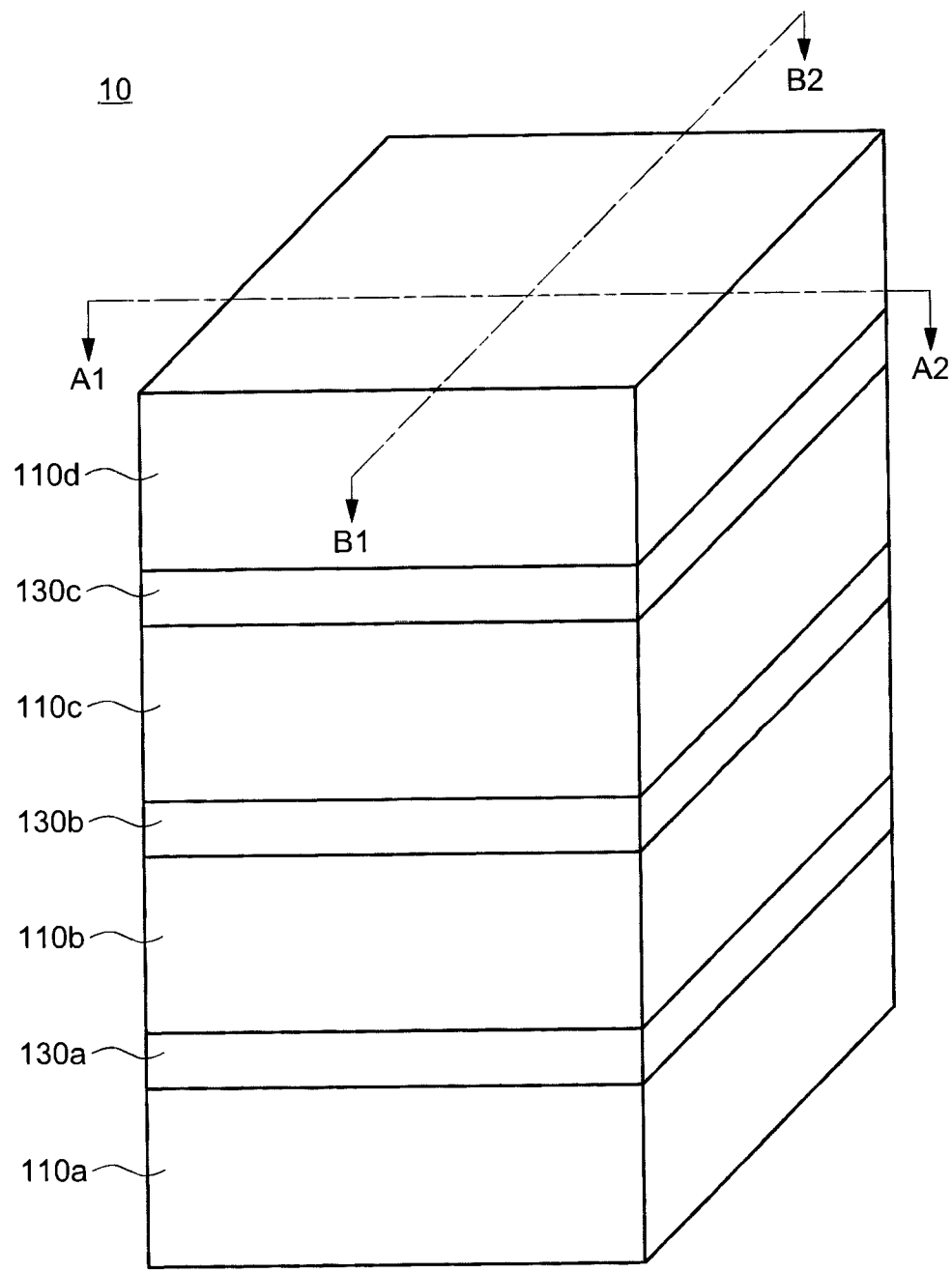
FIG. 3 is a schematic perspective view of a liquid crystal optical element according to an embodiment of the present invention.

FIG. 3 is a schematic perspective view of the liquid crystal optical element 10 according to an embodiment of the present invention. As shown in FIG. 3, the liquid crystal optical element 10 includes the 1st liquid crystal cell 110a, the 2nd liquid crystal cell 110b, the 3rd liquid crystal cell 110c, and the 4th liquid crystal cell 110d. The 1st liquid crystal cell 110a, the 2nd liquid crystal cell 110b, the 3rd liquid crystal cell 110c, and the 4th liquid crystal cell 110d are stacked in the z-axis direction. The 2nd liquid crystal cell 110b is arranged on the 1st liquid crystal cell 110a. The 3rd liquid crystal cell 110c is arranged on the 2nd liquid crystal cell 110b. The 4th liquid crystal cell 110d is arranged on the 3rd liquid crystal cell 110c.

Figure 4:
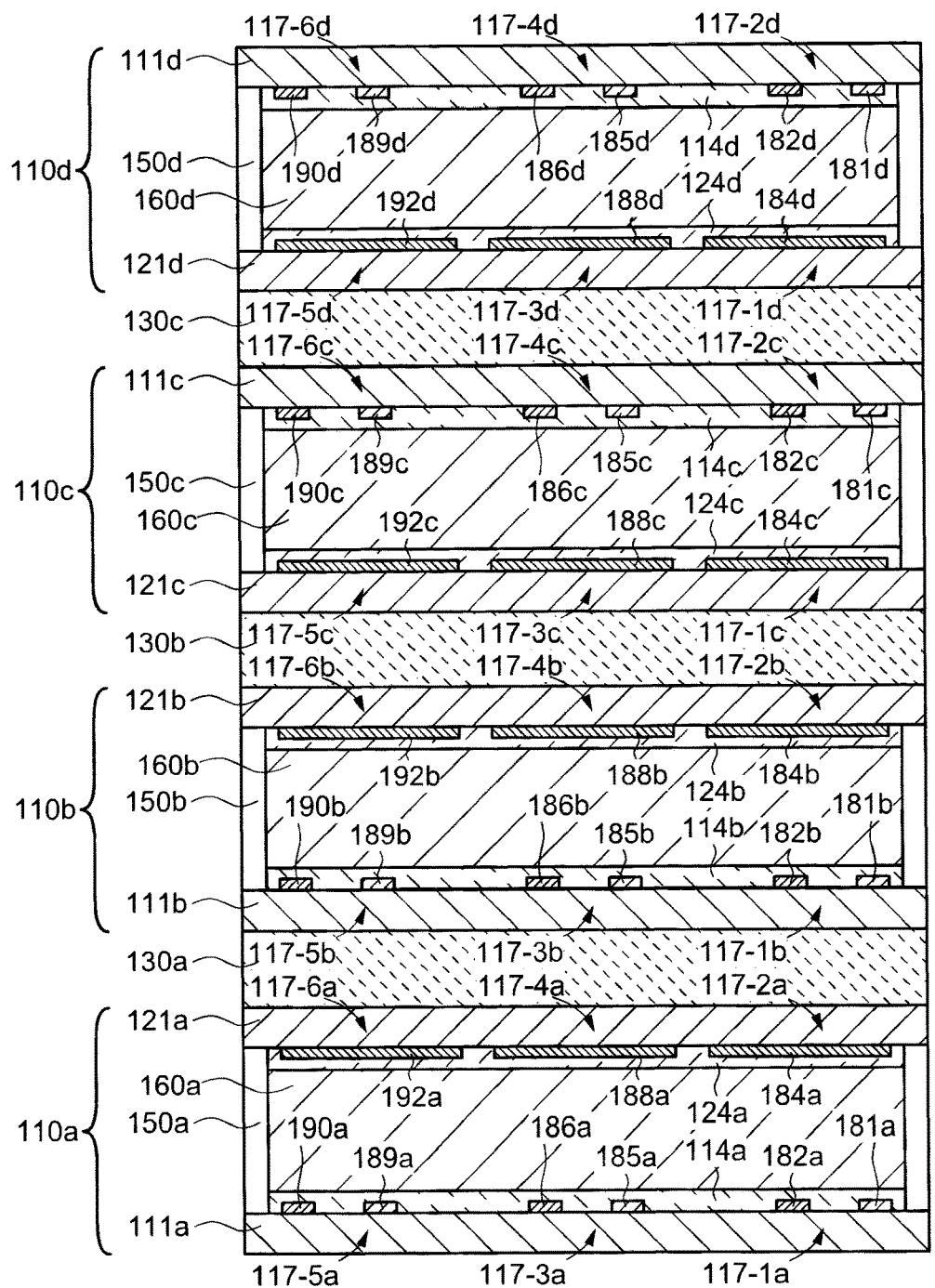
FIG. 4 is a schematic end portion cross-sectional view of a liquid crystal optical element according to an embodiment of the present invention.
Figure 5:
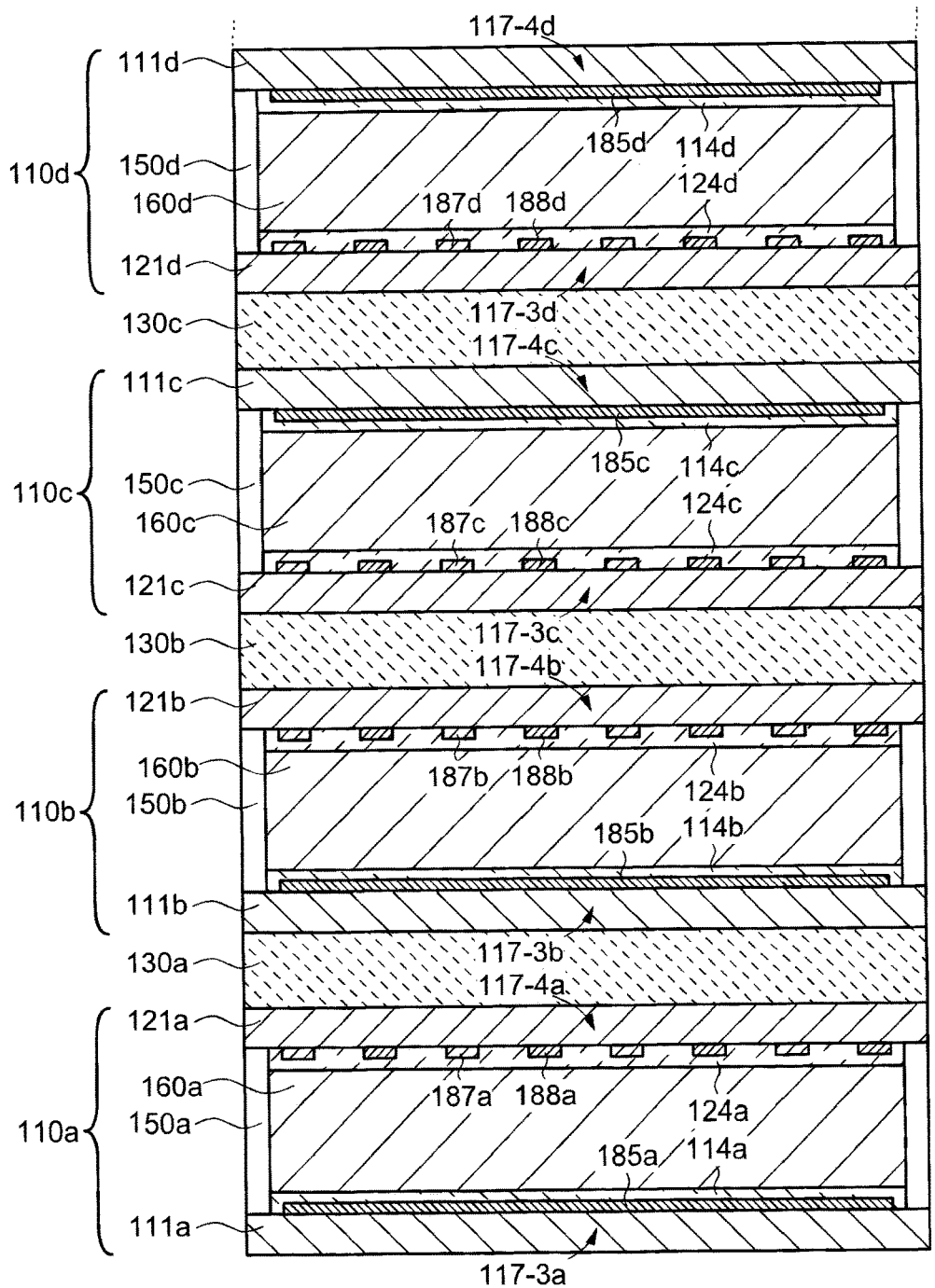
FIG. 5 is a schematic end portion cross-sectional view of a liquid crystal optical element according to an embodiment of the present invention.

FIG. 4 and FIG. 5 are schematic cross-sectional views of the liquid crystal optical element 10 according to an embodiment of the present invention. Specifically, FIG. 4 is a schematic cross-sectional view in a zx plane cut along a line A1-A2 shown in FIG. 3, and FIG. 5 is a schematic cross-sectional view in a yz plane cut along a line B1-B2 shown in FIG. 3. The x-axis direction, the y-axis direction intersecting the x-axis direction, and the z-axis direction intersecting the y-axis may be respectively referred to as a 1st direction, a 2nd direction, and a 3rd direction. In addition, the x-axis is perpendicular to the y-axis, and the z-axis is perpendicular to an xy plane (x-axis and y-axis) in the present embodiment.

The 1st liquid crystal cell 110a includes a 1st substrate 111a on which a 1st transparent electrode 181a, a 2nd transparent electrode 182a, a 5th transparent electrode 185a, a 6th transparent electrode 186a, a 9th transparent electrode 189a, and a 10th transparent electrode 190a are formed, and a 2nd substrate 121a on which a 3rd transparent electrode 183a, a 4th transparent electrode 184a, a 7th transparent electrode 187a, an 8th transparent electrode 188a, an 11th transparent electrode 191a, and a 12th transparent electrode 192a are formed.

A 1st alignment film 114a covering the 1st transparent electrode 181a, the 2nd transparent electrode 182a, the 5th transparent electrode 185a, the 6th transparent electrode 186a, the 9th transparent electrode 189a, and the 10th transparent electrode 190a is formed on the 1st substrate 111a.

In addition, a 2nd alignment film 124a covering the 3rd transparent electrode 183a, the 4th transparent electrode 184a, the 7th transparent electrode 187a, the 8th transparent electrode 188a, the 11th transparent electrode 191a, and the 12th transparent electrode 192a is formed on the 2nd substrate 121a.

In addition, the 1st transparent electrode 181a and the 2nd transparent electrode 182a on the 1st substrate 111a face the 3rd transparent electrode 183a and the 4th transparent electrode 184a on the 2nd substrate 121a. The 5th transparent electrode 185a and the 6th transparent electrode 186a on the 1st substrate 111a face the 7th transparent electrode 187a and the 8th transparent electrode 188a on the 2nd substrate 121a. The 9th transparent electrode 189a and the 10th transparent electrode 190a on the 1st substrate 111a face the 11th transparent electrode 191a and the 12th transparent electrode 192a on the 2nd substrate 121a.

A sealing material 150a is arranged on each peripheral part of the 1st substrate 111a and the 2nd substrate 121a to adhere the 1st substrate 111a and the 2nd substrate 121a. A liquid crystal layer 160a containing a liquid crystal is arranged in a space surrounded by the 1st substrate 111a (more specifically, the 1st alignment film 114a), the 2nd substrate 121a (more specifically, the 2nd alignment film 124a), and a sealing material 115.

The 2nd liquid crystal cell 110b includes the 1st substrate 111b on which a 1st transparent electrode 181b, a 2nd transparent electrode 182b, a 5th transparent electrode 185b, a 6th transparent electrode 186b, a 9th transparent electrode 189b, and a 10th transparent electrode 190b are formed, and a 2nd substrate 121b on which a 3rd transparent electrode 183b, a 4th transparent electrode 184b, a 7th transparent electrode 187b, an 8th transparent electrode 188b, an 11th transparent electrode 191b, and a 12th transparent electrode 192b are formed.

A 1st alignment film 114b covering the 1st transparent electrode 181b, the 2nd transparent electrode 182b, the 5th transparent electrode 185b, the 6th transparent electrode 186b, the 9th transparent electrode 189b, and the 10th transparent electrode 190b is formed on the 1st substrate 111b.

In addition, a 2nd alignment film 124b covering the 3rd transparent electrode 183b, the 4th transparent electrode 184b, the 7th transparent electrode 187b, the 8th transparent electrode 188b, the 11th transparent electrode 191b, and the 12th transparent electrode 192b is formed on the 2nd substrate 121b.

In addition, the 1st transparent electrode 181b and the 2nd transparent electrode 182b on the 1st substrate 111b face the 3rd transparent electrode 183b and the 4th transparent electrode 184b on the 2nd substrate 121b. The 5th transparent electrode 185b and the 6th transparent electrode 186b on the 1st substrate 111b face the 7th transparent electrode 187b and the 8th transparent electrode 188b on the 2nd substrate 121b. The 9th transparent electrode 189b and the 10th transparent electrode 190b on the 1st substrate 111b face the 11th transparent electrode 191b and the 12th transparent electrode 192b on the 2nd substrate 121b.

A sealing material 150b is arranged on each peripheral part of the 1st substrate 111b and the 2nd substrate 121b to adhere the 1st substrate 111b and the 2nd substrate 121b. A liquid crystal layer 160b containing a liquid crystal is arranged in a space surrounded by the 1st substrate 111b (more specifically, the 1st alignment film 114b), the 2nd substrate 121b (more specifically, the 2nd alignment film 124b), and the sealing material 115.

The 3rd liquid crystal cell 110c includes a 1st substrate 111c on which a 1st transparent electrode 181c, a 2nd transparent electrode 182c, a 5th transparent electrode 185c, a 6th transparent electrode 186c, a 9th transparent electrode 189c, and a 10th transparent electrode 190c are formed, and a 2nd substrate 121c on which a 3rd transparent electrode 183c, a 4th transparent electrode 184c, a 7th transparent electrode 187c, an 8th transparent electrode 188c, an 11th transparent electrode 191c, and a 12th transparent electrode 192c are formed.

A 1st alignment film 114c covering the 1st transparent electrode 181c, the 2nd transparent electrode 182c, the 5th transparent electrode 185c, the 6th transparent electrode 186c, the 9th transparent electrode 189c, and the 10th transparent electrode 190c is formed on the 1st substrate 111c.

In addition, a 2nd alignment film 124c covering the 3rd transparent electrode 183c, the 4th transparent electrode 184c, the 7th transparent electrode 187c, the 8th transparent electrode 188c, the 11th transparent electrode 191c, and the 12th transparent electrode 192c is formed on the 2nd substrate 121c.

In addition, the 1st transparent electrode 181c and the 2nd transparent electrode 182c on the 1st substrate 111c face the 3rd transparent electrode 183c and the 4th transparent electrode 184c on the 2nd substrate 121c. The 5th transparent electrode 185c and the 6th transparent electrode 186c on the 1st substrate 111c face the 7th transparent electrode 187c and the 8th transparent electrode 188c on the 2nd substrate 121c. The 9th transparent electrode 189c and the 10th transparent electrode 190c on the 1st substrate 111c face the 11th transparent electrode 191c and the 12th transparent electrode 192c on the 2nd substrate 121c.

A sealing material 150c is arranged on each peripheral part of the 1st substrate 111c and the 2nd substrate 121c to adhere the 1st substrate 111c and the 2nd substrate 121c. A liquid crystal layer 160c containing a liquid crystal is arranged in a space surrounded by the 1st substrate 111c (more specifically, the 1st alignment film 114c), the 2nd substrate 121c (more specifically, the 2nd alignment film 124c), and a sealing material 115c.

The 4th liquid crystal cell 110d includes a 1st substrate 111d on which a 1st transparent electrode 181d, a 2nd transparent electrode 182d, a 5th transparent electrode 185d, a 6th transparent electrode 186d, a 9th transparent electrode 189d, and a 10th transparent electrode 190d are formed, and a 2nd substrate 121d on which a 3rd transparent electrode 183d, a 4th transparent electrode 184d, a 7th transparent electrode 187d, an 8th transparent electrode 188d, an 11th transparent electrode 191d, and a 12th transparent electrode 192d are formed.

A 1st alignment film 114d covering the 1st transparent electrode 181d, the 2nd transparent electrode 182d, the 5th transparent electrode 185d, the 6th transparent electrode 186d, the 9th transparent electrode 189d, and the 10th transparent electrode 190d is formed on the 1st substrate 111d.

In addition, a 2nd alignment film 124d covering the 3rd transparent electrode 183d, the 4th transparent electrode 184d, the 7th transparent electrode 187d, the 8th transparent electrode 188d, the 11th transparent electrode 191d, and the 12th transparent electrode 192d is formed on the 2nd substrate 121d.

In addition, the 1st transparent electrode 181d and the 2nd transparent electrode 182d on the 1st substrate 111d face the 3rd transparent electrode 183d and the 4th transparent electrode 184d on the 2nd substrate 121d. The 5th transparent electrode 185d and the 6th transparent electrode 186d on the 1st substrate 111d face the 7th transparent electrode 187d and the 8th transparent electrode 188d on the 2nd substrate 121d. The 9th transparent electrode 189d and the 10th transparent electrode 190d on the 1st substrate 111d face the 11th transparent electrode 191d and the 12th transparent electrode 192d on the 2nd substrate 121d.

A sealing material 150d is arranged on each peripheral part of the 1st substrate 111d and the 2nd substrate 121d to adhere the 1st substrate 111d and the 2nd substrate 121d. A liquid crystal layer 160d containing a liquid crystal is arranged in a space surrounded by the 1st substrate 111d (more specifically, the 1st alignment film 114d), the 2nd substrate 121d (more specifically, the 2nd alignment film 124d), and a sealing material 115d.

The basic configurations of the 1st liquid crystal cell 110a, the 2nd liquid crystal cell 110b, the 3rd liquid crystal cell 110c, and the 4th liquid crystal cell 110d are the same. However, the arrangement of the 1st transparent electrode 181, the 2nd transparent electrode 182, the 3rd transparent electrode 183, the 4th transparent electrode 184, the 5th transparent electrode 185, the 6th transparent electrode 186, the 7th transparent electrode 187, the 8th transparent electrode 188, the 9th transparent electrode 189, the 10th transparent electrode 190, the 11th transparent electrode 191, and the 12th transparent electrode 192 is different.

In the 1st liquid crystal cell 110a, the 1st transparent electrode 181a, the 2nd transparent electrode 182a, the 5th transparent electrode 185a, the 6th transparent electrode 186a, the 9th transparent electrode 189a, and the 10th transparent electrode 190a extend in the y-axis direction, and the 3rd transparent electrode 183a, the 4th transparent electrode 184a, the 7th transparent electrode 187a, the 8th transparent electrode 188a, the 11th transparent electrode 191a, and the 12th transparent electrode 192a extend in the x-axis direction.

The 1st transparent electrode 181a and the 2nd transparent electrode 182a, the 5th transparent electrode 185a and the 6th transparent electrode 186a, and the 9th transparent electrode 189a and the 10th transparent electrode 190a are alternately arranged in a comb-tooth shape in the x-axis direction. The 3rd transparent electrode 183a and the 4th transparent electrode 184a, the 7th transparent electrode 187a and the 8th transparent electrode 188a, and the 11th transparent electrode 191a and the 12th transparent electrode 192a are alternately arranged in a comb-tooth shape in the 2nd direction. In a plan view, the direction (y-axis direction) in which the 1st transparent electrode 181a, the 2nd transparent electrode 182a, the 5th transparent electrode 185a, the 6th transparent electrode 186a, the 9th transparent electrode 189a, and the 10th transparent electrode 190a extend is perpendicular to a direction (x-axis direction) in which the 3rd transparent electrode 183a, the 4th transparent electrode 184a, the 7th transparent electrode 187a, the 8th transparent electrode 188a, the 11th transparent electrode 191a, and the 12th transparent electrode 192a extend, but they may be slightly deviated from each other and intersect with each other.

In the 2nd liquid crystal cell 110b, the 1st transparent electrode 181b, the 2nd transparent electrode 182b, the 5th transparent electrode 185b, the 6th transparent electrode 186b, the 9th transparent electrode 189b, and the 10th transparent electrode 190b extend in the y-axis direction, and the 7th transparent electrode 110b, the 8th transparent electrode 188b, the 11th transparent electrode 191b, and the 12th transparent electrode 192b extend in the x-axis direction.

The 1st transparent electrode 181b and the 2nd transparent electrode 182b, the 5th transparent electrode 185b and the 6th transparent electrode 186b, and the 9th transparent electrode 189b and the 10th transparent electrode 190b are alternately arranged in a comb-tooth shape in the x-axis direction. The 3rd transparent electrode 183b and the 4th transparent electrode 184b, the 7th transparent electrode 187b and the 8th transparent electrode 188b, and the 11th transparent electrode 191b and the 12th transparent electrode 192b are alternately arranged in a comb-tooth shape in the 2nd direction. In a plan view, a direction (y-axis direction) in which the 1st transparent electrode 181b, the 2nd transparent electrode 182b, the 5th transparent electrode 185b, the 6th transparent electrode 186b, the 9th transparent electrode 189b, and the 10th transparent electrode 190b extend is perpendicular to a direction (x-axis direction) in which the 3rd transparent electrode 183b, the 4th transparent electrode 184b, the 7th transparent electrode 188b, the 8th transparent electrode 191b, the 11th transparent electrode 191b, and the 12th transparent electrode 192b extend, but they may be slightly deviated from each other and intersect with each other.

The 1st transparent electrode 181c, the 2nd transparent electrode 182c, the 5th transparent electrode 185c, the 6th transparent electrode 186c, the 9th transparent electrode 189c, and the 10th transparent electrode 190c extend in the y-axis direction, and the 3rd transparent electrode 183c, the 4th transparent electrode 184c, the 7th transparent electrode 187c, the 8th transparent electrode 188c, the 11th transparent electrode 191c, and the 12th transparent electrode 192c extend in the x-axis direction in the 3rd liquid crystal cell 110c.

The 1st transparent electrode 181c and the 2nd transparent electrode 182c, the 5th transparent electrode 185c and the 6th transparent electrode 186c, and the 9th transparent electrode 189c and the 10th transparent electrode 190c are alternately arranged in a comb-tooth shape in the x-axis direction. The 3rd transparent electrode 183c and the 4th transparent electrode 184c, the 7th transparent electrode 187c and the 8th transparent electrode 188c, and the 11th transparent electrode 191c and the 12th transparent electrode 192c are alternately arranged in a comb-tooth shape in the 2nd direction. In a plan view, a direction (y-axis direction) in which the 1st transparent electrode 181c, the 2nd transparent electrode 182c, the 5th transparent electrode 185c, the 6th transparent electrode 186c, the 9th transparent electrode 189c, and the 10th transparent electrode 190c extend is perpendicular to a direction (x-axis direction) in which the 3rd transparent electrode 183c, the 4th transparent electrode 184c, the 7th transparent electrode 187c, the 8th transparent electrode 188c, the 11th transparent electrode 191c, and the 12th transparent electrode 192c extend, but they may be slightly deviated from each other and intersect with each other.

The 1st transparent electrode 181d, the 2nd transparent electrode 182d, the 5th transparent electrode 185d, the 6th transparent electrode 186d, the 9th transparent electrode 189d, and the 10th transparent electrode 190d extend in the y-axis direction, and the 3rd transparent electrode 183d, the 4th transparent electrode 184d, the 7th transparent electrode 187d, the 8th transparent electrode 188d, the 11th transparent electrode 191d, and the 12th transparent electrode 192d extend in the x-axis direction, in the 4th liquid crystal cell 110d.

The 1st transparent electrode 181d and the 2nd transparent electrode 182d, the 5th transparent electrode 185d and the 6th transparent electrode 186d, and the 9th transparent electrode 189d and the 10th transparent electrode 190d are alternately arranged in a comb-tooth shape in the x-axis direction. The 3rd transparent electrode 183d and the 4th transparent electrode 184d, the 7th transparent electrode 187d and the 8th transparent electrode 188d, and the 11th transparent electrode 191d and the 12th transparent electrode 192d are alternately arranged in a comb-tooth shape in the 2nd direction. In a plan view, a direction (y-axis direction) in which the 1st transparent electrode 181d, the 2nd transparent electrode 182d, the 5th transparent electrode 185d, the 6th transparent electrode 186d, the 9th transparent electrode 189d, and the 10th transparent electrode 190d extend is perpendicular to a direction (x-axis direction) in which the 3rd transparent electrode 183d, the 4th transparent electrode 184d, the 7th transparent electrode 187d, the 8th transparent electrode 188d, the 11th transparent electrode 191d, and the 12th transparent electrode 192d extend, but they may be slightly deviated from each other and intersect with each other.

In a plan view, extending directions (y-axis direction) of the 1st transparent electrodes 181 arranged in the 1st liquid crystal cell 110a, the 2nd liquid crystal cell 110b, the 3rd liquid crystal cell 110c, and the 4th liquid crystal cell 110d overlap each other so as to coincide with or substantially coincide with each other. Similarly, extending directions (y-axis direction or x-axis direction) of the same-named transparent electrodes arranged in the 1st liquid crystal cell 110a, the 2nd liquid crystal cell 110b, the 3rd liquid crystal cell 110c, and the 4th liquid crystal cell 110d overlap each other so as to coincide with or substantially coincide with each other. In addition, as shown in FIG. 4 and FIG. 5, in the 1st liquid crystal cell 110a and the 2nd liquid crystal cell 110b, the lower substrate (substrate on the light source side) of the pair of upper and lower substrates constituting each liquid crystal cell is the 1st substrate 111a and 111b. On the other hand, in the 3rd liquid crystal cell 110c and the 4th liquid crystal cell 110d, the upper substrate of the pair of upper and lower substrates forming each liquid crystal cell is the 1st substrate 111c and 111d.

For example, a rigid substrate with light transmittance or a flexible substrate with light transmittance may be used as the 1st substrate 111a, the 1st substrate 111b, the 1st substrate 111c, the 1st substrate 111d, the 2nd substrate 121a, the 2nd substrate 121b, the 2nd substrate 121c, and the 2nd substrate 121d. For example, the rigid substrate with light transmittance is a glass substrate, a quartz substrate, or a sapphire substrate. For example, the flexible substrate with light transmittance is a polyimide resin substrate, an acryl resin substrate, a siloxane resin substrate, or a fluororesin substrate.

The 1st transparent electrode 181, the 2nd transparent electrode 182, the 3rd transparent electrode 183, the 4th transparent electrode 184, the 5th transparent electrode 185, the 6th transparent electrode 186, the 7th transparent electrode 187, the 8th transparent electrode 188, the 9th transparent electrode 189, the 10th transparent electrode 190, the 11th transparent electrode 191, and the 12th transparent electrode 192 function as electrodes for forming an electric field in the liquid crystal layer 160 included in each liquid crystal cell. For example, the material forming the 1st transparent electrode 181, the 2nd transparent electrode 182, the 3rd transparent electrode 183, the 4th transparent electrode 184, the 5th transparent electrode 185, the 6th transparent electrode 186, the 7th transparent electrode 187, the 8th transparent electrode 188, the 9th transparent electrode 189, the 10th transparent electrode 190, the 11th transparent electrode 191, and the 12th transparent electrode 192 is a transparent conductive material. For example, the transparent conductive material is indium tin oxide (ITO) or indium zinc oxide (IZO).

The liquid crystal layer 160a, the liquid crystal layer 160b, the liquid crystal layer 160c, and liquid crystal layer 160d can refract the transmitted light or change the polarization state of the transmitted light depending on the orientation state of the liquid crystal molecules. For example, a twisted nematic liquid crystal can be used as the liquid crystal included in each of the layers of the liquid crystal layer 160a, the liquid crystal layer 160b, the liquid crystal layer 160c, and the liquid crystal layer 160d. Although a positive-type twisted nematic liquid crystal is used as the liquid crystal as an example in the present embodiment, a negative-type twisted nematic liquid crystal may be used as the liquid crystal by changing the initial orientation direction of the liquid crystal molecules. In addition, the liquid crystal preferably contains a chiral agent that imparts twist to the liquid crystal molecules.

Each of the 1st alignment film 114a, the 1st alignment film 114b, the 1st alignment film 114c, the 1st alignment film 114d, the 2nd alignment film 124a, the 2nd alignment film 124b, the 2nd alignment film 124c, and the 2nd alignment film 124d aligns the liquid crystal molecules in the liquid crystal layer 160 included in each liquid crystal cell in a predetermined direction. For example, polyimide resin may be used as the material for forming each of the 1st alignment film 114a, the 1st alignment film 114b, the 1st alignment film 114c, the 1st alignment film 114d, the 2nd alignment film 124a, the 2nd alignment film 124b, the 2nd alignment film 124c, and the 2nd alignment film 124d.

The 1st alignment film 114a, the 1st alignment film 114b, the 1st alignment film 114c, the 1st alignment film 114d, the 2nd alignment film 124a, the 2nd alignment film 124b, the 2nd alignment film 124c, and the 2nd alignment film 124d may be given alignment characteristics by an alignment treatment. For example, a rubbing method or an optical alignment method can be used as the alignment treatment. The rubbing method is a method of rubbing an alignment film in one direction. The optical alignment method is a method of irradiating an alignment film with linearly polarized ultraviolet rays.

For example, the sealing material 115 may be an epoxy resin adhesive or an acrylic resin adhesive. The adhesive material may be ultraviolet curable or thermosetting.

The liquid crystal optical element 10 includes at least two liquid crystal cells (for example, the 1st liquid crystal cell 110*a* and the 2nd liquid crystal cell 110*b*), so that the distribution of unpolarized light can be controlled. Therefore, each surface of the 1st substrate 111*a* of the 1st liquid crystal cell 110*a* and the 2nd substrate 121*b* of the 2nd liquid crystal cell 110*b*, and each surface of the 2nd substrate 121*c* of the 3rd liquid crystal cell 110*c* and the 1st substrate 111*b* of the 4th liquid crystal cell 110*d* do not need to be arranged with a pair of polarization plates such as those arranged on the front and back surfaces of the liquid crystal display element.

1-3. Arrangement of Transparent Electrodes

Figure 6:
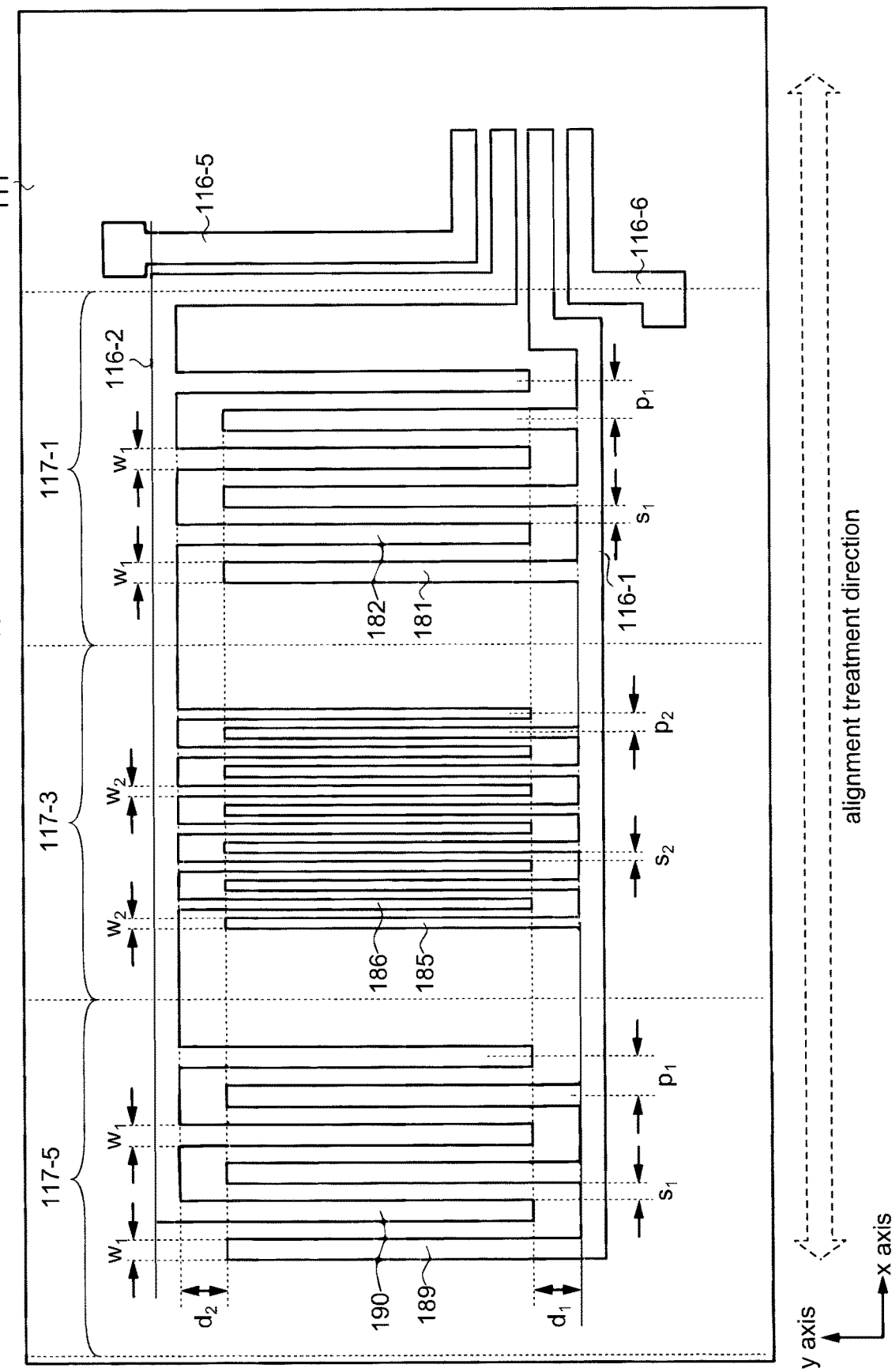
FIG. 6 is a schematic plan view showing an arrangement of a 1st transparent electrode, a 2nd transparent electrode, a 5th transparent electrode, a 6th transparent electrode, a 9th transparent electrode, and a 10th transparent electrode on a 1st substrate in a liquid crystal optical element according to an embodiment of the present invention.
Figure 7:
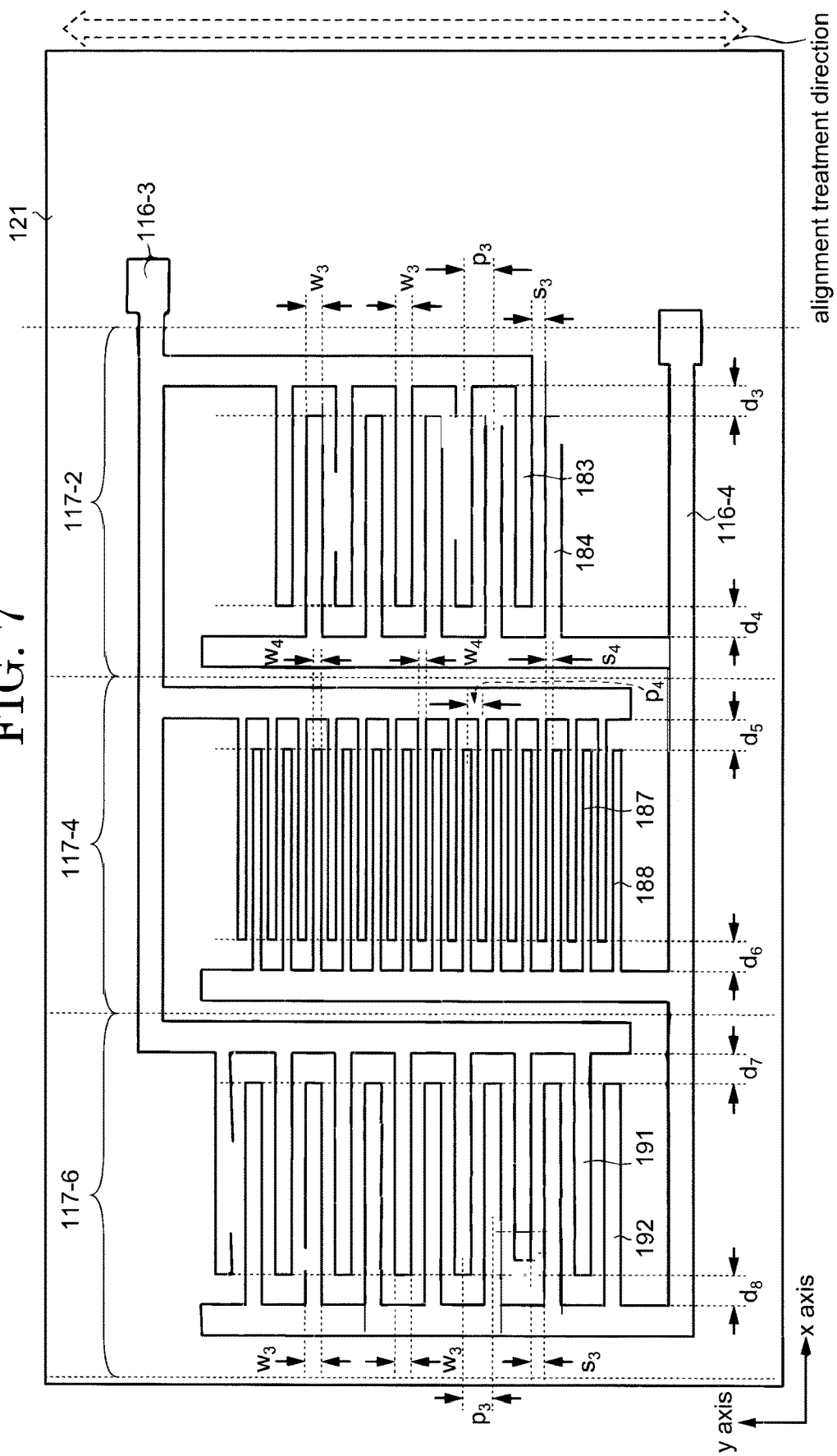
FIG. 7 is a schematic plan view showing an arrangement of a 3rd transparent electrode, a 4th transparent electrode, a 7th transparent electrode, an 8th transparent electrode, an 11th transparent electrode, and a 12th transparent electrode on a 2nd substrate in a liquid crystal optical element according to an embodiment of the present invention.

FIG. 6 is a schematic plan view showing an arrangement of the 1st transparent electrode 181, the 2nd transparent electrode 182, the 5th transparent electrode 185, the 6th transparent electrode 186, the 9th transparent electrode 189, and the 10th transparent electrode 190 on the 1st substrate 111 in the liquid crystal optical element 10 according to an embodiment of the present invention. FIG. 7 is a schematic plan view showing an arrangement of the 3rd transparent electrode 183, the 4th transparent electrode 184, the 7th transparent electrode 187, the 8th transparent electrode 188, the 11th transparent electrode 191, and the 12th transparent electrode 192 on the 2nd substrate 121. In addition, although electrode groups and wirings shown in FIG. 7 are visible through the 2nd substrate 121, they are shown by solid lines in FIG. 7 for clarity. The same applies to FIG. 25 described later.

A 1st electrode group 117-1, a 2nd electrode group 117-3, and a 3rd electrode group 117-5 are arranged on the 1st substrate 111 in the configuration of the transparent electrode shown in FIG. 6. The 2nd electrode group 117-3 is arranged between the 1st electrode group 117-1 and the 3rd electrode group 117-5. The 1st electrode group 117-1 is arranged so as to face the 1st optical element 40*a* and the light exit surface of the 1st optical element 40*a*, the 2nd electrode group 117-3 is arranged so as to face the 2nd optical element 40*b* and the light exit surface of the 2nd optical element 40*b*, and the 3rd electrode group 117-5 is arranged so as to face the 3rd optical element 40*c* and the light exit surface of the 3rd optical element 40*c*.

The 1st electrode group 117-1 includes the 1st transparent electrode 181 and the 2nd transparent electrode 182. The 1st electrode group 117-1 is supplied with voltage to the 1st transparent electrode 181 and the 2nd transparent electrode 182, and for example, has a function of transmitting or diffusing the light emitted from the 1st optical element 40*a* (see FIG. 1) used as the right-side light source. The 1st transparent electrode 181 and the 2nd transparent electrode 182 are alternately arranged in the x-axis direction and extend in the y-axis direction. A width of the 1st transparent electrode 181 and a width of the 2nd transparent electrode 182 are a 1st width $w_1$ in the x-axis direction. An inter-electrode distance (electrode interval) between the 1st transparent electrode 181 and the 2nd transparent electrode 182 in the x-axis direction is a 1st inter-electrode distance $s_1$. A pitch between the 1st transparent electrode 181 and the 2nd transparent electrode 182 is a 1st pitch $p_1$, and the 1st pitch $p_1$ satisfies $p_1=w_1+s_1$.

The 1st transparent electrode 181 and the 2nd transparent electrode 182 are electrically connected to a 1st wiring 116-1 and a 2nd wiring 116-2 formed on the 1st substrate 111, respectively. The 1st wiring 116-1 may be formed below the 1st transparent electrode 181 and may be formed above the 1st transparent electrode 181. In addition, the 1st wiring 116-1 may be formed in the same layer as the 1st transparent electrode 181. The 2nd wiring 116-2 may be formed below the 2nd transparent electrode 182 and may be formed above the 2nd transparent electrode 182. In addition, the 2nd wiring 116-2 may be formed in the same layer as the 2nd transparent electrodes 182. The 1st transparent electrode 181, the 2nd transparent electrode 182, the 1st wiring 116-1, and the 2nd wiring 116-2 are formed in the same layer in the present embodiment.

The 2nd electrode group 117-3 includes the 5th transparent electrode 185 and the 6th transparent electrode 186. The 2nd electrode group 117-3 is supplied with voltage to the 5th transparent electrode 185 and the 6th transparent electrode 186, and for example, has a function of transmitting or diffusing the light emitted from the 2nd optical element 40*b* (see FIG. 1) used as a center light source. The 5th transparent electrode 185 and the 6th transparent electrode 186 are alternately arranged in the x-axis direction and extend in the y-axis direction. A width of the 5th transparent electrode 185 and a width of the 6th transparent electrode 186 are a 2nd width $w_2$ in the x-axis direction. An inter-electrode distance (electrode interval) between the 5th transparent electrode 185 and the 6th transparent electrode 186 in the x-axis direction is a 2nd inter-electrode distance $s_2$. A pitch between the 5th transparent electrode 185 and the 6th transparent electrode 186 is a 2nd pitch $p_2$, and the 2nd pitch $p_2$ satisfies $p_2=w_2+s_2$.

The 5th transparent electrode 185 and the 6th transparent electrode 186 are electrically connected to the 1st wiring 116-1 and the 2nd wiring 116-2 formed on the 1st substrate 111, respectively. The 1st wiring 116-1 may be formed below the 5th transparent electrode 185 and may be formed above the 5th transparent electrode 185. In addition, the 1st wiring 116-1 may be formed in the same layer as the 5th transparent electrode 185. The 2nd wiring 116-2 may be formed below the 6th transparent electrode 186 and may be formed above the 6th transparent electrode 186. In addition, the 2nd wiring 116-2 may be formed in the same layer as the 6th transparent electrode 186. The 5th transparent electrode 185, the 6th transparent electrode 186, the 1st wiring 116-1, and the 2nd wiring 116-2 are formed in the same layer in the present embodiment.

The 2nd width $w_2$, the 2nd inter-electrode distance $s_2$, and the 2nd pitch $p_2$ of the 5th transparent electrode 185 and the 6th transparent electrode 186 are narrower than the 1st width $w_1$, the 1st inter-electrode distance $s_1$, and the 1st pitch $p_1$ of the 1st transparent electrode 181 and the 2nd transparent electrode 182.

The 3rd electrode group 117-5 includes the 9th transparent electrode 189 and the 10th transparent electrode 190. The 3rd electrode group 117-5 is supplied with voltage to the 9th transparent electrode 189 and the 10th transparent electrode 190, and for example, has a function of transmitting or diffusing the light emitted from the 3rd optical element 40*c* (see FIG. 1) used as the left-side light source. Since the 9th transparent electrode 189 and the 10th transparent electrode 190 have the same configuration and function as those of the 1st transparent electrode 181 and the 2nd transparent electrode 182, detailed descriptions thereof will be omitted. In addition, the functions of the 1st electrode group 117-1 and the 3rd electrode group 117-5 may be interchanged.

The 1st alignment film 114a is subjected to an alignment treatment in the x-axis direction (the direction indicated by a white arrow in FIG. 6). In this case, among the liquid crystal molecules constituting the liquid crystal layer 160a, the long axis of the liquid crystal molecule on the 1st substrate 111 side is aligned along the x-axis direction. That is, an orientation direction (x-axis direction) of the 1st alignment film 114a is perpendicular to an extending direction (y-axis direction) of the 1st transparent electrode 181, the 2nd transparent electrode 182, the 5th transparent electrode 185, the 6th transparent electrode 186, the 9th transparent electrode 189, and the 10th transparent electrode 190.

In the configuration of the transparent electrode shown in FIG. 7, a 4th electrode group 117-2, a 5th electrode group 117-4, and a 6th electrode group 117-6 are arranged on the 2nd substrate 121. The 5th electrode group 117-4 is arranged between the 4th electrode group 117-2 and the 6th electrode group 117-6. In addition, the 4th electrode group 117-2 is arranged so as to face the 1st optical element 40a and the light exit surface of the 1st optical element 40a, the 5th electrode group 117-4 is arranged so as to face the 2nd optical element 40b and the light exit surface of the 2nd optical element 40b, and the 6th electrode group 117-6 is arranged so as to face the 3rd optical element 40c and the light exit surface of the 3rd optical element 40c.

The 4th electrode group 117-2 includes the 3rd transparent electrode 183 and the 4th transparent electrode 184. The 4th electrode group 117-2 is supplied with voltage to the 3rd transparent electrode 183 and the 4th transparent electrode 184, and for example, has a function of transmitting or diffusing the light from the 1st optical element 40a (see FIG. 1) as the right-side light source. The 3rd transparent electrode 183 and the 4th transparent electrode 184 are alternately arranged in the y-axis direction and extend in the x-axis direction. A width of the 3rd transparent electrode 183 and a width of the 4th transparent electrode 184 are a 3rd width $w_3$ in the x-axis direction. An inter-electrode distance (electrode interval) between the 3rd transparent electrode 183 and the 4th transparent electrode 184 in the x-axis direction is a 3rd inter-electrode distance $s_3$. A pitch between the 3rd transparent electrode 183 and the 4th transparent electrode 184 is a 3rd pitch $p_3$, and the 3rd pitch $p_3$ satisfies $p_3=w_3+s_3$.

The 3rd transparent electrode 183 and the 4th transparent electrode 184 are electrically connected to a 3rd wiring 116-3 and a 4th wiring 116-4 formed on the 2nd substrate 121, respectively. The 3rd wiring 116-3 may be formed below the 3rd transparent electrode 183 and may be formed above the 3rd transparent electrode 183. In addition, the 3rd wiring 116-3 may be formed in the same layer as the 3rd transparent electrode 183. The 4th wiring 116-4 may be formed below the 4th transparent electrode 184 and may be formed above the 4th transparent electrode 184. In addition, the 4th wiring 116-4 may be formed in the same layer as the 4th transparent electrode 184. The 3rd transparent electrode 183, the 4th transparent electrode 184, the 3rd wiring 116-3, and the 4th wiring 116-4 are formed in the same layer in the present embodiment.

The 5th electrode group 117-4 includes the 7th transparent electrode 187 and the 8th transparent electrode 188. The 5th electrode group 117-4 is supplied with voltage to the 7th transparent electrode 187 and the 8th transparent electrode 188, and for example, has a function of transmitting or diffusing the light from the 2nd optical element 40b (see FIG. 1) as the center light source. The 7th transparent electrode 187 and the 8th transparent electrode 188 are alternately arranged in the y-axis direction and extend in the x-axis direction. A width of the 7th transparent electrode 187 and a width of the 8th transparent electrode 188 are a 4th width $w_4$ in the x-axis direction. An inter-electrode distance (electrode interval) between the 7th transparent electrode 187 and the 8th transparent electrode 188 in the x-axis direction is a 4th inter-electrode distance $s_4$. A pitch between the 7th transparent electrode 187 and the 8th transparent electrode 188 is a 4th pitch $p_4$, and the 4th pitch $p_4$ satisfies $p_4=w_4+s_4$.

The 7th transparent electrode 187 and the 8th transparent electrode 188 are electrically connected to the 3rd wiring 116-3 and the 4th wiring 116-4 formed on the 2nd substrate 121, respectively. The 3rd wiring 116-3 may be formed below the 7th transparent electrode 187 and may be formed above the 7th transparent electrode 187. In addition, the 3rd wiring 116-3 may be formed in the same layer as the 7th transparent electrode 187. The 4th wiring 116-4 may be formed below the 8th transparent electrode 188 and may be formed above the 8th transparent electrode 188. In addition, the 4th wiring 116-4 may be formed in the same layer as the 8th transparent electrode 188. The 7th transparent electrode 187, the 8th transparent electrode 188, the 3rd wiring 116-3, and the 4th wiring 116-4 are formed in the same layer in the present embodiment.

The 4th width $w_4$, the 4th inter-electrode distance $s_4$, and the 4th pitch $p_4$ of the 7th transparent electrode 187 and the 8th transparent electrode 188 are narrower than the 3rd width $w_3$, the 3rd inter-electrode distance $s_3$, and the 3rd pitch $p_3$ of the 3rd transparent electrode 183 and the 4th transparent electrode 184.

The 6th electrode group 117-6 includes the 11th transparent electrode 191 and the 12th transparent electrode 192. The 6th electrode group 117-6 is supplied with voltage to the 11th transparent electrode 191 and the 12th transparent electrode 192, and for example, has a function of transmitting or diffusing the light from the 3rd optical element 40c (see FIG. 1) as the left-side light source. Since the 11th transparent electrode 191 and the 12th transparent electrode 192 have the same configuration and function as those of the 3rd transparent electrode 183 and the 4th transparent electrode 184, detailed descriptions thereof will be omitted. In addition, the functions of the 4th electrode group 117-2 and the 6th electrode group 117-6 may be interchanged.

The 2nd alignment film 124 is subjected to an alignment treatment in the y-axis direction (the direction indicated by a white arrow in FIG. 7). In this case, among the liquid crystal molecules constituting the liquid crystal layer 160, the long axis of the liquid crystal molecule on the 2nd substrate 121 side is aligned along the y-axis direction. That is, an orientation direction (y-axis direction) of the 2nd alignment film 124 is perpendicular to an extending direction (x-axis direction) of the 3rd transparent electrode 183, the 4th transparent electrode 184, the 7th transparent electrode 187, the 8th transparent electrode 188, the 11th transparent electrode 191, and the 12th transparent electrode 192.

The 1st transparent electrode 181 and the 2nd transparent electrode 182 can be said to be formed on the 1st substrate 111 in a comb-tooth pattern having the 1st pitch $p_1$, the 5th transparent electrode 185 and the 6th transparent electrode 186 can be said to be formed on the 1st substrate 111 in a comb-tooth pattern having the 2nd pitch $p_2$, and the 9th transparent electrode 189 and the 10th transparent electrode 190 can be said to be formed on the 1st substrate 111 in a comb-tooth pattern having the 1st pitch $p_1$. Similarly, the 3rd transparent electrode 183 and the 4th transparent electrode 184 can be said to be formed on the 2nd substrate 121 in a comb-tooth pattern having the 3rd pitch $p_3$, the 7th transparent electrode 187 and the 8th transparent electrode 188 can be said to be formed on the 2nd substrate 121 in a comb-tooth pattern having the 4th pitch $p_4$, and the 11th transparent electrode 191 and the 12th transparent electrode 192 can be said to be formed on the 2nd substrate 121 in a comb-tooth pattern having the 3rd pitch $p_3$.

The 1st transparent electrode 181 and the 2nd transparent electrode 182 face the 3rd transparent electrode 183 and the 4th transparent electrode 184 with a liquid crystal layer 113 interposed therebetween in the 1st liquid crystal cell 110*a*. The 5th transparent electrode 185 and the 6th transparent electrode 186 face the 7th transparent electrode 187 and the 8th transparent electrode 188 with the liquid crystal layer 113 interposed therebetween in the 1st liquid crystal cell 110*a*. The 9th transparent electrode 189 and the 10th transparent electrode 190 face the 11th transparent electrode 191 and the 12th transparent electrode 192 with the liquid crystal layer 113 interposed therebetween in the 1st liquid crystal cell 110*a*.

In this case, the direction (y-axis direction) in which the 1st transparent electrode 181, the 2nd transparent electrode 182, the 5th transparent electrode 185, the 6th transparent electrode 186, the 9th transparent electrode 189, and the 10th transparent electrode 190 extend is perpendicular to the direction (x-axis direction) in which the 3rd transparent electrode 183, the 4th transparent electrode 184, the 7th transparent electrode 187, the 8th transparent electrode 188, the 11th transparent electrode 191, and the 12th transparent electrode 192 extend. In other words, the comb-shaped electrode pattern formed on the 1st substrate 111 and the comb-shaped electrode pattern formed on the 2nd substrate 121 are perpendicular to each other in a plan view.

In addition, a 5th wiring 116-5 and a 6th wiring 116-6 are formed in the 1st substrate 111. When the 1st substrate 111 is bonded to the 2nd substrate 121, the 3rd wiring 116-3 and the 4th wiring 116-4 are electrically connected to the 5th wiring 116-5 and the 6th wiring 116-6 arranged in the 1st substrate 111, respectively. In addition, as shown in FIG. 4 and FIG. 5, each electrode shown in FIG. 6 and FIG. 7 is arranged on a surface on which the liquid crystal layer is arranged with respect to each substrate, which is opposite to a surface in contact with the transparent adhesive layer. In other words, each electrode shown in FIG. 6 and FIG. 7 is arranged on surfaces (opposing surfaces) facing each other with respect to each substrate via the liquid crystal layer. For example, when the 1st substrate 111 is in a plan view from the light-emitting side of the liquid crystal optical element 10 (opposite side to the side on which the light source 20 is arranged in the z-axis direction), each electrode shown in FIG. 6 is arranged on the surface (facing surface) of the 1st substrate 111*a* in the 1st liquid crystal cell 110*a*, and is arranged on the back surface (facing surface) of the 1st substrate 111*c* in the 3rd liquid crystal cell 110*c*. For example, when the 2nd substrate 121 is in a plan view from the light-emitting side of the liquid crystal optical element 10, each electrode shown in FIG. 7 is arranged on the back surface (facing surface) of the 2nd substrate 121*a* in the 1st liquid crystal cell 110*a*, and is arranged on the surface (facing surface) of the 2nd substrate 121*c* in the 3rd liquid crystal cell 110*c*.

For example, the 3rd wiring 116-3 and the 5th wiring 116-5 and the 4th wiring 116-4 and the 6th wiring 116-6 can be electrically connected using silver paste or conductive particles. In addition, the conductive particles include metal-coated particles.

The 1st direction in which the 1st transparent electrode 181 and the 2nd transparent electrode 182 are alternately arranged is perpendicular to the 2nd direction in which the 3rd transparent electrode 183 and the 4th transparent electrode 184 are alternately arranged, but they only need to be crossed in the present embodiment. Similarly, the 1st direction in which the 5th transparent electrode 185 and the 6th transparent electrode 186 are alternately arranged is perpendicular to the 2nd direction in which the 7th transparent electrode 187 and the 8th transparent electrode 188 are alternately arranged are orthogonal, but they only need to be crossed. In addition, the 1st direction in which the 9th transparent electrode 189 and the 10th transparent electrode 190 are alternately arranged is perpendicular to the 2nd direction in which the 11th transparent electrode 191 and the 12th transparent electrode 192 are alternately arranged, but they only need to be crossed. The intersection angle is preferably in the range of 90±10 degrees, and more preferably in the range of 90±5 degrees, as well as 90 degrees.

A photo spacer for holding an interval between the 1st substrate 111 and the 2nd substrate 121 is formed (not shown) on a side of the 1st substrate 111 opposite to the 2nd substrate 121 or on a side of the 2nd substrate 121 opposite to the 1st substrate 111.

The material forming the 1st wiring 116-1, the 2nd wiring 116-2, the 3rd wiring 116-3, the 4th wiring 116-4, the 5th wiring 116-5, and the 6th wiring 116-6 may be a metal material or a transparent conductive material. For example, the metal material or the transparent conductive material is aluminum, molybdenum, indium-tin oxide (ITO), or indium-zinc oxide (IZO). In addition, terminals for connecting to an external device may be arranged in the 1st wiring 116-1, the 2nd wiring 116-2, the 3rd wiring 116-3, the 4th wiring 116-4, the 5th wiring 116-5, and the 6th wiring 116-6, and the 1st wiring 116-1, the 2nd wiring 116-2, the 3rd wiring 116-3, the 4th wiring 116-4, the 5th wiring 116-5, and the 6th wiring 116-6 may be the terminals for connecting to an external device.

The 1st wiring 116-1, the 2nd wiring 116-2, the 5th wiring 116-5 (or the 3rd wiring 116-3), and the 6th wiring 116-6 (or the 4th wiring 116-4) are electrically insulated from each other. Therefore, the 1st transparent electrode 181*a*, the 5th transparent electrode 185*a*, the 9th transparent electrode 189*a*, the 2nd transparent electrode 182*a*, the 6th transparent electrode 186*a*, the 10th transparent electrode 190*a*, the 3rd transparent electrode 183*a*, the 7th transparent electrode 187*a*, the 11th transparent electrode 191*a*, the 4th transparent electrode 184*a*, the 8th transparent electrode 188*a* and the 12th transparent electrode 192*a* are independently controlled in the 1st liquid crystal cell 110*a*. The orientation of liquid crystal molecules of the liquid crystal layer 113 can be controlled using each transparent electrode. For example, the 1st transparent electrode 181*a*, the 5th transparent electrode 185*a*, and the 9th transparent electrode 189*a* are supplied with a 1st voltage V1, the 2nd transparent electrode 182*a*, the 6th transparent electrode 186*a*, and the 10th transparent electrode 190*a* are supplied with a 2nd voltage V2, the 3rd transparent electrode 183*a*, the 7th transparent electrode 187*a*, and the 11th transparent electrode 191*a* are supplied with a 3rd voltage V3, and the 4th transparent electrode 184*a*, the 8th transparent electrode 188*a*, and the 12th transparent electrode 192*a* are supplied with a 4th voltage V4. In addition, the 1st voltage V1, the 2nd voltage V2, the 3rd voltage V3, and the 4th voltage V4 may be different from each other, or may be the same voltage.

Since the 1st transparent electrode 181 and the 2nd transparent electrode 182 included in the 1st electrode group 117-1 of the 1st substrate 111 intersect the 3rd transparent electrode 183 and the 4th transparent electrode 184 included in the 4th electrode group 117-2 of the 2nd substrate 121, the lighting device 30 according to the present embodiment can control the orientation of the liquid crystal of the liquid crystal layer 113 by controlling the voltage supplied to each transparent electrode. In addition, since the 5th transparent electrode 185 and the 6th transparent electrode 186 included in the 2nd electrode group 117-3 of the 1st substrate 111 intersect the 7th transparent electrode 187 and the 8th transparent electrode 188 included in the 5th electrode group 117-4 of the 2nd substrate 121, the lighting device 30 according to the present embodiment can control the orientation of the liquid crystal of the liquid crystal layer 113 by controlling the voltage supplied to each transparent electrode. In addition, since the 9th transparent electrode 189 and the 10th transparent electrode 190 included in the 3rd electrode group 117-5 of the 1st substrate 111 intersect the 11th transparent electrode 191 and the 12th transparent electrode 192 included in the 6th electrode group 117-6 of the 2nd substrate 121, the lighting device 30 according to the present embodiment can control the orientation of the liquid crystal of the liquid crystal layer 113 by controlling the voltages supplied to each transparent electrode. As a result, the liquid crystal optical element 10 can transmit or diffuse the light from three different directions emitted from the 1st optical element 40a, the 2nd optical element 40b, and the 3rd optical element 40c to the right side using the 1st electrode group 117-1 and the 4th electrode group 117-2, and can transmit or diffuse the light to the center using the 2nd electrode group 117-3 and the 5th electrode group 117-4, and can transmit or diffuse the light to the left side using the 3rd electrode group 117-5 and the 6th electrode group 117-6.

In addition, in the liquid crystal optical element 10 according to the present embodiment, narrowing the width, the inter-electrode distance, and the pitch between electrodes of the transparent electrodes of the 2nd electrode group 117-3 arranged at the center or the approximate center of the 1st substrate 111 and the 5th electrode group 117-4 arranged at the center or the approximate center of the 2nd substrate 121 makes it possible to control the range in which the liquid crystal is aligned within a narrow range when the voltage is supplied to the transparent electrodes arranged in the 2nd electrode group 117-3 and the 5th electrode group 117-4. That is, in the liquid crystal optical element 10 according to the present embodiment, the 1st liquid crystal cell 110a and the 2nd liquid crystal cell 110b having the same transparent electrode arrangement are stacked, and the degree of light diffusion in the x-axis direction of the light diffusing to the center or the approximate center can be controlled more finely. In addition, the 3rd liquid crystal cell 110c and the 4th liquid crystal cell 110d having the same transparent electrode arrangement are stacked on the 1st liquid crystal cell 110a and the 2nd liquid crystal cell 110b having the same transparent electrode arrangement in the liquid crystal optical element 10 according to the present embodiment, and the degree of light diffusion in the y-axis direction of the light diffusing to the center or the approximate center can be controlled more finely. As a result, the light from the 2nd optical element 40b arranged at the center or the approximate center can be more finely diffused in the horizontal and vertical directions, and the light distribution and the light distribution pattern in the horizontal and vertical directions can be more finely controlled.

In addition, an end portion of the 2nd transparent electrode 182, an end portion of the 6th transparent electrode 186, and an end portion of the 10th transparent electrode 190 are arranged at a distance $d_1$ from the 1st wiring 116-1 in the liquid crystal optical element 10 according to the present embodiment. An end portion of the 1st transparent electrode 181, an end portion of the 5th transparent electrode 185, and an end portion of the 9th transparent electrode 189 are arranged at a distance $d_2$ from the 2nd wiring 116-2. An end portion of the 4th transparent electrode 184 is arranged at a distance $d_3$ from the 3rd wiring 116-3. An end portion of the 8th transparent electrode 188 is arranged at a distance $d_5$ from the 3rd wiring 116-3. An end portion of the 12th transparent electrode 192 is arranged at a distance $d_7$ from the 3rd wiring 116-3. An end portion of the 3rd transparent electrode 183 is arranged at a distance $d_4$ from the 4th wiring 116-4. An end portion of the 7th transparent electrode 187 is arranged at a distance $d_6$ from the 4th wiring 116-4. An end portion of the 11th transparent electrode 191 is arranged at a distance $d_8$ from the 4th wiring 116-4. The distance $d_1$ and the distance $d_2$ are greater than the 1st inter-electrode distance $s_1$ and the 2nd inter-electrode distance $s_2$. The distance $d_3$, the distance $d_4$, the distance $d_5$, the distance $d_6$, the distance $d_7$, and the distance $d_8$ are greater than the 3rd inter-electrode distance $s_3$ and the 4th inter-electrode distance $s_4$. Since the end portions of the transparent electrodes are arranged separate from the wiring 116 connecting the transparent electrodes, the electric field generated between the end portion of the transparent electrode and the wiring 116 can be reduced to a negligible level with respect to the magnitude of a transverse electric field generated between the transparent electrodes. Therefore, in the lighting device 30 according to the present embodiment, the effect of the electric field generated between the end portion of the transparent electrode and the wiring 116 can be suppressed. An electric field generated between adjacent transparent electrodes may be referred to as the transverse electric field in the present embodiment.

1-4. Control of Light Distribution by Liquid Crystal Optical Element 10

Figure 9:
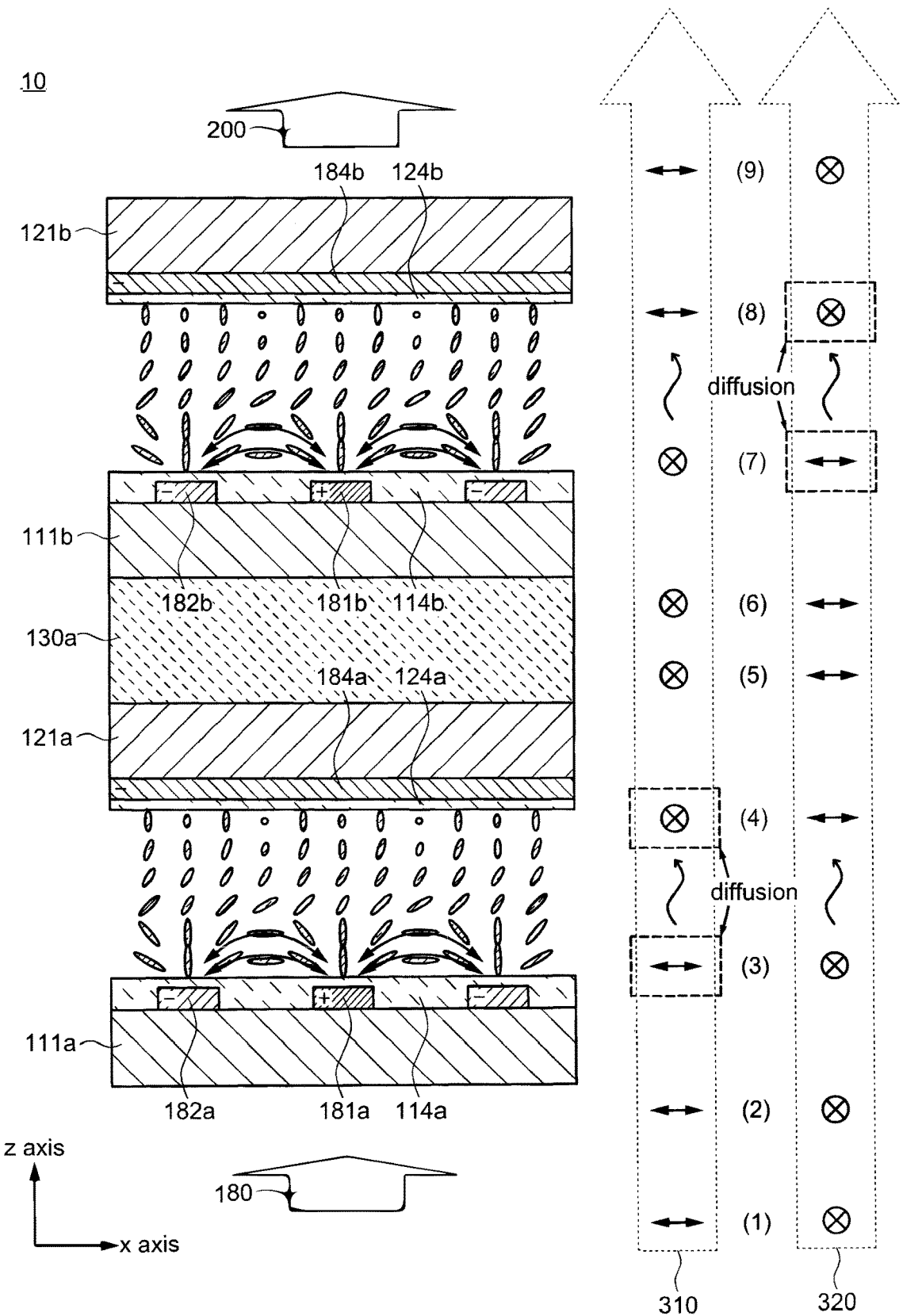
FIG. 9 is a schematic end portion cross-sectional view showing an orientation of a liquid crystal in a liquid crystal layer in a liquid crystal optical element according to an embodiment of the present invention.

FIG. 8 and FIG. 9 are schematic end portion cross-sectional views showing the orientation of the liquid crystal molecules of the liquid crystal layer 160a in the liquid crystal optical element 10 according to an embodiment of the present invention. FIG. 8 and FIG. 9 respectively correspond to portions of an end portion cross-sectional view of the 1st liquid crystal cell 110a and the 2nd liquid crystal cell 110b along a line A1-A2 shown in FIG. 3. Hereinafter, a configuration of the 1st liquid crystal cell 110a or the 2nd liquid crystal cell 110b will be mainly described.

The liquid crystal optical element 10 in a state where no voltage is supplied to the 1st transparent electrode 181a, the 2nd transparent electrode 182a, the 4th transparent electrode 184a, the 1st transparent electrode 181b, the 2nd transparent electrode 182b, and the 4th transparent electrode 184b is shown in FIG. 8. The liquid crystal optical element 10 in a state where voltages are supplied to the 1st transparent electrode 181a, the 2nd transparent electrode 182a, the 4th transparent electrode 184a, the 1st transparent electrode 181b, the 2nd transparent electrode 182b, and the 4th transparent electrode 184b is shown in FIG. 9. Specifically, a Low voltage is supplied to the 1st transparent electrode 181a and the 4th transparent electrode 184a of the 1st liquid crystal cell 110a, and a High voltage is supplied to the 2nd transparent electrode 182a and the 3rd transparent electrode 183a (not shown). Similarly, the Low voltage is supplied to the 1st transparent electrode 181b and the 4th transparent electrode 184b of the 2nd liquid crystal cell 110b, and the High voltage is supplied to the 2nd transparent electrode 182b and the 3rd transparent electrode 183b (not shown). For convenience, the Low voltage and the High voltage are illustrated using symbols "−" and "+", respectively in FIG. 9. An electric field generated between adjacent transparent electrodes may be referred to as a transverse electric field in the present embodiment.

The 1st alignment film 114a is subjected to an alignment treatment in the x-axis direction. The long axis of the liquid crystal molecule on the 1st substrate 111a side of the liquid crystal layer 160a is aligned in the x-axis direction as shown in FIG. 8. That is, the orientation direction of the liquid crystal molecules on the 1st substrate 111a side is a direction perpendicular to an extending direction (y-axis direction) of the 1st transparent electrode 181a and the 2nd transparent electrode 182a. In addition, the 2nd alignment film 124a is subjected to an alignment treatment in the y-axis direction. Further, the long axis of the liquid crystal molecule on the 2nd substrate 121a of the liquid crystal layer 160a is aligned in the y-axis direction. That is, the orientation direction of the liquid crystal molecule on the 2nd substrate 121a side of the liquid crystal layer 160a is a direction perpendicular to the extending direction (x-axis direction) of the 4th transparent electrode 184a and the 3rd transparent electrode 183a (see FIG. 7). Therefore, the liquid crystal molecules of the liquid crystal layer 160a gradually change the orientation of the long axis from the x-axis direction to the y-axis direction from the 1st substrate 111a toward the 2nd substrate 121a, and are oriented with a 90-degree twist.

When a voltage is supplied to the transparent electrode, the orientation direction of the liquid crystal molecules changes as shown in FIG. 9. Due to the effect of the transverse electric field between the 1st transparent electrode 181a and the 2nd transparent electrode 182a of the liquid crystal layer 160a, the liquid crystal molecules on the 1st substrate 111a side of the liquid crystal layer 160a generally align in an arc convex in the x-direction with respect to the 1st substrate 111a. Similarly, due to the effect of the transverse electric field between the 4th transparent electrode 184a and the 3rd transparent electrode 183a of the liquid crystal layer 160a, the liquid crystal molecules on the 2nd substrate 121a side of the liquid crystal layer 160a generally align in an arc convex in the y-axis direction with respect to the 2nd substrate 121a. The liquid crystal molecules of the liquid crystal layer 160a positioned approximately in the center between the 1st transparent electrode 181a and the 2nd transparent electrode 182a hardly change their orientation due to any transverse electric field. Therefore, the light incident on the liquid crystal layer 160a is diffused in the x-axis direction according to the refractive index distribution of the liquid crystal molecule aligned in an arc convex in the x-axis direction on the 1st substrate 111a side, and is diffused in the y-axis direction according to the refractive index distribution of the liquid crystal molecule aligned in an arc convex in the y-axis direction on the 2nd substrate 121a side.

In addition, since the 1st substrate 111a and the 2nd substrate 121a have a sufficiently large distance between substrates, the transverse electric field between the 1st transparent electrode 181a and the 2nd transparent electrode 182a of the 1st substrate 111a has no or negligible effect on the orientation of the liquid crystal molecules on the 2nd substrate 121a. Similarly, the transverse electric field between the 4th transparent electrode 184a and the 3rd transparent electrode 183a of the 2nd substrate 121a has no or negligible effect on the orientation of liquid crystal molecules of the 1st substrate 111a.

Since the liquid crystal molecules of the liquid crystal layer 160b in the case where a voltage is supplied to the 1st transparent electrode 181b to the 4th transparent electrode 184b are also the same as the liquid crystal molecules of the liquid crystal layer 160a, the explanation thereof will be omitted here.

Next, the light distribution of the light transmitted through the liquid crystal optical element 10 will be described. Although the light emitted from a light source has a polarized component (P-polarized component) in the x-axis direction and a polarized component (S-polarized component) in the y-axis direction, the light is divided into the P-polarized component and the S-polarized component for convenience. That is, the light emitted from the light source (see (1) in FIG. 8 and FIG. 9) includes a 1st polarized light 310 having the P-polarized component and a 2nd polarized light 320 having the S-polarized component. In addition, a symbol indicated by an arrow and a symbol indicated by a circle with a cross in FIG. 8 and FIG. 9 represent the P-polarized light component and the S-polarized light component, respectively. Further, the light emitted from the light source is light (an incident light 180) that is incident on the liquid crystal optical element 10.

The 1st polarized light 310 is incident on the 1st substrate 111a and then changes from the P-polarized light component to the S-polarized light component according to the twist of the orientation of the liquid crystal molecules toward the 2nd substrate 121a (see (2) to (4) in FIG. 8 and FIG. 9). More specifically, the 1st polarized light 310 has a polarization axis in the x-axis direction on the 1st substrate 111a side, but gradually changes its polarization axis while passing through the liquid crystal layer 160a in a thickness direction. In addition, the 1st polarized light 310 has a polarization axis in the y-axis direction on the 2nd substrate 121a side, and is then emitted from the 2nd substrate 121a side (see (5) in FIG. 8 and FIG. 9).

In this case, when the transverse electric field is generated between the 1st transparent electrode 181a and the 2nd transparent electrode 182a, the liquid crystal molecules on the 1st substrate 111a side are aligned in an arc convex in the x-axis direction due to the effect of the transverse electric field, and the refractive index distribution changes. Therefore, the 1st polarized light 310 diffuses in the x-axis direction according to the refractive index distribution of the liquid crystal molecules. In addition, when the transverse electric field is generated between the 4th transparent electrode 184a and the 3rd transparent electrode 183a, the liquid crystal molecules on the 2nd substrate 121a side are aligned in an arc convex in the y-axis direction due to the effect of the transverse electric field, and the refractive index distribution changes. Therefore, the 1st polarized light 310 diffuses in the y-axis direction according to the change in the refractive index distribution of the liquid crystal molecules.

Therefore, in the case where no transverse electric field is generated (see FIG. 8), the polarized component of the 1st polarized light 310 transmitted through the 1st liquid crystal cell 110a changes from the P-polarized light component to the S-polarized light component. On the other hand, in the case where a transverse electric field is generated (see FIG. 9), the polarized component of the 1st polarized light 310 transmitted through the 1st liquid crystal cell 110a changes from the P-polarized light component to the S-polarized light component and diffuses in the x-axis direction and the y-axis direction.

The 2nd polarized light 320 is incident on the 1st substrate 111a and then changes from the S-polarized light component to the P-polarized light component according to the twist of the orientation of the liquid crystal molecules toward the 2nd substrate 121a (see (2) to (4) in FIG. 8 and FIG. 9). More specifically, the 2nd polarized light 320 has a polarization axis in the y-axis direction on the 1st substrate 111a side, but gradually changes its polarization axis while passing through the liquid crystal layer 160a in the thickness direction. In addition, the 2nd polarized light 320 has a polarization axis in the x-axis direction on the 2nd substrate 121a side, and is then emitted from the 2nd substrate 121a side (see (5) in FIG. 8 and FIG. 9).

In this case, when the transverse electric field is generated between the 1st transparent electrode 181a and the 2nd transparent electrode 182a, the liquid crystal molecules on the 1st substrate 111a side are aligned in an arc convex in the x-axis direction due to the effect of the transverse electric field, and the refractive index distribution changes. However, the polarization axis of the 2nd polarized light 320 is not affected by the refractive index distribution of the liquid crystal molecules and passes without being diffused because it is perpendicular to the orientation of the liquid crystal molecules on the 1st substrate 111a side. In addition, when the transverse electric field is generated between the 4th transparent electrode 184a and the 3rd transparent electrode 183a, the liquid crystal molecules on the 2nd substrate 121a side are aligned in an arc convex in the y-axis direction due to the effect of the transverse electric field, and the refractive index distribution changes. However, the polarization axis of the 2nd polarized light 320 is not affected by the refractive index distribution of the liquid crystal molecules and passes without being diffused because it is perpendicular to the orientation of the liquid crystal molecules on the second substrate 121a side.

Therefore, not only in the case where the transverse electric field is not generated (see FIG. 8), but also in the case where the transverse electric field is generated (see FIG. 9), the polarized component of the 2nd polarized light 320 transmitted through the 1st liquid crystal cell 110a changes from the S-polarized light component to the P-polarized light component, but does not diffuse.

The liquid crystal molecules of the liquid crystal layer 160b of the 2nd liquid crystal cell 110b also have a refractive index distribution similar to the liquid crystal molecules of the liquid crystal layer 160a of the 1st liquid crystal cell 110a. However, since the polarization axes of the 1st polarized light 310 and the 2nd polarized light 320 are changed by being transmitted through the 1st liquid crystal cell 110a, the polarization influenced by the refractive index distribution of the liquid crystal molecules of the liquid crystal layer 160b is reversed. That is, not only in the case where the transverse electric field is not generated (see FIG. 8), but also in the case where the transverse electric field is generated (see FIG. 9), the polarized component of the 1st polarized light 310 transmitted through the 2nd liquid crystal cell 110b changes from the S-polarized light component to the P-polarized light component, but does not diffuse (see (6) to (8) in FIG. 8 and FIG. 9). On the other hand, in the case where the transverse electric field is not generated (see FIG. 8), the polarized component of the 2nd polarized light 320 transmitted through the 2nd liquid crystal cell 110b only changes from the P-polarized component to the S-polarized component. In the case where the transverse electric field is generated (see FIG. 9), the polarized component of the 2nd polarized light 320 transmitted through the 2nd liquid crystal cell 110b changes from the P-polarized component to the S-polarized component and diffuses in the x-axis direction and the y-axis direction.

As can be seen from the above liquid crystal optical element 10, the polarized component of the light incident on the liquid crystal optical element 10 changes two times by stacking two liquid crystal cells (the 1st liquid crystal cell 110a and the 2nd liquid crystal cell 110b) having the same structure. As a result, the polarized component before incidence in the liquid crystal optical element 10 does not change from the polarized component after incidence in the liquid crystal optical element (see (1) and (9) in FIG. 8 and FIG. 9). That is, the polarized component of the incident light 180 in the liquid crystal optical element 10 does not change from the polarized component of an emitted light 200 in the liquid crystal optical element 10.

In addition, the liquid crystal optical element 10 is capable of supplying a voltage to the transparent electrode, changing the refractive index distribution of the liquid crystal molecules of the liquid crystal layer 160a of the 1st liquid crystal cell, and refracting the light transmitted through the 1st liquid crystal cell 110a. Specifically, the 1st liquid crystal cell 110a can diffuse the light of the 1st polarized light 310 (P-polarized component) in the x-axis direction, the y-axis direction, or both the x-axis and the y-axis directions, and the 2nd liquid crystal cell 110b can diffuse the light of the 2nd polarized light 320 (S-polarized component) in the x-axis direction, the y-axis direction, or both the x-axis and the y-axis directions.

Although only the 1st liquid crystal cell 110a and the 2nd liquid crystal cell 110b are illustrated and the light distribution of the light transmitted through the 1st liquid crystal cell 110a and the 2nd liquid crystal cell 110b has been described in FIG. 8 and FIG. 9, the light distribution of the light transmitted through the 3rd liquid crystal cell 110c and the 4th liquid crystal cell 110d is also the same. That is, the 3rd liquid crystal cell 110c can diffuse the light of the 2nd polarized light 320 (S-polarized component) in the x-axis direction, the y-axis direction, or both the x-axis and the y-axis directions, and the 4th liquid crystal cell 110d can diffuse the light of the 1st polarized light 310 (P-polarized component) in the x-axis direction, the y-axis direction, or both the x-axis and the y-axis directions.

1-5. Supply of Voltage to Transparent Electrode of Liquid Crystal Optical Element 10

Figure 10:
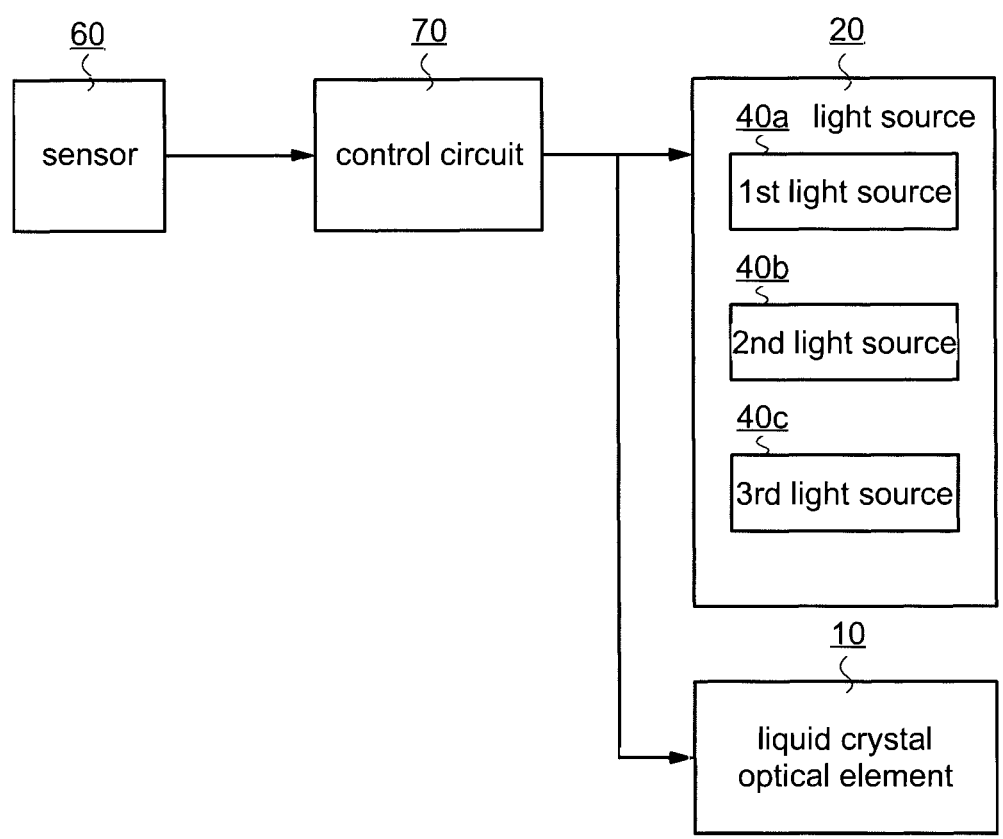
FIG. 10 is a schematic plan view showing a configuration of a lighting device according to an embodiment of the present invention.
Figure 11:
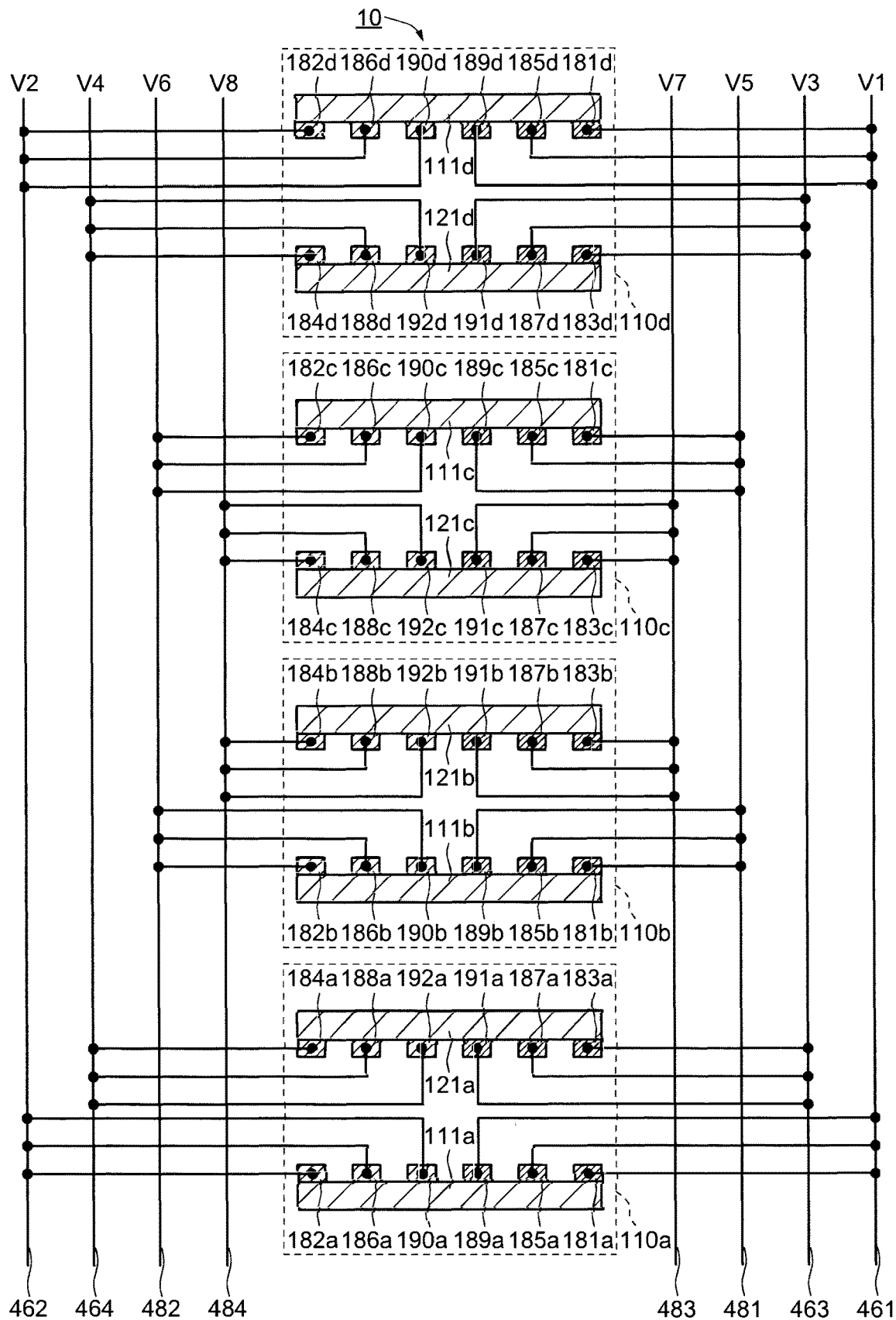
FIG. 11 is a schematic plan view for explaining a connection of transparent electrodes of a liquid crystal optical element according to an embodiment of the present invention.

FIG. 10 is a schematic plan view showing a configuration of the lighting device 30 according to an embodiment of the present invention. FIG. 11 is a schematic diagram for explaining a connection of the transparent electrode of the liquid crystal optical element 10 according to an embodiment of the present invention.

As shown in FIG. 10, the lighting device 30 includes a sensor 60, a control circuit 70, the light source 20 including three optical elements, such as the 1st optical element 40a, the 2nd optical element 40b and the 3rd optical element 40c, and the liquid crystal optical element 10. Since the liquid crystal optical element 10 and the light source 20 have the configurations and functions described with reference to FIG. 1 to FIG. 9, detailed descriptions thereof will be omitted. The sensor 60 is electrically connected to the control circuit 70. The control circuit 70 is electrically connected to the light source 20 and the liquid crystal optical element 10.

For example, the sensor 60 is an infrared sensor. For example, the sensor 60 detects a person in the vicinity of the sensor and outputs a detection signal to the control circuit 70.

The control circuit 70 includes a circuit for driving the liquid crystal optical element 10 and the light source 20. For example, upon receiving the detection signal from the sensor 60, the control circuit 70 outputs a voltage for controlling the orientation state of the liquid crystal to the 1st liquid crystal cell 110a, the 2nd liquid crystal cell 110b, the 3rd liquid crystal cell 110c and the 4th liquid crystal cell 110d via a flexible wiring substrate (not shown). In addition, upon receiving the detection signal from the sensor 60, the control circuit 70 outputs the voltage to the light source 20 to control the ON or OFF state of the LED included in the light source, 20 via the flexible wiring substrate (not shown).

As shown in FIG. 11, the 1st transparent electrode 181a, the 5th transparent electrode 185a, and the 9th transparent electrode 189a of the 1st liquid crystal cell 110a, and the 1st transparent electrode 181d, the 5th transparent electrode 185d, and the 9th transparent electrode 189d of the 4th liquid crystal cell 110d are connected to a 1st voltage supply line 461 that supplies the 1st voltage V1. That is, the 1st transparent electrode 181a, the 5th transparent electrode 185a, and the 9th transparent electrode 189a of the 1st liquid crystal cell 110a, and the $1^{st}$ transparent electrode 181d, the $5^{th}$ transparent electrode 185d, and the $9^{th}$ transparent electrode 189d of the $4^{th}$ liquid crystal cell 110d are electrically connected to each other.

In addition, the $2^{nd}$ transparent electrode 182a, the $6^{th}$ transparent electrode 186a, and the $10^{th}$ transparent electrode 190a of the $1^{st}$ liquid crystal cell 110a, and the 2nd transparent electrode 182d, the 6th transparent electrode 186d, and the 10th transparent electrode 190d of the 4th liquid crystal 110d cell are connected to a 2nd voltage supply line 462 that supplies the 2nd voltage V2. That is, the 2nd transparent electrode 182a, the 6th transparent electrode 186a, and the 10th transparent electrode 190a of the 1st liquid crystal cell 110a, and the 2nd transparent electrode 182d, the 6th transparent electrode 186d, and the 10th transparent electrode 190d of the 4th liquid crystal cell 110d are electrically connected to each other.

The 3rd transparent electrode 183a, the 7th transparent electrode 187a, and the 11th transparent electrode 191a of the 1st liquid crystal cell 110a, and the 3rd transparent electrode 183d, the 7th transparent electrodes 187d, and the 11th transparent electrodes 191d of the 4th liquid crystal cell 110d are connected to a 3rd voltage supply line 463 that supplies the 3rd voltage V3. That is, the 3rd transparent electrode 183a, the 7th transparent electrode 187a, and the 11th transparent electrode 191a of the 1st liquid crystal cell 110a, and the 3rd transparent electrode 183d, the 7th transparent electrode 187d, and the 11th transparent electrode 191d of the 4th liquid crystal cell 110d are electronically connected to each other.

The 4th transparent electrode 184a, the 8th transparent electrode 188a, and the 12th transparent electrode 192a of the 1st liquid crystal cell 110a, and the 4th transparent electrode 184d, the 8th transparent electrode 188d, and the 12th transparent electrode 192d of the 4th liquid crystal cell 110d are connected to a 4th voltage supply line 464 that supplies the 4th voltage V4. That is, the 4th transparent electrode 184a, the 8th transparent electrode 188a, and the 12th transparent electrode 192a of the 1st liquid crystal cell 110a, and the 4th transparent electrode 184d, the 8th transparent electrode 188d, and the 12th transparent electrode 192d of the 4th liquid crystal cell 110d are electrically connected to each other.

The 1st transparent electrode 181b, the 5th transparent electrode 185b, and the 9th transparent electrode 189b of the 2nd liquid crystal cell 110b, and the 1st transparent electrode 181c, the 5th transparent electrode 185c, and the 9th transparent electrode 189c of the 3rd liquid crystal cell 110c are connected to a 5th voltage supply line 481 that supplies a 5th voltage V5. That is, the 1st transparent electrode 181b, the 5th transparent electrode 185b, and the 9th transparent electrode 189b of the 2nd liquid crystal cell 110b, and the 1st transparent electrode 181c, the 5th transparent electrode 185c, and the 9th transparent electrode 189c of the 3rd liquid crystal cell 110c are electrically connected to each other.

The 2nd transparent electrode 182b, the 6th transparent electrode 186b, and the 10th transparent electrode 190b of the 2nd liquid crystal cell 110b, and the 2nd transparent electrode 182c, the 6th transparent electrode 186c, and the 10th transparent electrode 190c of the 3rd liquid crystal cell 110c are connected to a 6th voltage supply line 482 that supplies a 6th voltage V6. That is, the 2nd transparent electrode 182b, the 6th transparent electrode 186b, and the 10th transparent electrode 190b of the 2nd liquid crystal cell 110b, and the 2nd transparent electrode 182c, the 6th transparent electrode 186c, and the 10th transparent electrode 190c of the 3rd liquid crystal cell 110c are electrically connected to each other.

The 3rd transparent electrode 183b, the 7th transparent electrode 187b, and the 11th transparent electrode 191b of the 2nd liquid crystal cell 110b, and the 3rd transparent electrode 183c, the 7th transparent electrode 187c, and the 11th transparent electrode 191c of the 3rd liquid crystal cell 110c are connected to a 7th voltage supply line 483 that supplies a 7th voltage V7. That is, the 3rd transparent electrode 183b, the 7th transparent electrode 187b, and the 11th transparent electrode 191b of the 2nd liquid crystal cell 110b, and the 3rd transparent electrode 183c, the 7th transparent electrode 187c, and the 11th transparent electrode 191c of the 3rd liquid crystal cell 110c are electronically connected to each other.

The 4th transparent electrode 184b, the 8th transparent electrode 188b, and the 12th transparent electrode 192b of the 2nd liquid crystal cell 110b, and the 4th transparent electrode 184c, the 8th transparent electrode 188c, and the 12th transparent electrode 192c of the 3rd liquid crystal cell 110c are connected to an 8th voltage supply line 484 that supplies an 8th voltage V8. That is, the 4th transparent electrode 184b, the 8th transparent electrode 188b, the 12th transparent electrode 192b of the 2nd liquid crystal cell 110b, and the 4th transparent electrode 184c, the 8th transparent electrode 188c, and the 12th transparent electrode 192c of the 3rd liquid crystal cell 110c are electrically connected to each other.

The 1st voltage V1 to the 8th voltage V8 shown in FIG. 11 may be fixed voltages or may be variable voltages. The 1st potential supply line 461 to the 8th potential supply line 484 are supplied not only with the Low voltage and the High voltage but also with an intermediate voltage between the Low voltage and the High voltage. That is, the 1st voltage V1 to the 8th voltage V8 include three voltages having different absolute values. Therefore, the liquid crystal optical element 10 transmits and diffuses the light emitted from the three optical elements of the 1st optical element 40a, the 2nd optical element 40b, and the 3rd optical element 40c in the x-axis direction and the y-axis direction, and the lighting device 30 according to the present embodiment can variously control the light distribution and the light distribution pattern.

For convenience, the voltage supplied to each transparent electrode will be described as a 1st variable voltage (for example, the Low voltage is 0 V and the High voltage is 30 V), a 2nd variable voltage (for example, the Low voltage is 0 V and the High voltage is 30 V), and the intermediate voltage (for example, 15 V). The intermediate voltage is a voltage between the Low voltage and the High voltage, and may be a fixed voltage or may be a variable voltage. The voltage supplied to each transparent electrode according to the present embodiment is an example, and the voltage supplied to each transparent electrode is not limited to the voltage shown here.

1-5-1. When Controlling Three Optical Elements

Figure 12:
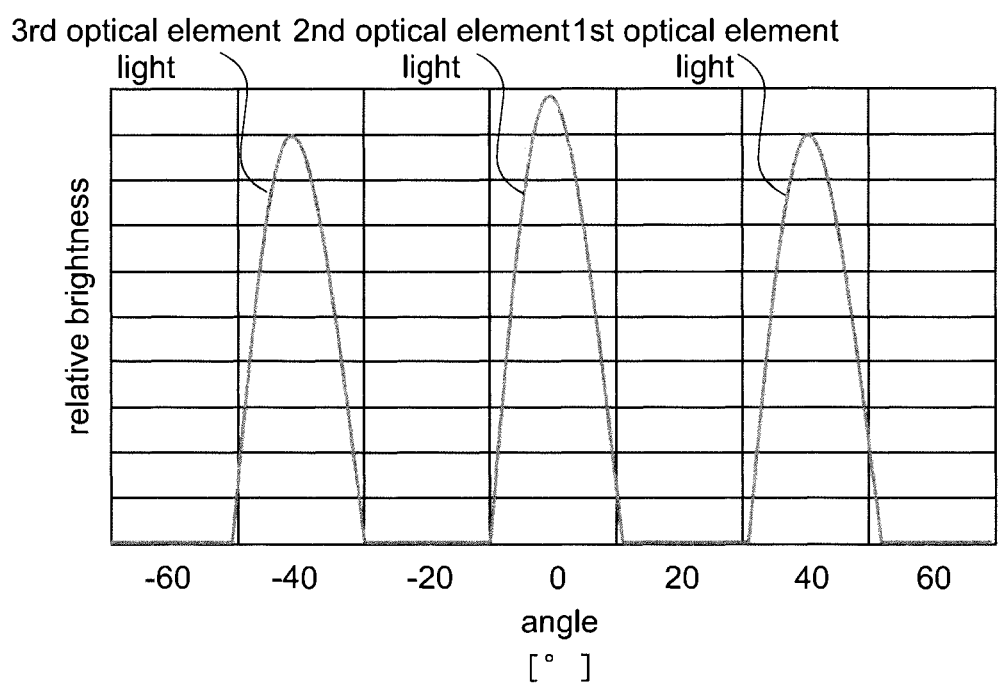
FIG. 12 is a graph showing a relationship between the relative brightness and the polar angle in light emitted from a lighting device according to an embodiment of the present invention.

FIG. 12 is a graph showing a relationship between the relative brightness and the polar angle in the light emitted from the lighting device 30 according to an embodiment of the present invention. In FIG. 12, the optical axis of the 2nd optical element 40a is set to a polar angle of 0°, and the optical elements are arranged in the left-right direction of the paper (hereinafter, the same applies to FIG. 13 to FIG. 17). In addition, FIG. 12 is a graph in the case where the control circuit 70 supplies voltages for turning on each LED of the three optical elements (the 1st optical element 40a, the 2nd optical element 40b, and the 3rd optical element 40c) that emit light in different directions to the 1st optical element 40a, the 2nd optical element 40b, and the 3rd optical element 40c, and supplies the intermediate voltage to each transparent electrode of each liquid crystal cell of the liquid crystal optical element 10. That is, the 1st voltage V1 to the 8th voltage V8 supplied from the control circuit 70 to each transparent electrode of each liquid crystal cell of the liquid crystal optical element 10 are the intermediate voltage.

In this case, there is no voltage difference between the 1st transparent electrode 181a and the 2nd transparent electrode 182a, and no voltage difference between the 3rd transparent electrode 183a and the 4th transparent electrode 184a in the 1st liquid crystal cell 110a. Since there is no voltage difference between the electrodes corresponding to the electrodes similar to the 1st liquid crystal cell 110a in each of the 2nd liquid crystal cell 110b, the 3rd liquid crystal cell 110c, and the 4th liquid crystal cell 110d, the light emitted from the 1st optical element 40a is transmitted through the 1st liquid crystal cell 110a, the 2nd liquid crystal cell 110b, the 3rd liquid crystal cell 110c, and the 4th liquid crystal cell 110d, and is emitted from the liquid crystal optical element 10 as light having a peak at a polar angle of 40 degrees.

Similarly, there is no voltage difference between the 5th transparent electrode 185a and the 6th transparent electrode 186a, and no voltage difference between the 7th transparent electrode 187a and the 8th transparent electrode 188a in the 1st liquid crystal cell 110a, and there is no voltage difference between electrodes corresponding to the electrodes similar to the 1st liquid crystal cell 110a in each of the 2nd liquid crystal cell 110b, the 3rd liquid crystal cell 110c, and the 4th liquid crystal cell 110d. As a result, the light emitted from the 2nd optical element 40b transmits through the 1st liquid crystal cell 110a, the 2nd liquid crystal cell 110b, the 3rd liquid crystal cell 110c, and the 4th liquid crystal cell 110d, and for example, is emitted from the liquid crystal optical element 10 as light with a peak at a polar angle of 0 degrees. In addition, similarly, there is no voltage difference between the 9th transparent electrode 189a and the 10th transparent electrode 190a, and the 11th transparent electrode 191a and the 12th transparent electrode 192a in the 1st liquid crystal cell 110a, and there is no voltage difference between electrodes corresponding to the electrodes similar to the 1st liquid crystal cell 110a in each of the 2nd liquid crystal cell 110b, the 3rd liquid crystal cell 110c, and the 4th liquid crystal cell 110d. As a result, the light emitted from the 3rd optical element 40c transmits through the liquid crystal cell 110a, the 2nd liquid crystal cell 110b, the 3rd liquid crystal cell 110c, and the 4th liquid crystal cell 110d, and for example, is emitted from the liquid crystal optical element 10 as light with a peak at a polar angle of −40 degrees.

Figure 13:
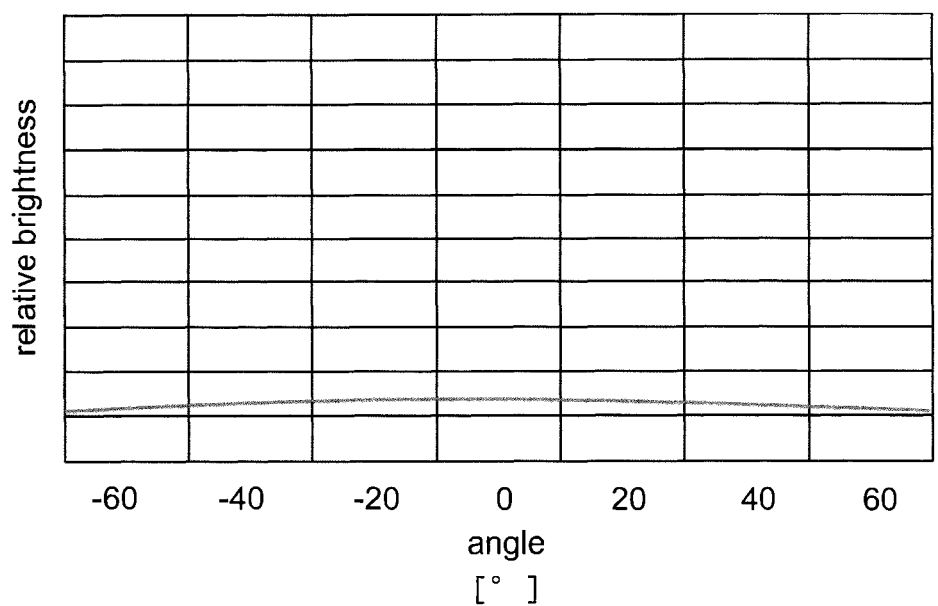
FIG. 13 is a graph showing a relationship between the relative brightness and the polar angle in light emitted from a lighting device according to an embodiment of the present invention.

FIG. 13 is a graph showing a relationship between the relative brightness and the polar angle in the light emitted from the lighting device 30 according to an embodiment of the present invention. FIG. 13 is a graph in the case where the control circuit 70 turns on each LED of the three optical elements (the 1st optical element 40a, the 2nd optical element 40b, and the 3rd optical element 40c) that emit light in different directions, and supplies the 1st variable voltage or the 2nd variable voltage to each transparent electrode of each liquid crystal cell of the liquid crystal optical element 10. For example, the 1st voltage V1, the 3rd voltage V3, the 5th voltage V5, and the 7th voltage V7 supplied from the control circuit 70 to each transparent electrode of each liquid crystal cell of the liquid crystal optical element 10 are the 1st variable voltage, and the 2nd voltage V2, the 4th voltage V4, the 6th voltage V6, and the 8th voltage V8 are the 2nd variable voltage.

In this case, the voltage difference between the 1st transparent electrode 181a and the 2nd transparent electrode 182a of the 1st liquid crystal 110a, the voltage difference between the 3rd transparent electrode 183a and the 4th transparent electrode 184a of the 1st liquid crystal 110a, the voltage difference between the 5th transparent electrode 185a and the 6th transparent electrode 186a of the 1st liquid crystal 110a, the voltage difference between the 7th transparent electrode 187a and the 8th transparent electrodes 188 of the 1st liquid crystal 110a, the voltage difference between the 9th transparent electrode 190a and the 10th transparent electrode of the 1st liquid crystal 110a, and the voltage difference between the 11th transparent electrode 191a and the 12th transparent electrode 192a of the 1st liquid crystal 110a are 30 V, and the voltage difference between the electrodes corresponding to the electrodes similar to the 1st liquid crystal cell 110a in each of the 2nd liquid crystal cell 110b, the 3rd liquid crystal cell 110c, and the 4th liquid crystal cell 110d is 30 V. As a result, the light emitted from the 1st optical element 40a, the light emitted from the 2nd optical element 40b, and the light emitted from the 3rd optical element 40c are diffused in each of the 1st liquid crystal cell 110a, the 2nd liquid crystal cell 110b, the 3rd liquid crystal cell 110c, and the 4th liquid crystal cell 110d. Therefore, the light emitted from the 1st optical element 40a, the light emitted from the 2nd optical element 40b, and the light emitted from the 3rd optical element 40c are emitted from the liquid crystal optical element 10 as light diffused from at least the polar angle 60 degrees to the polar angle −60 degrees shown in FIG. 12.

1-5-2. When Controlling Two Optical Elements

Figure 14:
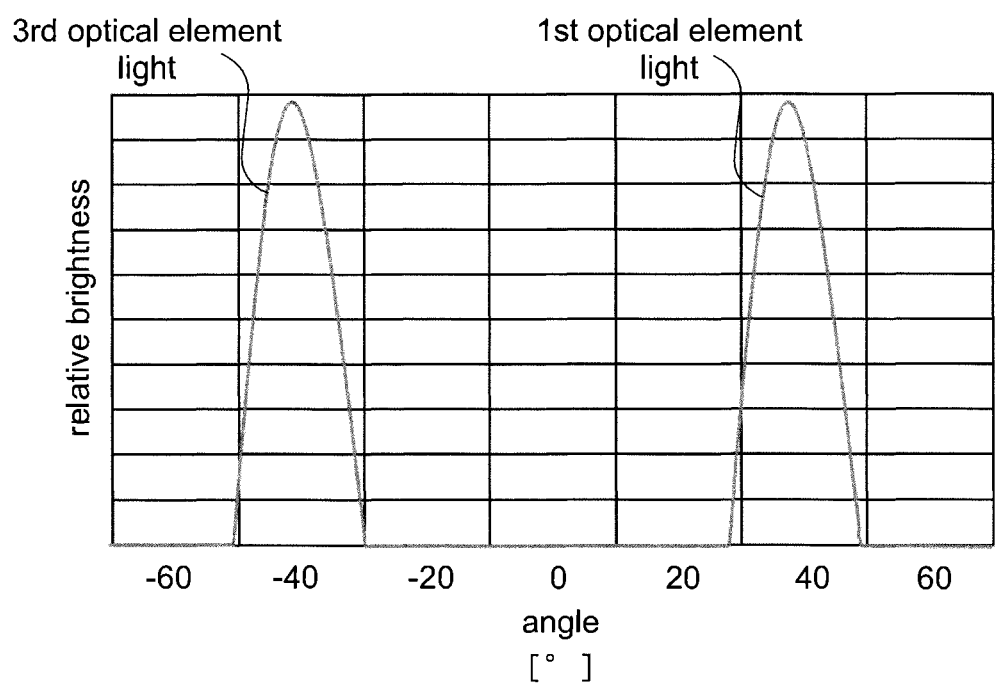
FIG. 14 is a graph showing a relationship between the relative brightness and the polar angle in light emitted from a lighting device according to an embodiment of the present invention.

FIG. 14 is a graph showing a relationship between the relative brightness and the polar angle in the light emitted from the lighting device 30 according to an embodiment of the present invention. FIG. 14 is a graph in the case where the control circuit 70 supplies a voltage for turning on the LED of the 1st optical element 40a arranged on the right side and the LED of the 3rd optical element 40c arranged on the left side among the three optical elements (the 1st optical element 40a, the 2nd optical element 40b, and the 3rd optical element 40c) that emit light in different directions to the 1st optical element 40a and the 3rd optical element 40c, and supplies the intermediate voltage to each transparent electrode of each liquid crystal cell of the liquid crystal optical element 10. That is, the 1st voltage V1 to the 8th voltage V8 supplied from the control circuit 70 to each transparent electrode of each liquid crystal cell of the liquid crystal optical element 10 are the intermediate voltage.

Since there is no voltage difference between the 1st transparent electrode 181a and the 2nd transparent electrode 182a, no voltage difference between the 3rd transparent electrode 183a and the 4th transparent electrode 184a in the 1st liquid crystal cell 110a, and there is no voltage difference between the electrodes corresponding to the electrodes similar to the 1st liquid crystal cell 110a in each of the 2nd liquid crystal cell 110b, the 3rd liquid crystal cell 110c, and the 4th liquid crystal cell 110d, the light emitted from the 1st optical element 40a transmits through the 1st liquid crystal cell 110a, the 2nd liquid crystal cell 110b, the 3rd liquid crystal cell 110c, and the 4th liquid crystal cell 110d, and the light emitted from the 1st optical element 40a is emitted from the liquid crystal optical element 10 as light with a peak at a polar angle of 40 degrees.

Similarly, since there is no voltage difference between the 9th transparent electrode 189a and the 10th transparent electrode 190a and no voltage difference between the 11th transparent electrode 191a and the 12th transparent electrode 192a in the 1st liquid crystal cell 110a, and there is no voltage difference between the electrodes corresponding to the electrodes similar to the 1st liquid crystal cell 110a in each of the 2nd liquid crystal cell 110b, the 3rd liquid crystal cell 110c, and the 4th liquid crystal cell 110d, the light emitted from the 3rd optical element 40 transmits the liquid crystal cell 110a, the 2nd liquid crystal cell 110b, the 3rd liquid crystal cell 110c, and the 4th liquid crystal cell 110d, and for example, the light emitted from the 3rd optical element 40 is emitted from the liquid crystal optical element 10 as light with a peak at a polar angle of −40 degrees.

Similarly, there is no voltage difference between the 5th transparent electrode 185a and the 6th transparent electrode 186a and no voltage difference between the 7th transparent electrode 187a and the 8th transparent electrode 188a in the 1st liquid crystal cell 110a, and there is no voltage difference between the electrodes corresponding to the electrodes similar to the 1st liquid crystal cell 110a in each of the 2nd liquid crystal cell 110b, the 3rd liquid crystal cell 110c, and the 4th liquid crystal cell 110d. However, no light is emitted from the 2nd optical element 40b because the LED of the 2nd optical element 40b is not illuminated.

Figure 15:
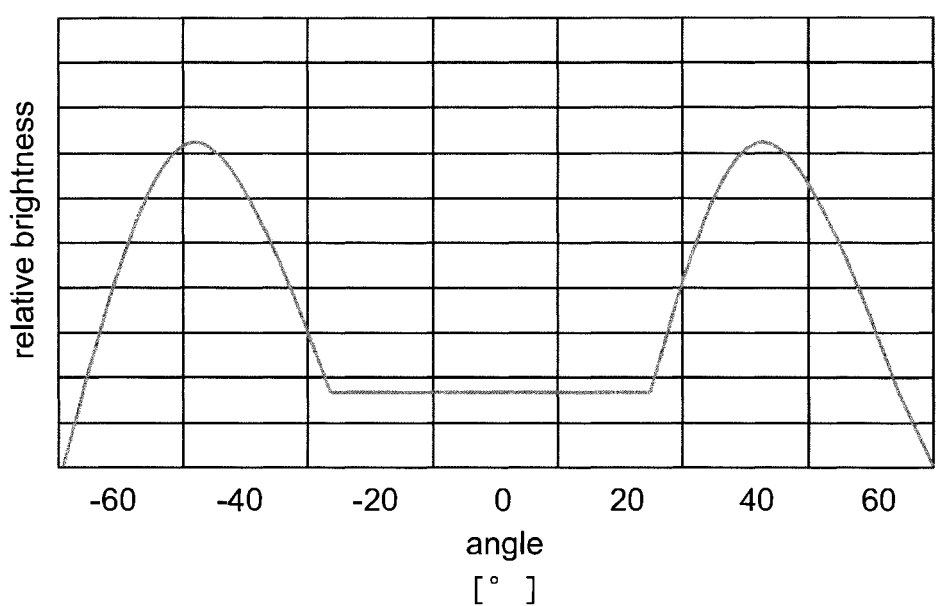
FIG. 15 is a graph showing a relationship between the relative brightness and the polar angle in light emitted from a lighting device according to an embodiment of the present invention.

FIG. 15 is a graph showing a relationship between the relative brightness and the polar angle in the light emitted from the lighting device 30 according to an embodiment of the present invention. FIG. 15 is a graph in the case where the control circuit 70 turns on the LED of the 1st optical element 40a arranged on the right side and the LED of the 3rd optical element 40c arranged on the left side among the three optical elements (the 1st optical element 40a, the 2nd optical element 40b, and the 3rd optical element 40c) that emit light in different directions, and supplies the 1st variable voltage or the 2nd variable voltage to each transparent electrode of each liquid crystal cell of the liquid crystal optical element 10. For example, the 1st voltage V1, the 3rd voltage V3, the 5th voltage V5, and the 7th voltage V7 supplied from the control circuit 70 to each transparent electrode of each liquid crystal cell of the liquid crystal optical element 10 are a 3rd variable voltage, and the 2nd voltage V2, the 4th voltage V4, the 6th voltage V6, and the 8th voltage V8 are a 4th variable voltage. In this case, the voltage difference between the Low voltage and the High voltage of the 3rd variable voltage is smaller than that of the 1st variable voltage, and the phase of the 4th variable voltage is inverted from that of the 3rd variable voltage.

For example, a voltage difference between the 1st transparent electrode 181a and the 2nd transparent electrode 182a in the 1st liquid crystal cell 110a, a voltage difference between the 3rd transparent electrode 183a and the 4th transparent electrode 184a in the 1st liquid crystal cell 110a, a voltage difference between the 5th transparent electrode 185a and the 6th transparent electrode 186a in the 1st liquid crystal cell 110a, a voltage difference between the 7th transparent electrode 187a and the 8th transparent electrode 188a in the 1st liquid crystal cell 110a, a voltage difference between the 9th transparent electrode 189a and the 10th transparent electrode 190a in the 1st liquid crystal cell 110a, and a voltage difference between the 1st transparent electrode 191a and the 12th transparent electrode 192a in the 1st liquid crystal cell 110a are 10 V or more and 15 V or less, a voltage difference between electrodes corresponding to the electrodes similar to the first liquid crystal cell 110a is 10 V or more and 15 V or less in each of the 2nd liquid crystal cell 110b, the 3rd liquid crystal cell 110c, and the 4th liquid crystal cell 110d. As a result, the light emitted from the 1st optical element 40a and the light emitted from the 3rd optical element 40c are diffused in each of the 1st liquid crystal cell 110a, the 2nd liquid crystal cell 110b, the 3rd liquid crystal cell 110c, and the 4th liquid crystal cell 110d. Therefore, the light emitted from the 1st optical element 40a and the light emitted from the 3rd optical element 40c are emitted from the liquid crystal optical element 10 as light having a weak peak at least around the polar angle of 50 degrees and around the polar angle of −50 degrees and diffused from the polar angle of 60 degrees to the polar angle of −60 degrees as shown in FIG. 15. Since the voltage difference between the 3rd variable voltage and the 4th variable voltage is smaller than the voltage difference between the 1st variable voltage and the 2nd variable voltage, the degree of light diffusion when the 3rd variable voltage and the 4th variable voltage are applied is smaller than that when the 1st variable voltage and the 2nd variable voltage are applied to each electrode.

1-5-3. When Controlling One Optical Element

Figure 16:
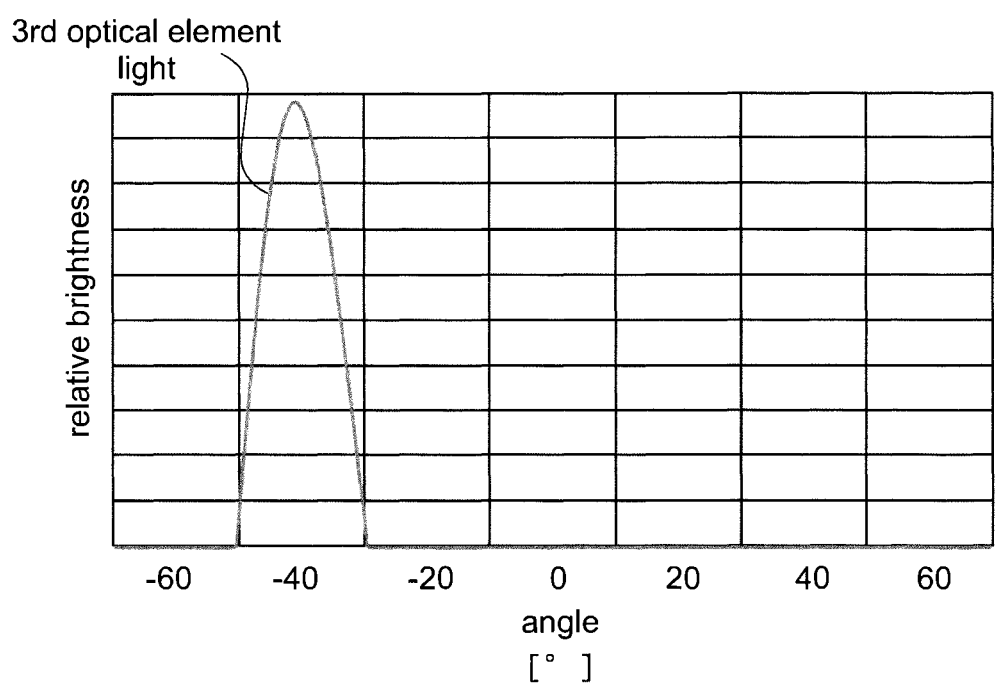
FIG. 16 is a graph showing a relationship between the relative brightness and the polar angle in light emitted from a lighting device according to an embodiment of the present invention.

FIG. 16 is a graph showing a relationship between the relative brightness and the polar angle in the light emitted from the lighting device 30 according to an embodiment of the present invention. FIG. 16 is a graph in the case where the control circuit 70 supplies a voltage for turning on the LED of the 3rd optical element 40c arranged on the left side among the three optical elements (the 1st optical element 40a, the 2nd optical element 40b, and the 3rd optical element 40c) that emit light in different directions, and supplies the intermediate voltage to each transparent electrode of each liquid crystal cell of the liquid crystal optical element 10. That is, the 1st voltage V1 to the 8th voltage V8 supplied from the control circuit 70 to each transparent electrode of each liquid crystal cell of the liquid crystal optical element 10 are the intermediate voltage.

Since there is no voltage difference between the 9th transparent electrode 189a and the 10th transparent electrode 190a in the 1st liquid crystal cell 110a and the 11th transparent electrode 191a and the 12th transparent electrode 192a in the 1st liquid crystal cell 110a, and there is no voltage difference between electrodes corresponding to the electrodes similar to the 1st liquid crystal cell 110a in each of the 2nd liquid crystal cell 110b, the 3rd liquid crystal cell 110c, and the 4th liquid crystal cell 110d, the light emitted from the 3rd optical element 40c transmits through the 1st liquid crystal cell 110a, the 2nd liquid crystal cell 110b, the 3rd liquid crystal cell 110c, and the 4th liquid crystal cell 110d, and for example, the light emitted from the 3rd optical element 40c is emitted from the liquid crystal optical element 10 as light with a peak at a polar angle of −40 degrees.

Although there is no voltage difference between the 1st transparent electrode 181a and the 2nd transparent electrode 182a in the 1st liquid crystal cell 110a, no voltage difference between the 3rd transparent electrode 183a and the 4th transparent electrode 184a in the 1st liquid crystal cell 110a, no voltage difference between the 5th transparent electrode 185a and the 6th transparent electrode 186a in the 1st liquid crystal cell 110a, and no voltage difference between the 7th transparent electrode 187a and the 8th transparent electrode 188a in the 1st liquid crystal cell 110a, and there is no voltage difference between the electrodes corresponding to the electrodes similar to the 1st liquid crystal cell 110a in each of the 2nd liquid crystal cell 110b, the 3rd liquid crystal cell 110c, and the 4th liquid crystal cell 110d, the LED of the 1st optical element 40a and the LED of the 2nd optical element 40b are not illuminated and therefore no light is emitted from the 1st optical element 40a and the 2nd optical element 188a.

Figure 17:
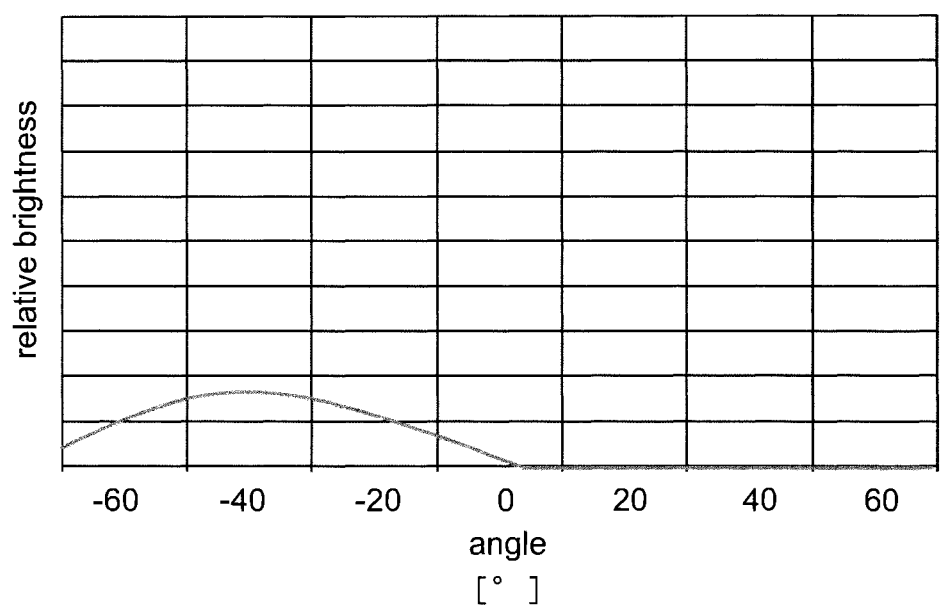
FIG. 17 is a graph showing a relationship between the relative brightness and the polar angle in light emitted from a lighting device according to an embodiment of the present invention.

FIG. 17 is a graph showing the relationship between the relative brightness and the polar angle in the light emitted from the lighting device 30 according to an embodiment of the present invention. FIG. 17 is a graph in the case where the control circuit 70 turns on the LED of the 3rd optical element 40c arranged on the left side among the three optical elements (1st optical element 40a, the 2nd optical element 40b, and the 3rd optical element 40c) that emit light in different directions, and supplies the 1st variable voltage or the 2nd variable voltage to each transparent electrode of each liquid crystal cell of the liquid crystal optical element 10. For example, the 1st voltage V1, the 3rd voltage V3, the 5th voltage V5, and the 7th voltage V7 supplied from the control circuit 70 to each transparent electrode of the liquid crystal cell of the liquid crystal optical element 10 are the 5th variable voltage, and the 2nd voltage V2, the 4th voltage V4, the 6th voltage V6, and the 8th voltage V8 are the 6th variable voltage. In this case, the voltage difference between the Low voltage and the High voltage of the 5th variable voltage is larger than that of the 3rd variable voltage. The phase of the 6th variable voltage is inverted from that of the 5th variable voltage.

Since the voltage difference between the 9th transparent electrode 189a and the 10th transparent electrode 190a in the 1st liquid crystal cell 110a, and the voltage difference between the 11th transparent electrode 191a and the 12th transparent electrode 192a in the 1st liquid crystal cell 110a is 30 V or slightly smaller, and the voltage difference between the electrodes corresponding to the electrodes similar to the 1st liquid crystal cell 110d is 30 V or slightly smaller in each of the 2nd liquid crystal cell 110b, the 3rd liquid crystal cell 110c, and the 4th liquid crystal cell 110d, the light emitted from the 3rd optical element 40c is diffused in each of the 1st liquid crystal cell, the 2nd liquid crystal cell 110b, the 3rd liquid crystal cell 110c, and the 4th liquid crystal cell 191a. Therefore, the light emitted from the 3rd optical element 40c is emitted from the liquid crystal optical element 10 as light with a weak peak at least around the polar angle of −40 degrees shown in FIG. 17 and diffused from the polar angle of 60 degrees to the polar angle of 0 degrees.

The voltage difference between the 1st transparent electrode 181a and the 2nd transparent electrode 182a in the 1st liquid crystal cell 110a, the voltage difference between the 3rd transparent electrode 183a and the 4th transparent electrode 184a in the 1st liquid crystal cell 110a, the voltage difference between the 5th transparent electrode 185a and the 6th transparent electrode 186a in the 1st liquid crystal cell 110a, and the voltage difference between the 7th transparent electrode 187a and the 8th transparent electrode 188a in the 1st liquid crystal cell 110a are 30 V or smaller, and the voltage difference between electrodes corresponding to the electrode similar to the 1st liquid crystal cell 110a is 30 V or smaller in each of the 2 liquid crystal cell 110b, the 3 liquid crystal cell 110c, and the 4 liquid crystal cell 110d. However, no light is emitted from the 1st optical element 40a and the 2nd optical element 40b because the LED of the 1st optical element 40a and the LED of the 2nd optical element 40b are not illuminated.

1-5-4. Example of Light Distribution Pattern

The light distribution patterns shown in FIG. 18A to FIG. 18H are schematic diagrams showing light distribution patterns of the light emitted from the lighting device 30 according to an embodiment of the present invention. For example, the light distribution patterns shown in FIG. 18A to FIG. 18H are patterns projected (appearing on the light exit surface) on the light exit surface of the 4th liquid crystal cell 110d (the surface opposite to the side on which the light source 20 is arranged in the z-axis direction).

Figure 18A:
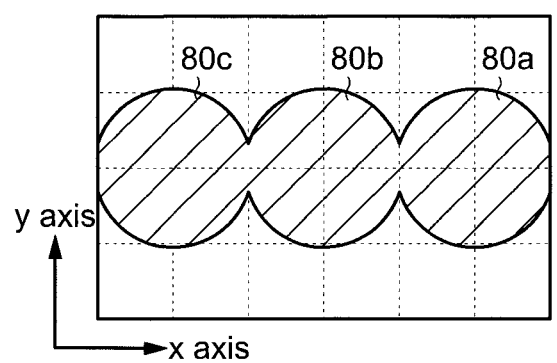
FIG. 18A is a schematic diagram showing a light distribution pattern of light emitted from a lighting device according to an embodiment of the present invention.

The light distribution pattern shown in FIG. 18A is a light distribution pattern corresponding to the relationship between the relative brightness and the polar angle shown in FIG. 12. That is, it is the light distribution pattern emitted from the lighting device 30 in the case where the three optical elements are turned on and the intermediate voltage is supplied to each transparent electrode of each liquid crystal cell of the liquid crystal optical element 10. The light distribution pattern shown in FIG. 18A is a light distribution pattern in the case where a right side spot light 80a, a center spot light 80b, and a left side spot light 80c arranged in the x-axis direction are irradiated.

In addition, similar to the light distribution pattern corresponding to the relationship between the relative brightness and the polar angle shown in FIG. 14, the LED of the 1st optical element 40a arranged on the right side and the LED of the 3rd optical element 40c arranged on the left side among the three optical elements are turned on, and the intermediate voltage is supplied to each transparent electrode of each liquid crystal cell of the liquid crystal optical element 10. Although not shown, in this case, spot light is irradiated from the lighting device 30 to the right side and the left side with respect to the x-axis direction.

In addition, similar to the light distribution pattern corresponding to the relationship between the relative brightness and the polar angle shown in FIG. 16, the LED of the 3rd optical element 40c arranged on the left side among the three optical elements is turned on, and the intermediate voltage is supplied to each transparent electrode of each liquid crystal cell of the liquid crystal optical element 10. Although not show, in this case, spot light is irradiated from the lighting device 30 to the left side with respect to the x-axis direction.

Figure 18B:
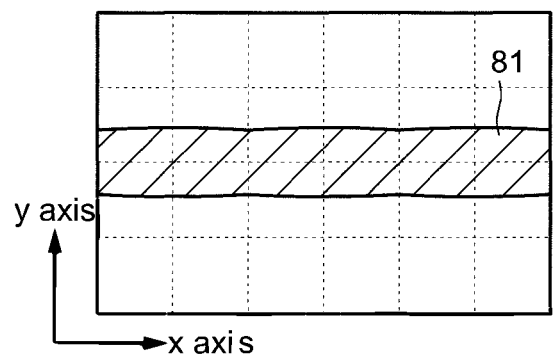
FIG. 18B is a schematic diagram showing a light distribution pattern of light emitted from a lighting device according to an embodiment of the present invention.

In addition, a light distribution pattern shown in FIG. 18B can also be formed. That is, a light distribution pattern of light emitted from the lighting device 30 can be formed in the case where the three optical elements are turned on and the 1st variable voltage or the 2nd variable voltage is selectively supplied to each transparent electrode of each liquid crystal cell of the liquid crystal optical element 10. More specifically, the 1st variable voltage and the 2nd variable voltage are alternately supplied to the electrodes arranged in the x-axis direction and extending in the y-axis direction for each liquid crystal cell. As a result, incident light from each optical element diffuses in the x-axis direction. The light distribution pattern shown in FIG. 18B shows a state where the light (diffused light 81) diffused with respect to the x-axis direction is emitted.

Figure 18C:
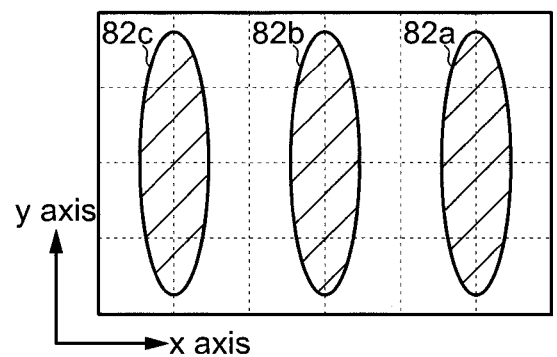
FIG. 18C is a schematic diagram showing a light distribution pattern of light emitted from a lighting device according to an embodiment of the present invention.

In addition, the three optical elements are turned on by using the control circuit 70 and the voltage to be supplied to each transparent electrode of each liquid crystal cell of the liquid crystal optical element 10 is adjusted, so that the lighting device 30 can irradiate the lights on the right side, the center, and the left side as lights (diffused lights 82a, 82b, and 82c) diffused in the y-axis direction, as shown in FIG. 18C. More specifically, the 1st variable voltage and the 2nd variable voltage are alternately supplied to the electrodes arranged in the y-axis direction and extending in the x-axis direction for each liquid crystal cell. As a result, incident lights from each optical element diffuse in the y-axis direction. The light distribution pattern shown in FIG. 18C shows a state where the diffused lights 82a, 82b, and 82c are emitted.

Figure 18D:
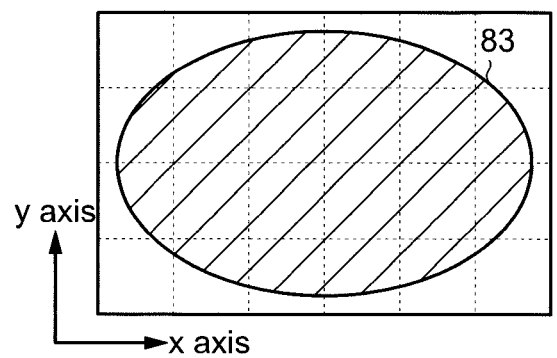
FIG. 18D is a schematic diagram showing a light distribution pattern of light emitted from a lighting device according to an embodiment of the present invention.

In addition, as shown in FIG. 18D, using the control circuit 70 makes it possible for the lighting device 30 to irradiate the light on the right side, the center, and the left side as elliptical light (diffused light 83) diffused with respect to the x-axis direction and the y-axis direction. The light distribution pattern shown in FIG. 18D shows a state where the diffused light 83 is emitted.

Figure 18E:
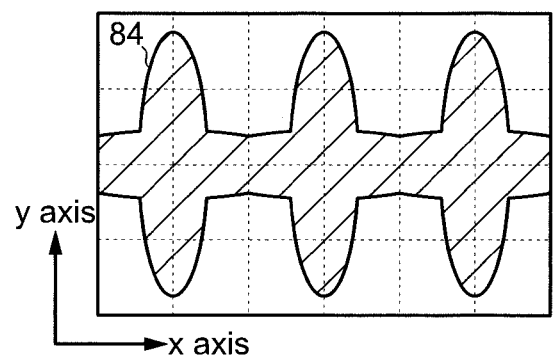
FIG. 18E is a schematic diagram showing a light distribution pattern of light emitted from a lighting device according to an embodiment of the present invention.

Further, as shown in FIG. 18E, the lights on the right side, the center, and the left side can be diffused in a cross shape with respect to the x-axis direction and the y-axis direction, and the light can be irradiated as a combined light 84 by using the lighting device 30. More specifically, all three optical elements are turned on, and the 1st voltage V1 and the 2nd voltage V2 for supplying a voltage to a plurality of electrodes arranged on the 1st substrate 111a side of the 1st liquid crystal cell 110a and a plurality of electrodes arranged on the 2nd substrate 121d side of the 4th liquid crystal cell 110d are set as the 1st variable voltage and the 2nd variable voltage, respectively, and the 7th voltage V7 and the 8th voltage V8 for supplying a voltage to a plurality of electrodes arranged on the 2nd substrate 121b side of the 2nd liquid crystal cell 110b and a plurality of electrodes arranged on the 1st substrate 111c side of the 3rd liquid crystal cell 110c are set as the 1st variable voltage and the 2nd variable voltage, respectively. As a result, incident light from each optical element diffuses in a cross shape in the x-axis direction and the y-axis direction. The light distribution pattern shown in 18E shows that the light 84 is emitted.

Figure 18F:
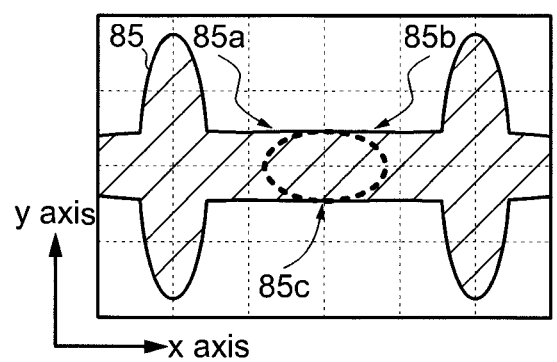
FIG. 18F is a schematic diagram showing a light distribution pattern of light emitted from a lighting device according to an embodiment of the present invention.

In addition, a light distribution pattern shown in FIG. 18F can also be formed. That is, a light distribution pattern of a light 85 emitted from the lighting device 30 can be formed in the case where the LED of the $1^{st}$ optical element 40a arranged on the right side and the LED of the $3^{rd}$ optical element 40c arranged on the left side among the three optical elements are turned on, and the $1^{st}$ variable voltage or the $2^{nd}$ variable voltage is supplied to each transparent electrode of each liquid crystal cell of the liquid crystal optical element 10. More specifically, the $1^{st}$ voltage V1 and the $2^{nd}$ voltage V2 for supplying a voltage to a plurality of electrodes arranged on the $1^{st}$ substrate 111a side of the $1^{st}$ liquid crystal cell 110a and a plurality of electrodes arranged on the $2^{nd}$ substrate 121d side of the $4^{th}$ liquid crystal cell 110d are set as the $1^{st}$ variable voltage and the $2^{nd}$ variable voltage, respectively, and the $7^{th}$ voltage V7 and the $8^{th}$ voltage V8 for supplying a voltage to a plurality of electrodes arranged on the $2^{nd}$ substrate 121b side of the $2^{nd}$ liquid crystal cell 110b and a plurality of electrodes arranged on the $1^{st}$ substrate 111c side of the 3rd liquid crystal cell 110c are set as the 1st variable voltage and the 2nd variable voltage, respectively. As a result, incident light from each optical element diffuses in a cross shape in the x-axis direction and the y-axis direction. The light distribution pattern shown in FIG. 18F shows a state where the light 85 is emitted. As shown in FIG. 18F, the lighting device 30 can diffuse the lights on the right side and the left side in the x-axis direction and the y-axis direction, and diffuse the lights diffused in the x-axis direction on the right side and the left side with the electrode group at the center of each liquid crystal cell again. However, since the light diffused in the x-axis direction instead of direct light is diffused again, for example, the cross-shaped diffusivity does not appear strongly like the light distribution patterns shown in regions 85a and 85b, and the diffusing action is not visible in the vicinity of the center as shown in a region 85c.

Figure 18G:
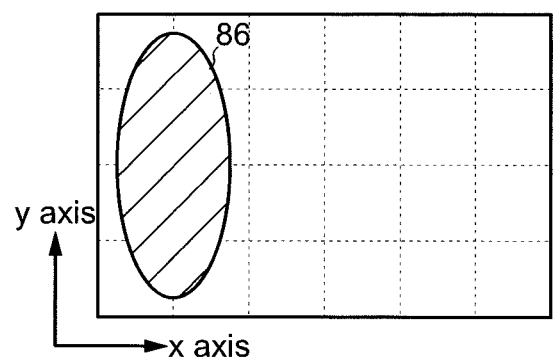
FIG. 18G is a schematic diagram showing a light distribution pattern of light emitted from a lighting device according to an embodiment of the present invention.

In addition, a light distribution pattern shown in FIG. 18G can also be formed. That is, a light distribution pattern of light emitted from the lighting device 30 can be formed in the case where the LED of the 3rd optical element 40c arranged on the left side among the three optical elements is turned on and the 1st variable voltage or the 2nd variable voltage is selectively supplied to each transparent electrode of each liquid crystal cell of the liquid crystal optical element 10. More specifically, the 1st variable voltage and the 2nd variable voltage are alternately supplied to the electrodes arranged in the y-axis direction and extending in the x-axis direction for each liquid crystal cell. As a result, incident light from each optical element diffuses in the y-axis direction. The light distribution pattern shown in FIG. 18G shows a state where a light 86 is emitted. As shown in FIG. 18G, the lighting device 30 can emit light obtained by diffusing the left side light in the y-axis direction.

Figure 18H:
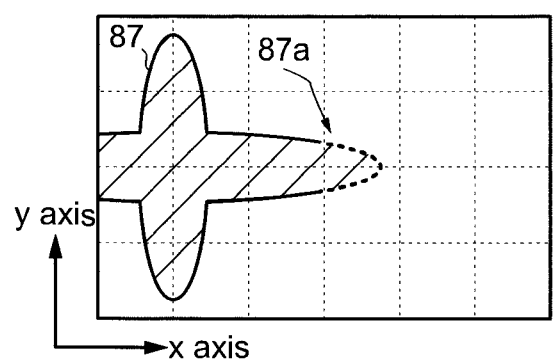
FIG. 18H is a schematic diagram showing a light distribution pattern of light emitted from a lighting device according to an embodiment of the present invention.

A light distribution pattern shown in FIG. 18H can also be formed. That is, a light distribution pattern of a light 87 emitted from the lighting device 30 can be formed in the case where the LED of the 3rd optical element 40c arranged on the left side among the three optical elements is turned on, and the 1st variable voltage or the 2nd variable voltage is selectively supplied to each transparent electrode of each liquid crystal cell of the liquid crystal optical element 10. More specifically, the 1st voltage V1 and the 2nd voltage V2 for supplying a voltage to a plurality of electrodes arranged on the 1st substrate 111a side of the 1st liquid crystal cell 110a and a plurality of electrodes arranged on the 2nd substrate 121d side of the 4th liquid crystal cell 110d are set as the 1st variable voltage and the 2nd variable voltage, respectively, and the 7th voltage V7 and the 8th voltage V8 for supplying a voltage to a plurality of electrodes arranged on the 2nd substrate 121b side of the 2nd liquid crystal cell 110b and a plurality of electrodes arranged on the 1st substrate 111c side of the 3rd liquid crystal cell 110c are set as the 1st variable voltage and the 2nd variable voltage, respectively. As a result, incident light from each optical element diffuses in a cross shape in the x-axis direction and the y-axis direction. The light distribution pattern shown in FIG. 18H shows a state where the light 87 is emitted. As shown in FIG. 18H, the lighting device 30 diffuses the light on the left side in a cross shape, and diffuses the light diffused in the x-axis direction to the right side and in a cross shape by the electrode group in the center and the electrode group on the right side of each liquid crystal cell. However, since the light that has diffused in the center direction instead of the direct light is diffused again, the cross-shaped diffusivity does not appear strongly, and for example, the diffusing action is not visible around the center as shown in a region 87a.

The liquid crystal optical element 10 according to the present embodiment can transmit and diffuse the light emitted from the three optical elements, that is, the 1st optical element 40a, the 2nd optical element 40b, and the 3rd optical element 40c, which emit light in different directions, in the x-axis direction and the y-axis direction. As a result, the lighting device 30 according to the present embodiment can variously control the light distribution and the light distribution pattern.

1-6. 1st Modification of Lighting Device

FIG. 19 is an end portion cross-sectional view of a lighting device 30b according to an embodiment of the present invention. The lighting device 30b shown in FIG. 19 is different from the lighting device 30 shown in FIG. 1 in that an optical element 20b has a support member 50b. The support member 50b has a concave shape in a cross-sectional view. In the case where each optical element is arranged as shown in FIG. 19, the 1st optical element 40a emits the light 180a in a left-oblique direction with respect to the z-axis direction, the 2nd optical element 40b emits the light 180b in a parallel or substantially parallel direction with respect to the z-axis direction, and the 3rd optical element 40c emits the light 180c in a right-oblique direction with respect to the z-axis direction. Since the lighting device 30b is the same as the lighting device 30 in other respects, detailed explanation thereof will be omitted here.

1-7. 2nd Modification of Lighting Device

Figure 20:
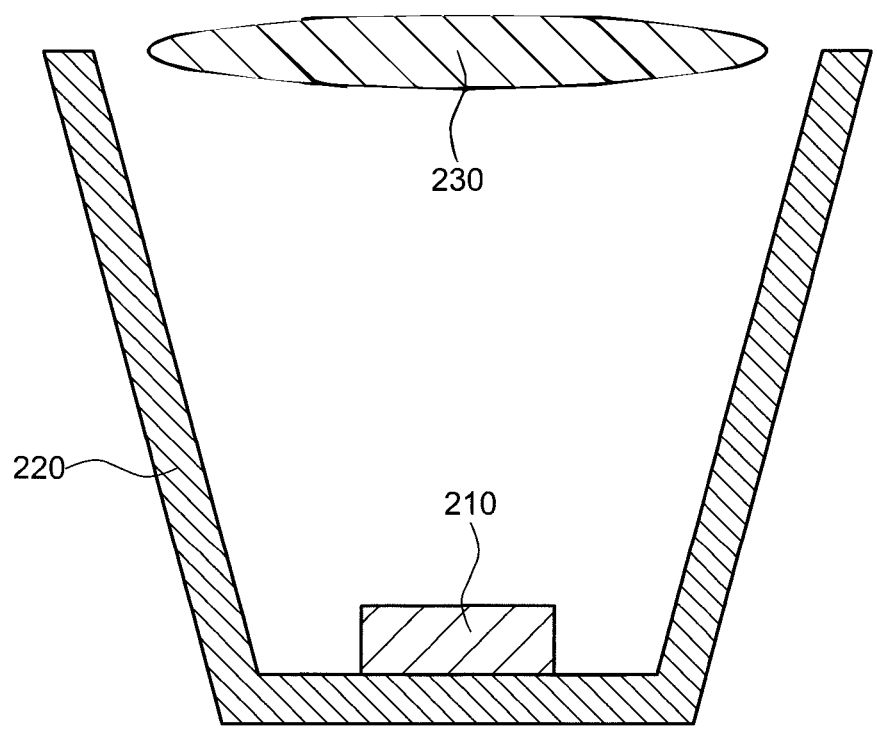
FIG. 20 is an end portion cross-sectional view of an optical element according to an embodiment of the present invention.

FIG. 20 is an end portion cross-sectional view of the optical element 40 according to an embodiment of the present invention. The optical element 40 shown in FIG. 20 is different from the optical element 40 shown in FIG. 2 in that it has a convex lens 230. The convex lens 230 condenses the light emitted from the light-emitting element 210 and causes the condensed light to be incident on the liquid crystal optical element 10. The reflector 220 reflects the light emitted from the light-emitting element 210 and causes the reflected light to be incident on the convex lens 230. Since the optical element shown in FIG. 20 is the same as the optical element 40 shown in FIG. 2 in other respects, detailed explanation thereof will be omitted here.

The lighting device 30 according to an embodiment of the present invention has been described with reference to FIG. 1 to FIG. 20. The form of the lighting device 30 shown in FIG. 1 to FIG. 20 is an example, and the form of the lighting device 30 according to an embodiment of the present invention is not limited to the forms shown in FIG. 1 to FIG. 20.

The ON and OFF state of the optical elements that emit light in different directions and the voltage supplied to each transparent electrode of the liquid crystal optical element can be controlled by using the lighting device 30 according to an embodiment of the present invention. As a result, it is possible to finely control the transmission and diffusion of light in different directions with respect to an object to be irradiated with light.

2nd Embodiment

Figure 22:
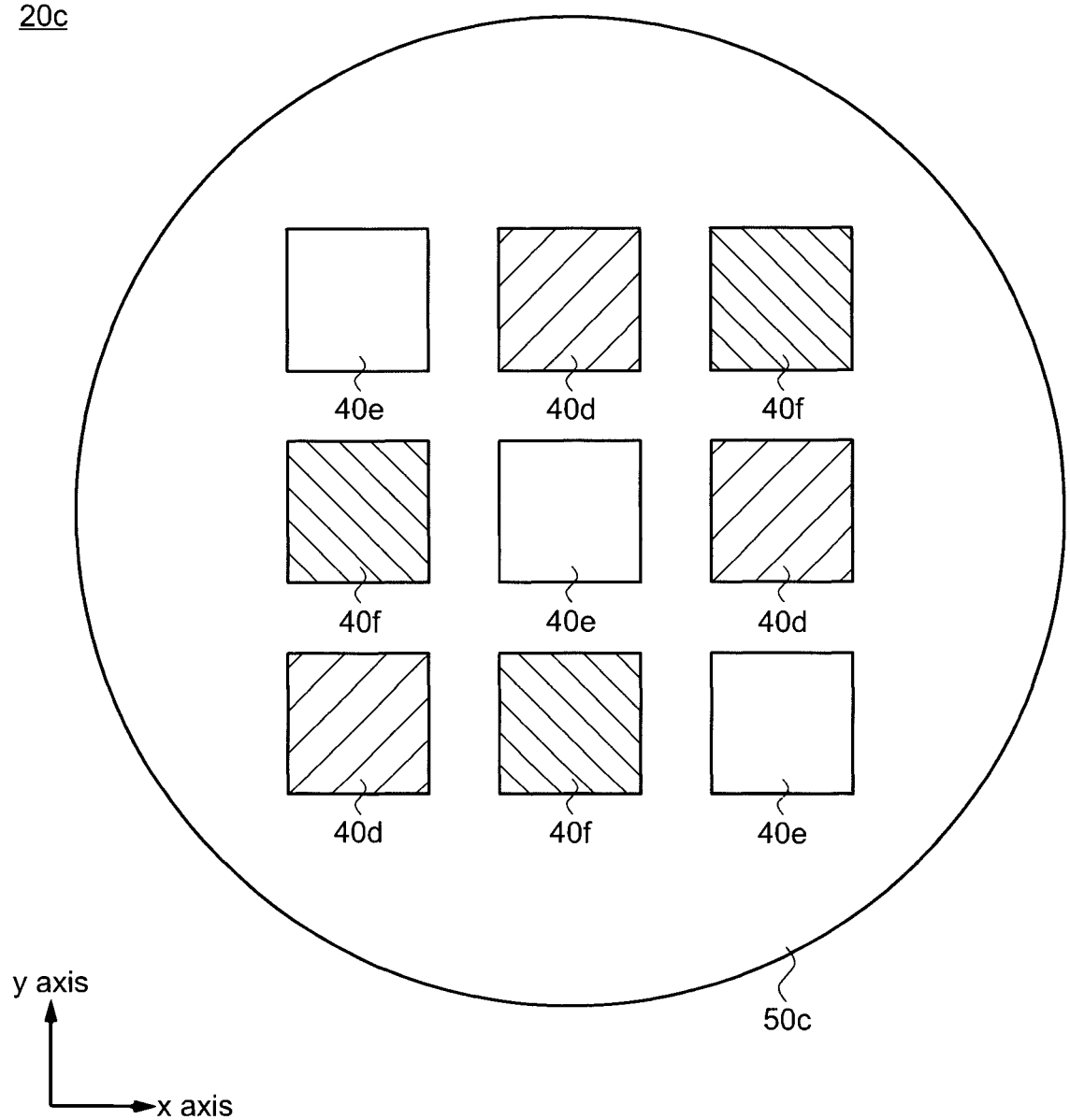
FIG. 22 is a plan view of a light source according to the 2nd embodiment of the present invention.

In a 2nd embodiment, a configuration will be described in which a light source 20c is composed of a 4th optical element 40d, a 5th optical element 40e, and a 6th optical element 40f, and each optical element has the reflector 220 with a different orientation in a cross-sectional view. FIG. 21 is an end portion cross-sectional view of a lighting device 30c according to the 2nd embodiment of the present invention. FIG. 22 is a plan view of the light source 20c according to the 2nd embodiment of the present invention. The configuration of the lighting device 30c shown in FIG. 21 and FIG. 22 is an example, and the configuration of the lighting device 30c according to the 2nd embodiment is not limited to the configuration shown in FIG. 21 and FIG. 22. The same description as in the 1st embodiment may be omitted in the description of the 2nd embodiment.

The lighting device 30c shown in FIG. 21 is different from the lighting device 30 shown in FIG. 1 in that the light source 20c has a support member 50c, and in that the light source 20c is composed of the 4th optical element 40d, the 5th optical element 40e, and the 6th optical element 40f, and each optical element has the reflector 220 with a different orientation in a cross-sectional view. Since the lighting device 30c is the same as the lighting device 30 in other respects, detailed explanation thereof will be omitted here.

As shown in FIG. 21, the lighting device 30c includes the liquid crystal optical element 10 and the light source 20c. The light source 20c includes the optical element 40 and the support member 50c. The support member 50c has a role of supporting (fixing) the optical element 40. The support member 50a has a flat surface in a cross-sectional view. The same material as the support member 50a may be used for the support member 50c.

The optical element 40 is composed of the 4th optical element 40d, the 5th optical element 40e, and the 6th optical element 40f. The 4th optical element 40d, the 5th optical element 40e, and the 6th optical element 40f are arranged parallel to or substantially parallel to the x-axis direction or the y-axis direction in a plan view. In the present embodiment, the 4th optical element 40d is arranged next to the 5th optical element 40e, and the 5th optical element 40e is arranged next to the 6th optical element 40f.

The 4th optical element 40d, the 5th optical element 40e, and the 6th optical element 40f are mounted on a flat surface facing the liquid crystal optical element 10 of the support member 50c. The 4th optical component 40d has a 1st reflector 220a and a 1st light-emitting element 210a. The 5th optical component 40e has a 2nd reflector 220b and a 2nd light-emitting element 210b. The 6th optical component 40f has a 3rd reflector 220c and a 3rd light-emitting element 210c.

The 1st reflector 220a, the 2nd reflector 220b, and the 3rd reflector 220c are arranged in different directions so as to emit the reflected light in different directions. For example, in the case where each optical element is arranged as shown in FIG. 21, the 4th optical element 40d having the 1st reflector 220a emits a light 180d in a right-oblique direction with respect to the z-axis direction, the 5th optical element 40e having the 2nd reflector 220b emits a light 180e in a parallel or substantially parallel direction with respect to the z-axis direction, and the 6th optical element 40f having the 3rd reflector 220c emits a light 180f in a left-oblique direction with respect to the z-axis direction.

The positional relationship between the 4th optical element 40d, the 5th optical element 40e, and the 6th optical element 40f and each electrode group is the same as the positional relationship between the 1st optical element 40a, the 2nd optical element 40b, and the 3rd optical element 40c and each electrode group. For example, the 1st electrode group 117-1 and the 4th electrode group 117-2 are arranged so as to face the 4th optical element 40d and the light exit surface of the 4th optical element 40d. The 2nd electrode group 117-3 and the 5th electrode group 117-4 are arranged so as to face the 5th optical element 40e and the light exit surface of the 5th optical element 40e. The 3rd electrode group 117-5 and the 6th electrode group 117-6 are arranged so as to face the 6th optical element 40f and the light exit surface of the 6th optical element 40f.

The optical element 40 having reflectors arranged in different directions and the liquid crystal optical element 10 are arranged as shown in FIG. 21 in the present embodiment. In other words, each of the 4th optical element 40d, the 5th optical element 40e, and the 6th optical element 40f has the reflector, and one liquid crystal optical element 10 is arranged as shown in FIG. 21 with respect to the three optical elements of the 4th optical element 40d, the 5th optical element 40e, and the 6th optical element 40f that emit light in different directions. As a result, the three optical elements are used as the left light source, the center light source, and the right light source, so that the liquid crystal optical element 10 can transmit or diffuse light in the direction in which the light is emitted from each optical element is different.

A plurality of 4th optical elements 40d, a plurality of 5th optical elements 40e, and a plurality of 6th optical elements 40f may be randomly arranged on the support member 50c. For example, three of the 4th optical element 40d, the 5th optical element 40e, and the 6th optical element 40f are randomly arranged on the support member 50c in the example shown in FIG. 22.

For example, light with high linearity and light with high intensity in an oblique direction can be selectively emitted by using the light source 20c including the plurality of optical elements that emit light in different directions. For example, in a transportation means such as a car, an airplane, or a train, among three adjacent seats, the seat in the middle can be irradiated with a straight light, and the seat adjacent to the right side of the center can be irradiated with strong light in a diagonal direction by arranging the lighting device 30c. That is, the lighting device 30 can simultaneously irradiate a plurality of different objects with light having different directions.

In addition, the light source 20c may use a variety of configurations. For example, the light source 20c may be a light source having a configuration in which light guide plates are stacked, may be an LED in which an LED that emits green and an LED that emits blue are arranged, a direct Mini LED constituting a lens array, or an organic light-emitting element (OLED). In addition, the convex lens 230 shown in FIG. 20 may be arranged between each optical element and the liquid crystal optical element 10.

3rd Embodiment

Figure 23:
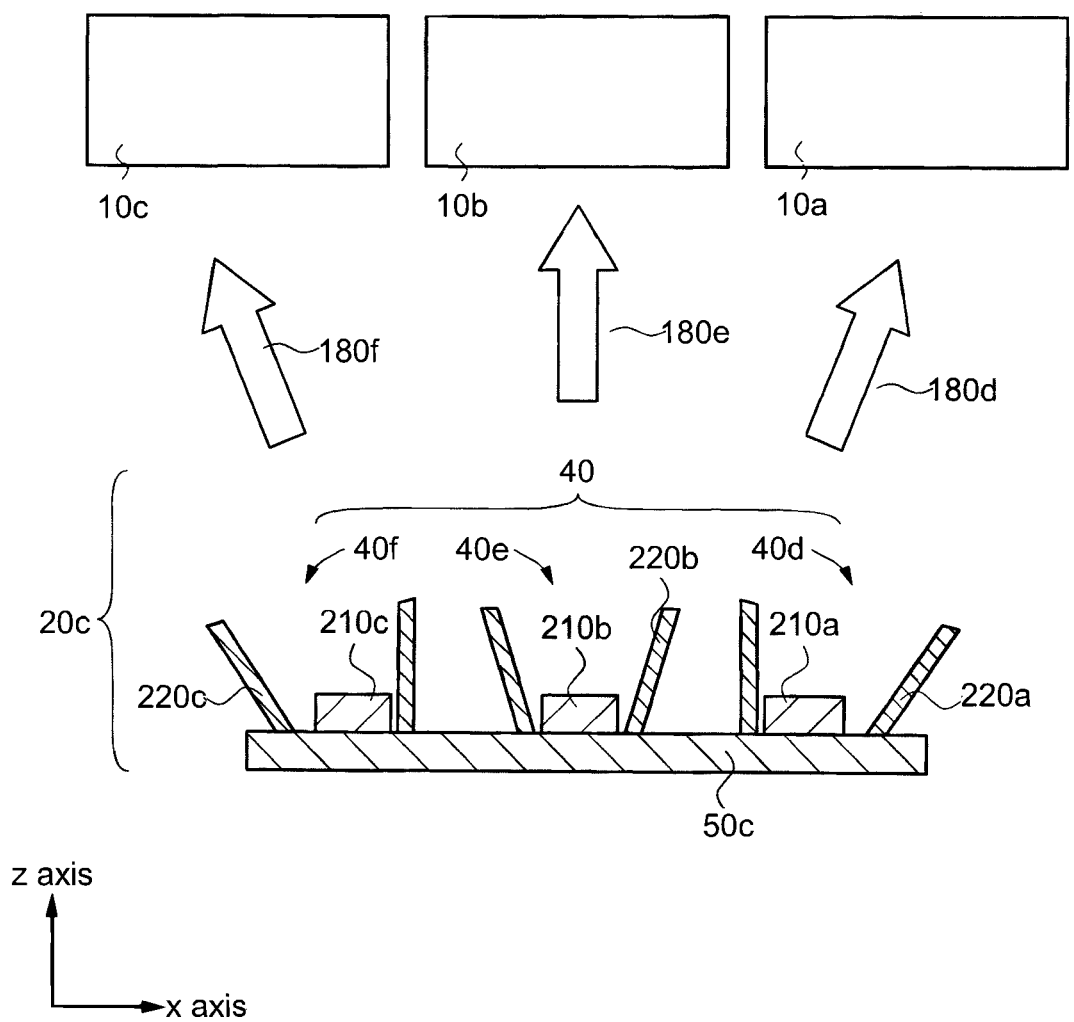
FIG. 23 is an end portion cross-sectional view of a lighting device according to a 3rd embodiment of the present invention.

A configuration in which one liquid crystal optical element is arranged for each of the 4th optical element 40d, the 5th optical element 40e, and the 6th optical element 40f included in the light source 20c described in the 2nd embodiment will be described in a 3rd embodiment. FIG. 23 is an end portion cross-sectional view of a lighting device 30d according to the 3rd embodiment of the present invention. The configuration of the lighting device 30d shown in FIG. 23 is an example, and the configuration of the lighting device 30d according to the 3rd embodiment is not limited to the configuration shown in FIG. 23. In the description of the 3rd embodiment, the same description as in the 1st embodiment and the 2nd embodiment may be omitted.

The lighting device 30d shown in FIG. 23 is different from the lighting device 30c shown in FIG. 21 in that one liquid crystal optical element is arranged for each of the 4th optical element 40d, the 5th optical element 40e, and the 6th optical element 40f. Since the lighting device 30d is the same as the lighting device 30c in other respects, detailed explanation thereof will be omitted here.

The lighting device 30d shown in FIG. 23 includes a liquid crystal optical element 10a, a liquid crystal optical element 10b, a liquid crystal optical element 10c, and the light source 20c. The light source 20c has the same configuration as that of the light source 20c described in the 2nd embodiment, and the light source 20c includes the 4th optical element 40d, the 5th optical element 40e, and the 6th optical element 40f.

The 4th optical element 40d faces the liquid crystal optical element 10a, and the light 180d emitted from the 4th optical element 40d in a right-oblique direction with respect to the z-axis direction is incident on the liquid crystal optical element 10a. The 5th optical element 40e faces the liquid crystal optical element 10b, and the light 180e emitted from the 5th optical element 40e in parallel or substantially parallel to the z-axis direction is incident on the liquid crystal optical element 10b. The 6th optical element 40f faces the liquid crystal optical element 10c, and the light 180f emitted from the 6th optical element 40f in a left-oblique direction with respect to the z-axis direction is incident on the liquid crystal optical element 10c.

The positional relationship between the 4th optical element 40d, the 5th optical element 40e, and the 6th optical element 40f and each electrode group is the same as the positional relationship between the 1st optical element 40a, the 2nd optical element 40b, and the 3rd optical element 40c and each electrode group. For example, each electrode group included in the liquid crystal optical element 10a is arranged so as to face the 4th optical element 40d and the light exit surface of the 4th optical element 40d, each electrode group included in the liquid crystal optical element 10b is arranged so as to face the 5th optical element 40e and the light exit surface of the 5th optical element 40e, and each electrode group included in the liquid crystal optical element 10c is arranged so as to face the 6th optical element 40f and the light exit surface of the 6th optical element 40f.

Using the lighting device 30d shown in FIG. 23 makes it possible to control the transmission and diffusion of light more finely in different directions with respect to an object to be irradiated with light.

4th Embodiment

Figure 24:
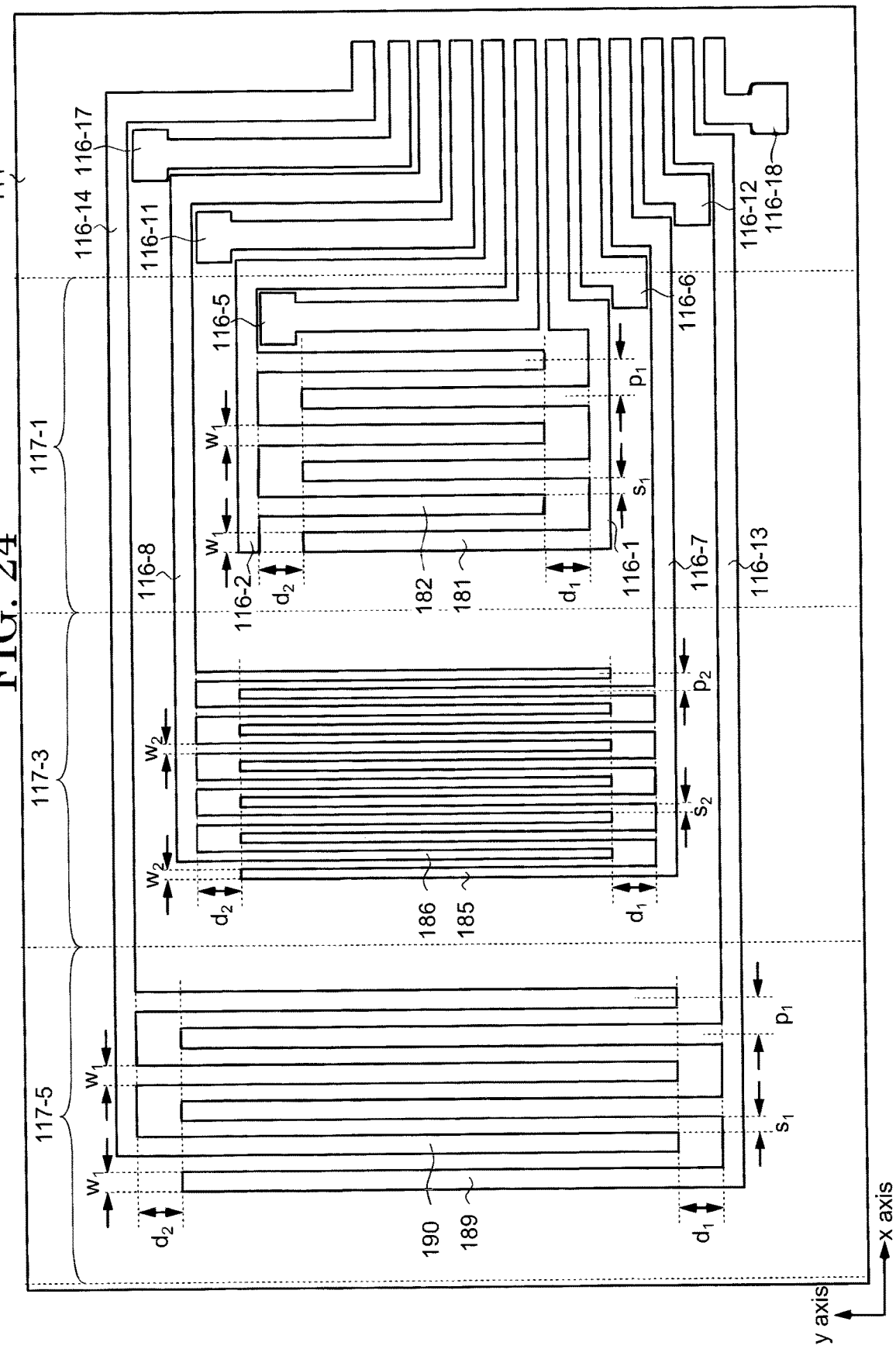
FIG. 24 is a schematic plan view showing an arrangement of a 1st transparent electrode, a 2nd transparent electrode, a 5th transparent electrode, a 6th transparent electrode, a 9th transparent electrode, and a 10th transparent electrode on a 1st substrate in a liquid crystal optical element according to a 4th embodiment of the present invention.
Figure 25:
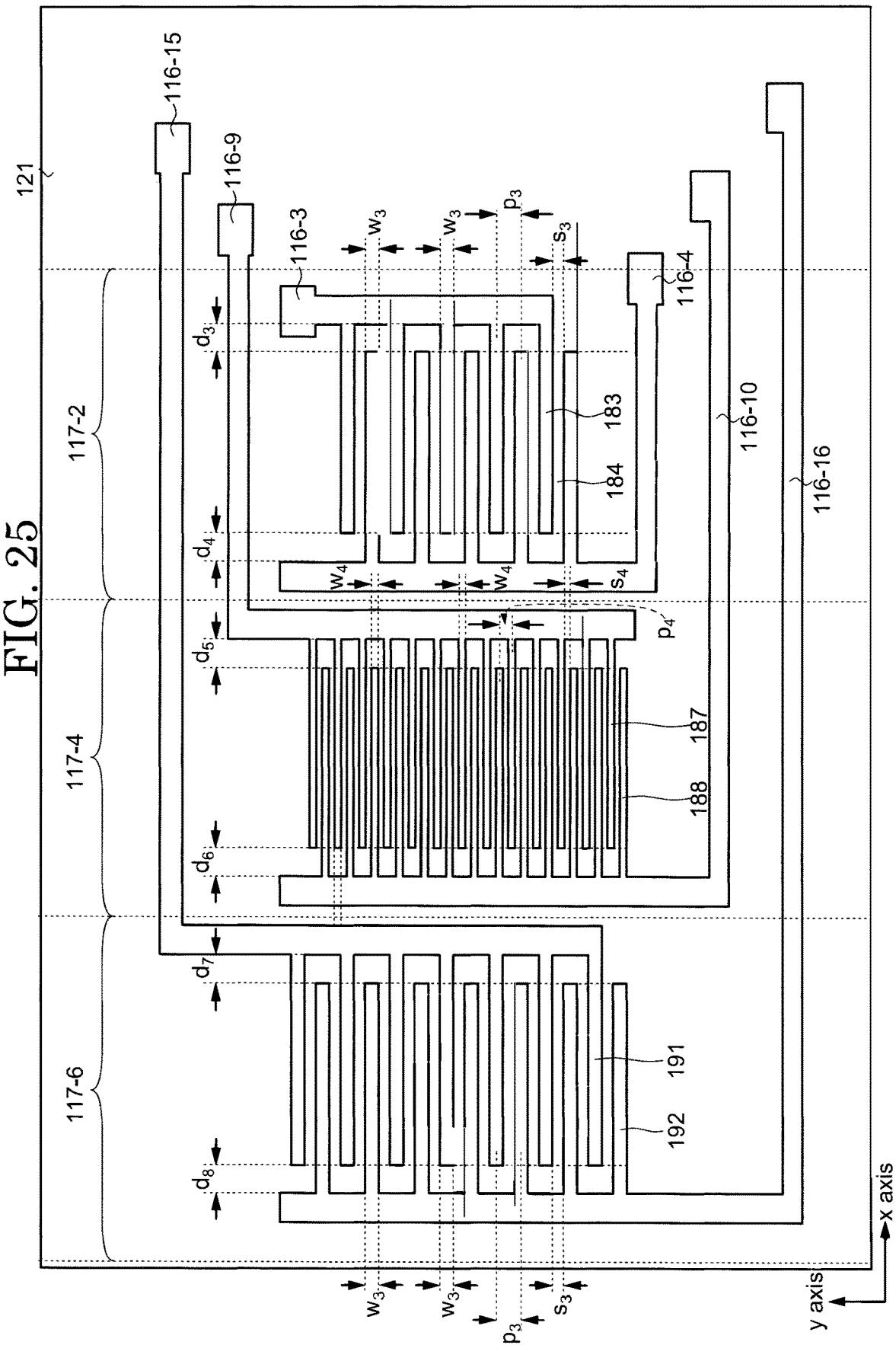
FIG. 25 is a schematic plan view showing an arrangement of a 3rd transparent electrode, a 4th transparent electrode, a 7th transparent electrode, an 8th transparent electrode, an 11th transparent electrode, and a 12th transparent electrode on a 2nd substrate in a liquid crystal optical element according to the 4th embodiment of the present invention.
Figure 26:
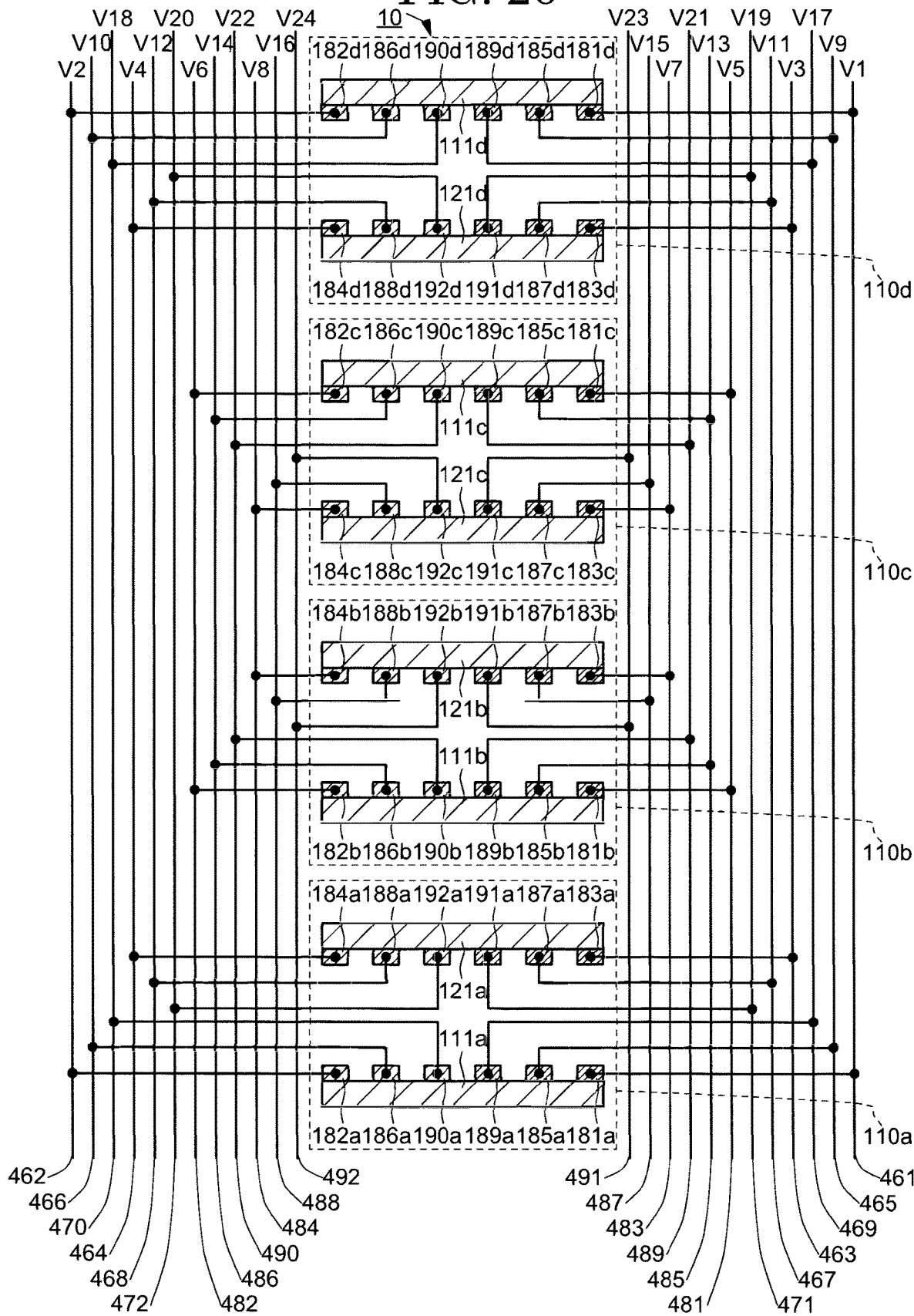
FIG. 26 is a schematic plan view for explaining a connection of transparent electrodes of a liquid crystal optical element according to the 4th embodiment of the present invention.

In a 4th embodiment, a configuration in which each transparent electrode can be independently controlled with respect to the arrangement of the transparent electrodes shown in FIG. 6 and FIG. 7 will be described. FIG. 24 is a schematic plan view showing the arrangement of the 1st transparent electrode 181, the 2nd transparent electrode 182, the 5th transparent electrode 185, the 6th transparent electrode 186, the 9th transparent electrode 189, and the 10th transparent electrode 190 on the 1st substrate 111 in the liquid crystal optical element 10 according to the 4th embodiment of the present invention. FIG. 25 is a schematic plan view showing the arrangement of the 3rd transparent electrode 183, the 4th transparent electrode 184, the 7th transparent electrode 187, the 8th transparent electrode 188, the 11th transparent electrode 191, and the 12th transparent electrode 192 on the 2nd substrate 121 in the liquid crystal optical element 10 according to the 4th embodiment of the present invention. FIG. 26 is a schematic plan view for explaining the connection of the transparent electrodes of the liquid crystal optical element 10 according to the 4th embodiment of the present invention. The form of the liquid crystal optical element 10 shown in FIG. 24 to FIG. 26 is an example, the form of the liquid crystal optical element 10 according to the 4th embodiment is an example, and the form of the liquid crystal optical element 10 according to the 4th embodiment is not limited to the form shown in FIG. 24 to FIG. 26. In the description of the 4th embodiment, descriptions similar to those of the 1st to 3rd embodiments may be omitted.

The arrangement of the transparent electrodes shown in FIG. 24 and FIG. 25 is different from the arrangement of the transparent electrodes shown in FIG. 6 and FIG. 7 in that each of the transparent electrodes can be independently controlled. Since the arrangement of the transparent electrodes shown in FIG. 24 and FIG. 25 is the same as the arrangement of the transparent electrodes shown in FIG. 6 and FIG. 7 in other respects, detailed explanation thereof will be omitted here.

The 1st transparent electrode 181 is electrically connected to the 1st wiring 116-1 in FIG. 24. The 2nd transparent electrode 182 is electrically connected to the 2nd wiring 116-2. The 5th transparent electrode 185 is electrically connected to a 7th wiring 116-7. The 6th transparent electrode 186 is electrically connected to an 8th wiring 116-8. The 9th transparent electrode 189 is electrically connected to a 13th wiring 116-13. The 10th transparent electrode 190 is electrically connected to a 14th wiring 116-14.

The 1st wiring 116-1, the 2nd wiring 116-2, the 5th wiring 116-5, the 6th wiring 116-6, the 7th wiring 116-7, the 8th wiring 116-8, the 11th wiring 116-11, the 12th wiring 116-12, the 13th wiring 116-13, the 14th wiring 116-14, a 17th wiring 116-17, and an 18th wiring 116-18 are arranged on the 1st substrate 111.

The 1st wiring 116-1 may be formed below the 1st transparent electrode 181, may be formed above the 1st transparent electrode 181, and may be formed in the same layer as the 1st transparent electrode 181. The 2nd wiring 116-2 may be formed below the 2nd transparent electrode 182, may be formed above the 2nd transparent electrode 182, and may be formed in the same layer as the 2nd transparent electrode 182. The 7th wiring 116-7 may be formed below the 5th transparent electrode 185, may be formed above the 5th transparent electrode 185, and may be formed in the same layer as the 5th transparent electrode 185. The 8th wiring 116-8 may be formed below the 6th transparent electrode 186, may be formed above the 6th transparent electrode 186, and may be formed in the same layer as the 6th transparent electrode 186. The 13th wiring 116-13 may be formed below the 9th transparent electrode 189, may be formed above the 9th transparent electrode 189, and may be formed in the same layer as the 9th transparent electrode 189. The 14th wiring 116-14 may be formed below the 10th transparent electrode 190, may be formed above the 10th transparent electrode 190, and may be formed in the same layer as the 10th transparent electrode 190.

In FIG. 25, the 3rd transparent electrode 183 is electrically connected to the 3rd wiring 116-3. The 4th transparent electrode 184 is electrically connected to the 4th wiring 116-4. The 7th transparent electrode 187 is electrically connected to the 9th wiring 116-9. The 8th transparent electrode 188 is electrically connected to the 10th wiring 116-10. The 11th transparent electrode 191 is electrically connected to a 15th wiring 116-15. The 12th transparent electrode 192 is electrically connected to a 16th wiring 116-16.

The 3rd wiring 116-3, the 4th wiring 116-4, the 9th wiring 116-9, the 10th wiring 116-10, the 15th wiring 116-15, and the 16th wiring 116-16 are arranged on the 2nd substrate 121.

The 3rd wiring 116-3 may be formed below the 3rd transparent electrode 183, may be formed above the 3rd transparent electrode 183, and may be formed in the same layer as the 3rd transparent electrode 183. The 4th wiring 116-4 may be formed below the 4th transparent electrode 184, may be formed above the 4th transparent electrode 184, and may be formed in the same layer as the 4th transparent electrode 184. The 9th wiring 116-9 may be formed below the 7th transparent electrode 187, may be formed above the 7th transparent electrode 187, and may be formed in the same layer as the 7th transparent electrode 187. The 10th wiring 116-10 may be formed below the 8th transparent electrode 188, may be formed above the 8th transparent electrode 188, and may be formed in the same layer as the 8th transparent electrode 188. The 15th wiring 116-15 may be formed below the 11th transparent electrode 191, may be formed above the 11th transparent electrode 191, and may be formed in the same layer as the 11th transparent electrode 191. The 16th wiring 116-16 may be formed below the 12th transparent electrode 192, may be formed above the 12th transparent electrode 192, and may be formed in the same layer as the 12th transparent electrode 192.

In the case where the 1st substrate 111 is bonded to the 2nd substrate 121, the 3rd wiring 116-3, the 4th wiring 116-4, the 9th wiring 116-9, the 10th wiring 116-10, the 15th wiring 116-15, and the 16 wiring 116-16 arranged in the 2nd substrate 121 are electrically connected to the 5th wiring 116-5, the 6th wiring 116-6, the 11th wiring 116-11, the 12th wiring 116-12, the 17th wiring 116-17, and the 18th wiring 116-18, respectively.

For example, the 3rd wiring 116-3 and the 5th wiring 116-5, the 4th wiring 116-4 and the 6th wiring 116-6, the 9th wiring 116-9 and the 11th wiring 116-11, the 10th wiring 116-10 and the 12th wiring 116-12, the 15th wiring 116-15 and the 17th wiring 116-17, and the 16th wiring 116-16 and the 18th wiring 116-18 may be electrically connected using silver paste or conductive particles. In addition, the conductive particles include metal-coated particles.

The 1st wiring 116-1, the 2nd wiring 116-2, the 5th wiring 116-5, the 6th wiring 116-6, the 7th wiring 116-7, the 8th wiring 116-8, the 11th wiring 116-11, the 12th wiring 116-12, the 13th wiring 116-13, the 14th wiring 116-14, the 17th wiring 116-17, and the 18th wiring 116-18 may be terminals for connecting to an external device.

The 1st wiring 116-1, the 2nd wiring 116-2, the 5th wiring 116-5 (or the 3rd wiring 116-3), the 6th wiring 116-6 (or the 4th wiring 116-4), the 11th wiring 116-11 (or the 9th wiring 116-9), the 12th wiring 116-12 (or the 10th wiring 116-10), the 17th wiring 116-17 (or the 15th wiring 116-15), and the 18th wiring 116-18 (or the 16th wiring 116-16) are electrically insulated from each other. Therefore, the 1st transparent electrode 181*a*, the 5th transparent electrode 185*a*, the 9th transparent electrode 189*a*, the 2nd transparent electrode 182*a*, the 6th transparent electrode 186*a*, the 10th transparent electrode 190*a*, the 3rd transparent electrode 183*a*, the 7th transparent electrode 187*a*, the 11th transparent electrode 191*a*, the 4th transparent electrode 184*a*, the 8th transparent electrode 188*a*, and the 12th transparent electrode 192*a* can be independently controlled in the 1st liquid crystal cell 110*a*, and each transparent electrode can be used to control the orientation of the liquid crystal molecule of the liquid crystal layer 113. For example, the 1st transparent electrode 181*a*, the 5th transparent electrode 185*a*, and the 9th transparent electrode 189*a* are supplied with the 1st voltage V1, the 2nd transparent electrode 182*a*, the 6th transparent electrode 186*a*, and the 10th transparent electrode 190*a* are supplied with the 2nd voltage V2, the 3rd transparent electrode 183*a*, the 7th transparent electrode 187*a*, and the 11th transparent electrode 191*a* are supplied with the 3rd voltage V3, and the 4th transparent electrode 184*a*, the 8th transparent electrode 188*a*, and the 12th transparent electrode 192*a* are supplied with the 4th voltage V4. In addition, the 1st voltage V1, the 2nd voltage V2, the 3rd voltage V3, and the 4th voltage V4 may be different from each other, and may be the same voltage.

Since the 1st transparent electrode 181 and the 2nd transparent electrode 182 included in the 1st electrode group 117-1 of the 1st substrate 111 intersect the 3rd transparent electrode 183 and the 4th transparent electrode 184 included in the 4th electrode group 117-2 of the 2nd substrate 121 in the lighting device 30 according to the present embodiment, the orientation of the liquid crystal of the liquid crystal layer 113 can be controlled by controlling the voltage supplied to each transparent electrode. In addition, since the 5th transparent electrode 185 and the 6th transparent electrode 186 included in the 2nd electrode group 117-3 of the 1st substrate 111 intersect the 7th transparent electrode 187 and the 8th transparent electrode 188 included in the 5th electrode group 117-4 of the 2nd substrate 121 in the lighting device 30 according to the present embodiment, the orientation of the liquid crystal of the liquid crystal layer 113 can be controlled by controlling the voltage supplied to each transparent electrode. In addition, since the 9th transparent electrode 189 and the 10th transparent electrode 190 included in the 3rd electrode group 117-5 of the 1st substrate 111 intersect the 11th transparent electrode 191 and the 12th transparent electrode 192 included in the 6th electrode group 117-6 of the 2nd substrate 121 in the lighting device 30 according to the present embodiment, the orientation of the liquid crystal of the liquid crystal layer 113 can be controlled by controlling the voltage supplied to each transparent electrode. As a result, the liquid crystal optical element 10 can transmit or diffuse the light from three different directions emitted from the three optical elements (for example, the 1st optical element 40*a*, the 2nd optical element 40*b*, and the 3rd optical element 40*c*) to the right side using the 1st electrode group 117-1 and the 4th electrode group 117-2, transmit or diffuse the light to the center using the 2nd electrode group 117-3 and the 5th electrode group 117-4, and transmit or diffuse the light to the left side using the 3rd electrode group 117-5 and the 6th electrode group 117-6.

In addition, in the liquid crystal optical element 10 according to the present embodiment, narrowing the width, the inter-electrode distance, and the pitch between electrodes of the transparent electrodes of the 2nd electrode group 117-3 arranged at the center or the approximate center of the 1st substrate 111 and the 5th electrode group 117-4 arranged at the center or the approximate center of the 2nd substrate 121 makes it possible to control the range in which the liquid crystal is aligned within a narrow range when the voltage is supplied to the transparent electrodes arranged in the 2nd electrode group 117-3 and the 5th electrode group 117-4. That is, the degree of light diffusion in the x-axis direction or the y-axis direction of the light diffusing to the center or the approximate center can be controlled more finely. In the liquid crystal optical element 10 according to the present embodiment, the 1st liquid crystal cell 110*a* and the 2nd liquid crystal cell 110*b* having the same transparent electrode arrangement are stacked, and the degree of light diffusion in the x-axis direction of the light diffusing to the center or the approximate center can be controlled more finely. In addition, in the liquid crystal optical element 10 according to the present embodiment, the 3rd liquid crystal cell 110*c* and the 4th liquid crystal cell 110*d* having the same transparent electrode arrangement are stacked above the 1st liquid crystal cell 110*a* and the 2nd liquid crystal cell 110*b* having the same transparent electrode arrangement, and the degree of light diffusion in the y-axis of the light diffusing to the center or the approximate center can be controlled more finely. As a result, the light from the 2nd optical element 40*b* arranged at the center or the approximate center can be more finely diffused in the horizontal and vertical directions, and the light distribution and the light distribution pattern in the horizontal and vertical directions can be more finely controlled.

The schematic plan view for explaining the connection of the transparent electrodes shown in FIG. 26 is different from the schematic plan view for explaining the connection of the transparent electrodes shown in FIG. 11 in that the transparent electrodes are supplied with voltages independently of each other. Since the diagram shown in FIG. 26 is the same in other respects as the diagram shown in FIG. 11, detailed explanation thereof will be omitted here.

The 1st transparent electrode 181*a* and the 1st transparent electrode 181*d* are connected to the 1st voltage supply line 461 that supplies the 1st voltage V1. The 5th transparent electrode 185*a* and the 5th transparent electrode 185*d* are connected to a 9th voltage supply line 465 that supplies a 9th voltage V9. The 9th transparent electrode 189*a* and the 9th transparent electrode 189*d* are connected to a 17th voltage supply line 469 that supplies a 17th voltage V17.

The 2nd transparent electrode 182*a* and the 2nd transparent electrode 182*d* are connected to the 2nd voltage supply line 462 that supplies the 2nd voltage V2. The 6th transparent electrode 186*a* and the 6th transparent electrode 186*d* are connected to a 10th voltage supply line 466 that supplies a 10th voltage V10. The 10th transparent electrode 190*a* and the 10th transparent electrode 190*d* are connected to an 18th voltage supply line 470 that supplies an 18th voltage V18.

The 3rd transparent electrode 183*a* and the 3rd transparent electrode 183*d* are connected to the 3rd voltage supply line 463 that supplies the 3rd voltage V3. The 7th transparent electrode 187*a* and the 7th transparent electrode 187*d* are connected to an 11th voltage supply line 467 that supplies an 11th voltage V11. The 11th transparent electrode 191*a* and the 11th transparent electrode 191*d* are connected to a 19th voltage supply line 471 that supplies a 19th voltage V19.

The 4th transparent electrode 184*a* and the 4th transparent electrode 184*d* are connected to the 4th voltage supply line 464 that supplies the 4th voltage V4. The 8th transparent electrode 188*a* and the 8th transparent electrode 188*d* are connected to a 12th voltage supply line 468 that supplies a 12th voltage V12. The 12th transparent electrode 192*a* and the 12th transparent electrode 192*d* are connected to a 20th voltage supply line 472 that supplies a 20th voltage V20.

The 1st transparent electrode 181*b* and the 1st transparent electrode 181*c* are connected to the 5th voltage supply line 481 that supplies the 5th voltage V5. The 5th transparent electrode 185*b* and the 5th transparent electrode 185*c* are connected to a 13th voltage supply line 485 that supplies a 13th voltage V13. The 9th transparent electrode 189*b* and the 9th transparent electrode 189*c* are connected to a 21st voltage supply line 489 that supplies a 21st voltage V21.

The 2nd transparent electrode 182*b* and the 2nd transparent electrode 182*c* are connected to a 6th voltage supply line 482 that supplies the 6th voltage V6. The 6th transparent electrode 186*b* and the 6th transparent electrode 186*c* are connected to a 14th voltage supply line 486 that supplies a 14th voltage V14. The 10th transparent electrodes 190*b* and the 10th transparent electrode 190*c* are connected to a 22nd voltage supply line 490 that supplies the 22nd voltage V22.

The 3rd transparent electrode 183*b* and the 3rd transparent electrode 183*c* are connected to the 7th voltage supply line 483 that supplies the 7th voltage V7. The 7th transparent electrode 187*b* and the 7th transparent electrode 187*c* are connected to a 15th voltage supply line 487 that supplies a 15th voltage V15. The 11th transparent electrode 191*b* and the 11th transparent electrode 191*c* are connected to a 23rd voltage supply line 491 that supplies a 23rd voltage V23.

The 4th transparent electrode 184*b* and the 4th transparent electrode 184*c* are connected to the 8th voltage supply line 484 that supplies the 8th voltage V8. The 8th transparent electrode 188*b* and the 8th transparent electrode 188*c* are connected to a 16th voltage supply line 488 that supplies a 16th voltage V16. The 12th transparent electrode 192*b* and the 12th transparent electrode 192*c* are connected to a 24th voltage supply line 492 that supplies a 24th voltage V24.

The 1st voltage V11 to the 24th voltage V24 shown in FIG. 26 may be a fixed voltage or may be a variable voltage. The 1st voltage supply line 461 to the 24th voltage supply line 492 are supplied not only with the Low voltage and the High voltage but also with the intermediate voltage between the Low voltage and the High voltage. That is, the 1st voltage V11 to the 24th voltage V24 include three voltages having different absolute values.

Each transparent electrode is independently supplied with a voltage from the control circuit 70 (see FIG. 10) in the liquid crystal optical element 10 according to the 4th embodiment. Therefore, the light emitted from the three optical elements of the 1st optical element 40*a*, the 2nd optical element 40*b*, and the 3rd optical element 40*c* can be independently transmitted and diffused in the x-axis direction and the y-axis direction, respectively. As a result, the lighting device including the liquid crystal optical element 10 according to the 4th embodiment can further control the light distribution and the light distribution pattern into various shapes.

5th Embodiment

Figure 27:
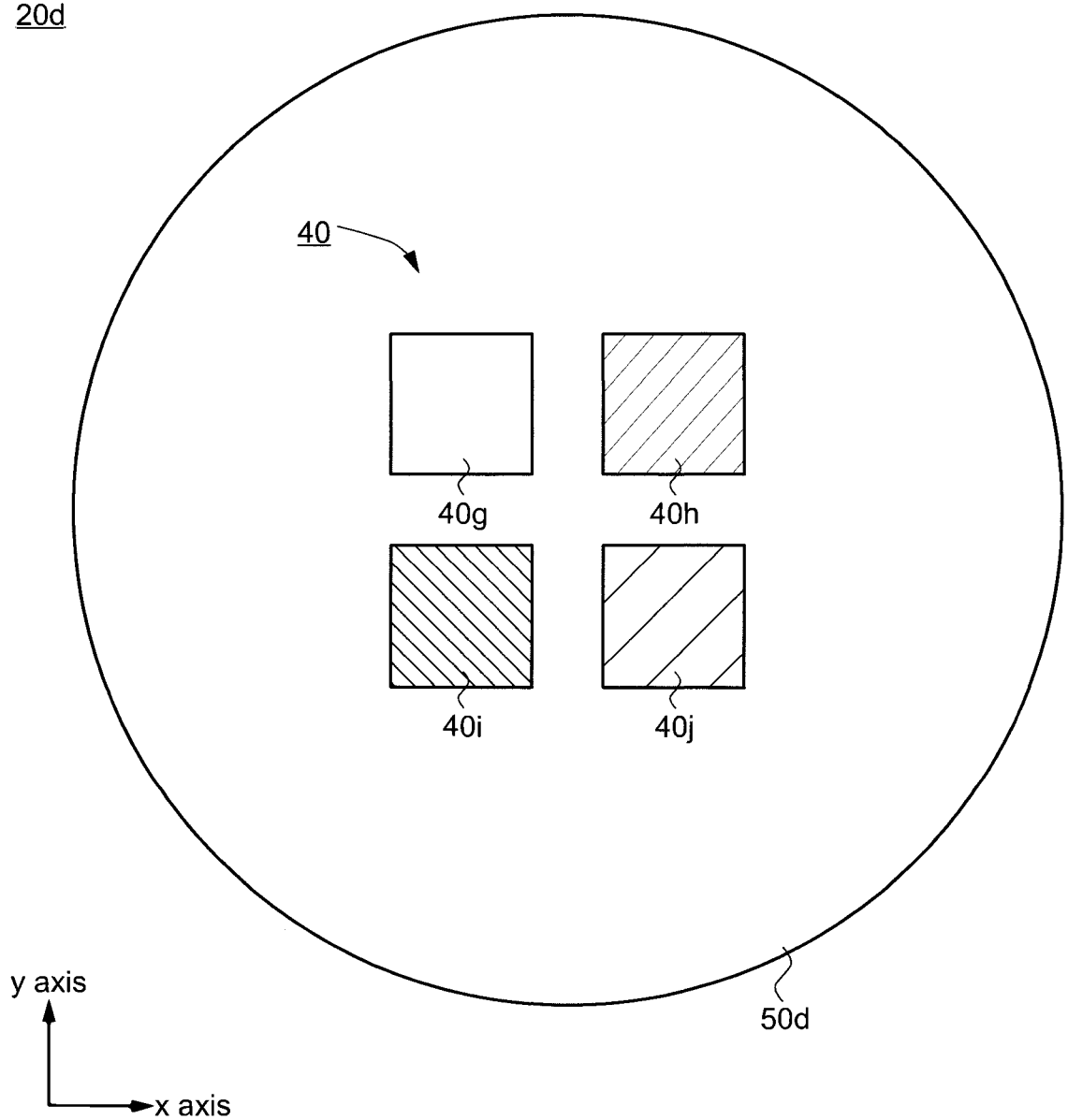
FIG. 27 is a plan view of a light source according to a 5th embodiment of the present invention.

In a 5th embodiment, four optical elements are arranged in a matrix in the x-axis direction and the y-axis direction. FIG. 27 is a plan view of a light source 20*d* according to the 5th embodiment of the present invention. The light distribution patterns shown in FIG. 28A to FIG. 28F which are schematic diagrams, are light distribution patterns of light emitted from the lighting device according to the 5th embodiment of the present invention. For example, the light distribution patterns shown in FIG. 28A to FIG. 28F are a pattern that is projected (irradiated) on the light exit surface of the 4th liquid crystal cell 110*d* (the surface opposite to the side on which the light source 20 is arranged in the z-axis direction). The forms shown in FIG. 27 and FIG. 28A to FIG. 28F are examples, and the 5th embodiment is not limited to the forms shown in FIG. 27 and FIG. 28A to FIG. 28F. In the description of the 5th embodiment, the same descriptions as in the 1st embodiment to the 4th embodiment may be omitted.

The light source 20*d* includes the optical element 40 and a support member 50*d* in FIG. 27. The optical element 40 includes a 5th optical element 40*g*, a 6th optical element 40*h*, a 7th optical element 40*i*, and an 8th optical element 40*j*. The 5th optical element 40*g*, the 6th optical element 40*h*, the 7th optical element 40*i*, and the 8th optical element 40*j* are arranged on the support member 50*d* in a matrix in the x-axis direction and the y-axis direction in a plan view.

For example, the 6th optical element 40*h* is arranged adjacent to the 5th optical element 40*g* with respect to the x-axis direction, and is arranged adjacent to the 8th optical element 40*j* with respect to the y-axis direction. The 7th optical element 40*i* is arranged diagonally with respect to the 6th optical element 40*h*, is arranged adjacent to the 8th optical element 40*j* with respect to the x-axis direction, and is arranged adjacent to the 5th optical element 40*g* with respect to the y-axis direction. The 8th optical element 40*j* is arranged diagonally with respect to the 5th optical element 40*g*. The same optical elements as those described in the 1st embodiment to the 4th embodiment can be used for each optical element.

Although an example in which each optical element is arranged apart is shown in FIG. 27, the arrangement of each optical element is not limited to the example shown in FIG. 27. Each optical element may be arranged so as to be in close contact with each other.

Although an example in which the support member 50*d* has a flat surface and the 5th optical element 40*g*, the 6th optical element 40*h*, the 7th optical element 40*i*, and the 8th optical element 40*j* are arranged on the flat surface is shown, the support member 50*d* is not limited to the example shown in the 5th embodiment. For example, in a cross-sectional view, the support member 50*d* may have a convex shape as shown in the 1st embodiment, and may have a concave shape as shown in the 1st embodiment. In addition, the same substrate as the support member 50*a* or 50*b* described in the 1st embodiment can be used as the support member 50*d*.

Figure 28A:
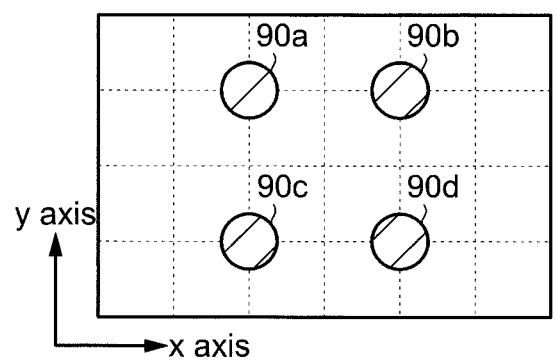
FIG. 28A is a schematic diagram showing a light distribution pattern of light emitted from a lighting device according to the 5th embodiment of the present invention.

The light distribution pattern shown in FIG. 28A is a light distribution pattern of light emitted from the lighting device 30 when four optical elements are turned on, and the intermediate voltage is supplied to each transparent electrode of each liquid crystal cell of the liquid crystal optical element 10. Four spot lights 90*a*, 90*b*, 90*c*, and 90*d* are irradiated in a matrix in the x-axis direction and the y-axis direction in the light distribution pattern shown in FIG. 28A.

Figure 28B:
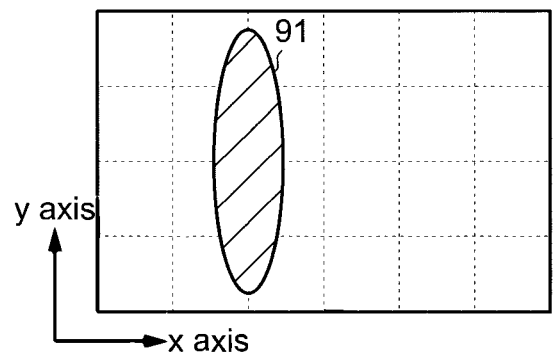
FIG. 28B is a schematic diagram showing a light distribution pattern of light emitted from a lighting device according to the 5th embodiment of the present invention.

The light distribution pattern shown in FIG. 28B is a light distribution pattern of light emitted from the lighting device when two optical elements (the 5th optical element 40*g* and the 7th optical element 40*i*) are turned on, and the 1st variable voltage or the 2nd variable voltage is supplied to each transparent electrode of each liquid crystal cell of the liquid crystal optical element 10. The light distribution pattern shown in FIG. 28B is a light distribution pattern in which light (diffused light 91) diffused along the 5th optical element 40*g* and the 7th optical element 40*i* aligned in the y-axis direction is irradiated.

Figure 28C:
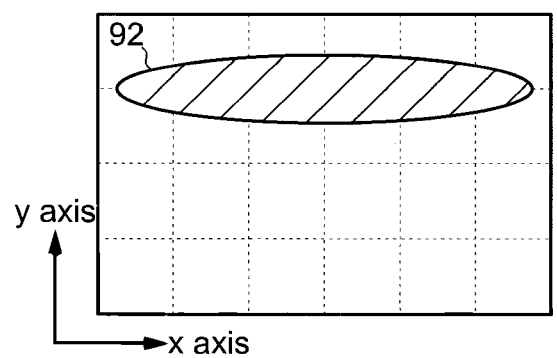
FIG. 28C is a schematic diagram showing a light distribution pattern of light emitted from a lighting device according to the 5th embodiment of the present invention.

The light distribution pattern shown in FIG. 28C is a light distribution pattern of light emitted from the lighting device when two optical elements (the 5th optical element 40*g* and the 6th optical element 40*h*) are turned on, and the 1st variable voltage or the 2nd variable voltage is supplied to each transparent electrode of each liquid crystal cell of the liquid crystal optical element 10. The light distribution pattern shown in FIG. 28C is a light distribution pattern in which light (diffused light 92) diffused along the 5th optical element 40*g* and the 6th optical element 40*h* aligned in the x-axis direction is irradiated.

Figure 28D:
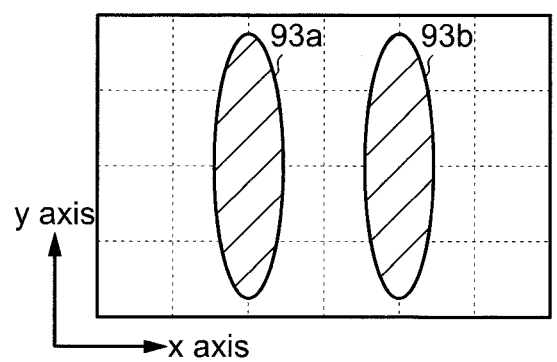
FIG. 28D is a schematic diagram showing a light distribution pattern of light emitted from a lighting device according to the 5th embodiment of the present invention.

The light distribution pattern shown in FIG. 28D is a light distribution pattern of light emitted from the lighting device when four optical elements are turned on, and the 1st variable voltage or the 2nd variable voltage at a level that suppresses the light diffusion in the x-axis direction is supplied to each transparent electrode of each liquid crystal cell of the liquid crystal optical element 10. The light distribution pattern shown in FIG. 28D is a light distribution pattern in which light (diffused light 93*a*) diffused along the 5th optical element 40*g* and the 7th optical element 40*i* aligned parallel to the y-axis direction, and light (diffused light 93b) diffused along the 6th optical element 40h and the 8th optical element 40j aligned parallel to the y-axis direction are irradiated.

Figure 28E:
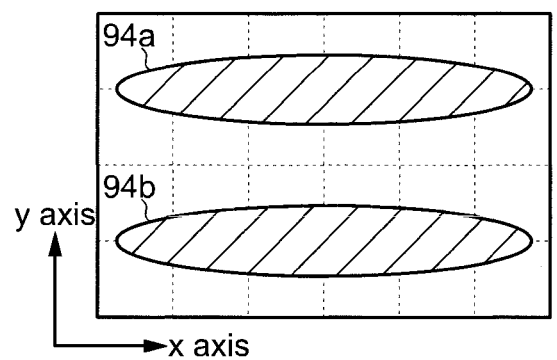
FIG. 28E is a schematic diagram showing a light distribution pattern of light emitted from a lighting device according to the 5th embodiment of the present invention.

The light distribution pattern shown in FIG. 28E is a light distribution pattern of light emitted from the lighting device when four optical elements are turned on, and the 1st variable voltage or the 2nd variable voltage at a level that suppresses the light diffusion in the y-axis direction is supplied to each transparent electrode of each liquid crystal cell of the liquid crystal optical element 10. The light distribution pattern shown in FIG. 28E is a light distribution pattern in which light (diffused light 94a) diffused along the 5th optical element 40g and the 6th optical element 40h aligned parallel to the x-axis direction, and light (diffused light 94b) diffused along the 7th optical element 40i and the 8th optical element 40j aligned parallel to the x-axis direction are irradiated.

Figure 28F:
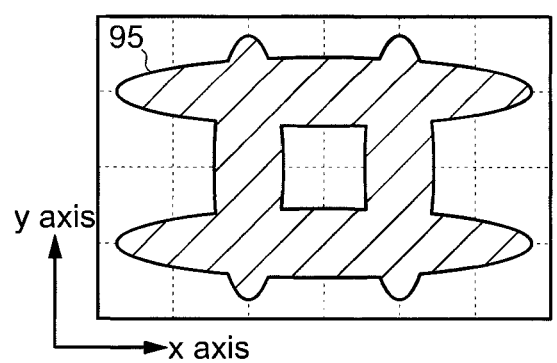
FIG. 28F is a schematic diagram showing a light distribution pattern of light emitted from a lighting device according to the 5th embodiment of the present invention.

The light distribution pattern shown in FIG. 28F is a light distribution pattern of light emitted from the lighting device when four optical elements are turned on, and the 1st variable voltage or the 2nd variable voltage is supplied to each transparent electrode of each liquid crystal cell of the liquid crystal optical element 10. The light distribution pattern shown in FIG. 28F is a light distribution pattern in which light 95 obtained by combining the light diffused along the 5th optical element 40g and the 6th optical element 40h aligned parallel to the x-axis direction, the light diffused along the 7th optical element 40i and the 8th optical element 40j aligned parallel to the x-axis direction, the light diffused along the 5th optical element 40g and the 7th optical element 40i aligned parallel to the y-axis direction, and the light diffused along the 6th optical element 40h and the 8th optical element 40j aligned parallel to the y-axis direction are irradiated.

A control signal to turn ON or OFF each LED of each of the four optical elements of the light source 20d is transmitted from the control circuit 70 to the light source 20d in the light distribution patterns shown in FIG. 28A to FIG. 28F. In addition, a predetermined voltage is supplied from the control circuit 70 to each transparent electrode included in the liquid crystal optical element 10.

The light source 20d according to the 5th embodiment has four optical elements and can emit light in four directions. The lighting device according to the 5th embodiment can transmit and diffuse the light emitted from the four optical elements, that is, the 5th optical element 40g, the 6th optical element 40h, the 7th optical element 40i, and the 8th optical element 40j, in the x-axis direction and the y-axis direction by using the liquid crystal optical element 10. As a result, the lighting device according to the 5th embodiment can variously control the light distribution and the light distribution pattern.

The configuration of the liquid crystal optical element, the configuration of the light source, and the configuration of the lighting device described above can be appropriately combined as long as no contradiction is caused. Further, the addition, deletion, or design change of components, or the addition, deletion, or condition change of processes as appropriate by those skilled in the art based on the configuration of the liquid crystal optical element, the configuration of the light source, and the configuration of the lighting device are also included in the scope of the present invention as long as they are provided with the gist of the present invention.

Further, it is understood that, even if the effect is different from those provided by each of the above-described embodiments, the effect obvious from the description in the specification or easily predicted by persons ordinarily skilled in the art is apparently derived from the present invention.

What is claimed is:

1. A lighting device comprising;
    a light source having a first optical element and a second optical element emitting directional light; and
    one liquid crystal optical element transmitting or diffusing the light emitted from the light source;
    wherein
        the first optical element includes a first light exit surface, the second optical element includes a second light exit surface, and the first light exit surface and the second light exit surface are arranged to direct in different directions,
        the liquid crystal optical element has a first electrode group facing the first light exit surface and a second electrode group facing the second light exit surface and arranged adjacent to the first electrode group,
        the first electrode group has a first transparent electrode and a second transparent electrode arranged alternately with the first transparent electrode,
        the second electrode group has a third transparent electrode and a fourth transparent electrode arranged alternately with the third transparent electrode, and
        a pitch at which the first transparent electrode and the second transparent electrode are alternately arranged is different from a pitch at which the third transparent electrode and the fourth transparent electrode are alternately arranged.

2. The lighting device according to claim 1, wherein the first electrode group and the second electrode group are electrically connected.

3. The liquid crystal optical element according to claim 1, wherein the first electrode group and the second electrode group are independently supplied with voltage.

4. The lighting device according to claim 1, wherein the first transparent electrode, the second transparent electrode, the third transparent electrode and the fourth transparent electrode are arranged in parallel to a first direction.

5. The lighting device according to claim 4, further comprising:
    a first substrate arranged with the first electrode group and the second electrode group are arranged;
    a second substrate overlapping the first substrate;
    a third electrode group arranged on the second substrate and facing the first electrode group; and
    a fourth electrode group arranged on the second substrate, facing the second electrode group and arranged next to the third electrode group.

6. The lighting device according to claim 5,
    wherein
    the third electrode group has a fifth transparent electrode and a sixth transparent electrode arranged alternately with the fifth transparent electrode,
    the fourth electrode group has a seventh transparent electrode and an eighth transparent electrode arranged alternately with the seventh transparent electrode, and
    the fifth transparent electrode, the sixth transparent electrode, the seventh transparent electrode, and the eighth transparent electrode are arranged in parallel to a second direction intersecting the first direction.

7. The lighting device according to claim 6,
    wherein
    the liquid crystal optical element includes a first liquid crystal cell, a second liquid crystal cell overlapping the first liquid crystal cell, a third liquid crystal cell overlapping the second liquid crystal cell, and a fourth liquid crystal cell overlapping the third liquid crystal cell, and each of the first liquid crystal cell, the second liquid crystal cell, the third liquid crystal cell, and the fourth liquid crystal cell includes the first electrode group, the second electrode group, the third electrode group, and the fourth electrode group.

8. The lighting device according to claim 7, wherein the second substrate included in the second liquid crystal cell overlaps the first substrate included in the first liquid crystal cell, the second substrate included in the third liquid crystal cell overlaps the second substrate included in the second liquid crystal cell, and the second substrate included in the fourth liquid crystal cell overlaps the first substrate included in the second liquid crystal cell.

9. The lighting device according to claim 8, wherein the first transparent electrode and the third transparent electrode are electrically connected and supplied with a first voltage, the second transparent electrode and the fourth transparent electrode are electrically connected and supplied with a second voltage, the fifth transparent electrode and the seventh transparent electrode are electrically connected and supplied with a third voltage, and the sixth transparent electrode and the eighth transparent electrode are electrically connected and supplied with a fourth voltage.

10. The lighting device according to claim 9, further comprising a control circuit, wherein the control circuit configured to output a control signal for controlling light irradiation of the first optical element and the second optical element to the first optical element and the second optical element, to supply the first voltage to the first transparent electrode and the third transparent electrode, to supply the second voltage to the second transparent electrode and the fourth transparent electrode, to supply the third voltage to the fifth transparent electrode and the seventh transparent electrode, and to supply the fourth voltage to the sixth transparent electrode and the eighth transparent electrode.

11. The lighting device according to claim 10, wherein the control circuit sets each of the first voltage, the second voltage, the third voltage, and the fourth voltage to one voltage out of at least three voltages having different absolute values.

12. The lighting device according to claim 6, wherein the second direction is a direction perpendicular to the first direction.

13. The lighting device according to claim 1, wherein the first optical element and the second optical element are arranged above a support member having a convex surface in an end cross section.

14. The lighting device according to claim 1, wherein the first optical element and the second optical element are arranged above a support member having a concave surface in an end cross section.

15. The lighting device according to claim 1, wherein each of the first optical element and the second optical element has a light emitting element emitting light when a voltage is supplied.

16. The lighting device according to claim 1, wherein each of the first optical element and the second optical element has a convex lens that condenses light.

17. The lighting device according to claim 1, wherein each of the first optical element and the second optical element has a reflector that reflects light so that it enters the liquid crystal optical element.

* * * * *